US012444365B2

(12) United States Patent
Jiang et al.

(10) Patent No.: US 12,444,365 B2
(45) Date of Patent: Oct. 14, 2025

(54) DISPLAY SUBSTRATE AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Zhiliang Jiang, Beijing (CN); Tiaomei Zhang, Beijing (CN); Pan Zhao, Beijing (CN); Lang Liu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/703,194

(22) PCT Filed: Mar. 1, 2023

(86) PCT No.: PCT/CN2023/079105

§ 371 (c)(1),
(2) Date: Apr. 19, 2024

(87) PCT Pub. No.: WO2024/178683

PCT Pub. Date: Sep. 6, 2024

(65) Prior Publication Data

US 2025/0232722 A1 Jul. 17, 2025

(51) Int. Cl.
*G09G 3/3233* (2016.01)

(52) U.S. Cl.
CPC ... *G09G 3/3233* (2013.01); *G09G 2300/0465* (2013.01); *G09G 2300/0819* (2013.01);
(Continued)

(58) Field of Classification Search
CPC ............... G09G 3/3233; G09G 3/3241; G09G 2230/00; G09G 2300/0426;
(Continued)

(56) References Cited

U.S. PATENT DOCUMENTS

2021/0376026 A1* 12/2021 Mou .................... G09G 3/2003
2023/0178009 A1* 6/2023 Xu ....................... G09G 3/3233
345/211

FOREIGN PATENT DOCUMENTS

CN 113224123 A 8/2021
CN 114093898 A 2/2022
(Continued)

OTHER PUBLICATIONS

International Search Report and Written Opinion from PCT Application Serial No. PCT/CN2023/079105, dated Nov. 5, 2023, 6 pages.

*Primary Examiner* — Nelson M Rosario
(74) *Attorney, Agent, or Firm* — Kinney & Lange, P.A.

(57) ABSTRACT

Provided are a display substrate and a display device. The display substrate includes: a base substrate; sub-pixels; light emitting elements; pixel driving circuits; an initialization voltage signal line extending in the first direction; and a control signal line partially extending in the first direction. In a frame of driving the pixel driving circuits of a row of sub-pixels, the control signal controls, in at least one first time period, at least two transistors of the pixel driving circuit to turn on, the initialization voltage signal is provided to the pixel driving circuit in a second time period, and the first and second time periods are separated in timing. An orthographic projection of the initialization voltage signal line on the base substrate overlaps at least partially with that of the control signal line located on a different layer, with an overlapping rate of 60% to 100%.

20 Claims, 49 Drawing Sheets

(52) U.S. Cl.
CPC . *G09G 2310/08* (2013.01); *G09G 2320/0233* (2013.01); *G09G 2320/0247* (2013.01)

(58) Field of Classification Search
CPC ..... G09G 2300/043; G09G 2300/0819; G09G 2300/0842; G09G 2300/0861; G09G 2310/02; G09G 2310/0251; G09G 2310/061; G09G 2310/08; G09G 2330/021; G09G 3/32; H10D 30/6755; H10D 86/40; H10D 86/421; H10D 86/423; H10D 86/441; H10D 86/481; H10D 86/60; H10K 59/131; H10K 59/12
See application file for complete search history.

(56) References Cited

FOREIGN PATENT DOCUMENTS

CN 115050339 A 9/2022
CN 115101538 A 9/2022

* cited by examiner

DISPLAY SUBSTRATE AND DISPLAY DEVICE

CROSS REFERENCE TO RELATED APPLICATION(S)

This application is a Section 371 National Stage Application of International Application No. PCT/CN2023/079105 filed on Mar. 1, 2023, the whole disclosure of which is incorporated herein by reference in its entirety.

TECHNICAL FIELD

The present disclosure relates to the field of display technology, and in particular to a display substrate and a display device.

BACKGROUND

With the development of display technologies, consumers are increasingly pursuing a high image quality of a display device. A low-density pixel layout may not meet requirements of consumers for the high image quality, thus more and more developers conduct developments on the high-density pixel display technology. However, with a continuous increase of PPI (Pixels Per Inch), process requirements for display devices are becoming increasingly higher, thereby a manufacturing cost of a display device significantly increases, which is not conducive to a promotion and popularization of the high-density pixel display technology.

The above information disclosed in this section is just for understanding of the background of technical concept of the present disclosure. Therefore, the above information may include information that does not constitute the related art.

SUMMARY

In an aspect, a display substrate is provided, including: a base substrate; a plurality of sub-pixels provided on the base substrate, the plurality of sub-pixels are arranged in a first direction and a second direction, and at least one sub-pixel includes a light emitting element; a plurality of pixel driving circuits provided on the base substrate, the plurality of pixel driving circuits are arranged in the first direction and the second direction, the plurality of pixel driving circuits are configured to drive the light emitting elements of the plurality of sub-pixels respectively, and at least one pixel driving circuit includes at least two transistors; an initialization voltage signal line provided on the base substrate, the initialization voltage signal line includes a portion extending in the first direction, and the initialization voltage signal line is configured to provide an initialization voltage signal to the pixel driving circuit; and a control signal line provided on the base substrate, the control signal line includes a portion extending in the first direction, and the control signal line is configured to provide a control signal to the pixel driving circuit so as to control the at least two transistors of the pixel driving circuit to turn on, in a frame of driving the pixel driving circuits of a row of sub-pixels, the control signal on the control signal line controls the at least two transistors of the pixel driving circuit to turn on in at least one first time period, and the initialization voltage signal on the initialization voltage signal line is provided to the pixel driving circuit in a second time period, the first time period is separated from the second time period in timing; and the initialization voltage signal line and the control signal line are located in different conductive layers, an orthographic projection of the initialization voltage signal line on the base substrate overlaps at least partially with an orthographic projection of the control signal line on the base substrate, and in a sub-pixel, a ratio of an area of an overlapping portion to an area of the orthographic projection of the control signal line on the base substrate is in a range from 60% to 100%.

In some exemplary embodiments of the present disclosure, the pixel driving circuit includes a first reset transistor, and the first reset transistor includes a gate electrode, a source electrode, and a drain electrode; the initialization voltage signal line includes a first initialization voltage signal line electrically connected to the source electrode or the drain electrode of the first reset transistor; an orthographic projection of the first initialization voltage signal line on the base substrate overlaps at least partially with the orthographic projection of the control signal line on the base substrate; and the control signal line includes a reset control signal line.

In some exemplary embodiments of the present disclosure, the pixel driving circuit includes a second reset transistor, and the second reset transistor includes a gate electrode, a source electrode, and a drain electrode; the initialization voltage signal line includes a second initialization voltage signal line electrically connected to the source electrode or the drain electrode of the second reset transistor; and an orthographic projection of the second initialization voltage signal line on the base substrate overlaps at least partially with the orthographic projection of the control signal line on the base substrate, and the control signal line includes a scanning control signal line.

In some exemplary embodiments of the present disclosure, the pixel driving circuit includes a third reset transistor, and the third reset transistor includes a gate electrode, a source electrode, and a drain electrode; the initialization voltage signal line includes a third initialization voltage signal line electrically connected to the source electrode or the drain electrode of the third reset transistor; and an orthographic projection of the third initialization voltage signal line on the base substrate overlaps at least partially with the orthographic projection of the control signal line on the base substrate, and the control signal line includes a light emission control signal line.

In some exemplary embodiments of the present disclosure, the pixel driving circuit includes a first reset transistor, a second reset transistor, and a third reset transistor, and each of the first reset transistor, the second reset transistor and the third reset transistor includes a gate electrode, a source electrode, and a drain electrode; the initialization voltage signal line includes a first initialization voltage signal line electrically connected to the source electrode or the drain electrode of the first reset transistor; the initialization voltage signal line includes a second initialization voltage signal line electrically connected to the source electrode or the drain electrode of the second reset transistor; the initialization voltage signal line includes a third initialization voltage signal line electrically connected to the source electrode or the drain electrode of the third reset transistor; and an orthographic projection of at least one of the first initialization voltage signal line, the second initialization voltage signal line and the third initialization voltage signal line on the base substrate overlaps at least partially with the orthographic projection of the control signal line on the base substrate.

In some exemplary embodiments of the present disclosure, the pixel driving circuit further includes a data writing transistor and a light emission control transistor, the data writing transistor and the light emission control transistor respectively include a gate electrode, a source electrode, and a drain electrode, and the control signal line includes a first reset control signal line electrically connected to the gate electrode of the first reset transistor, a second reset control signal line electrically connected to the gate electrode of the second reset transistor or the gate electrode of the third reset transistor, a scanning control signal line electrically connected to the gate electrode of the data writing transistor, and a light emission control signal line electrically connected to the gate electrode of the light emission control transistor; the orthographic projection of the first initialization voltage signal line on the base substrate overlaps at least partially with an orthographic projection of the second reset control signal line on the base substrate; the orthographic projection of the first initialization voltage signal line on the base substrate does not overlap with an orthographic projection of the first reset control signal line on the base substrate; the orthographic projection of the first initialization voltage signal line on the base substrate does not overlap with an orthographic projection of the scanning control signal line on the base substrate; and the orthographic projection of the first initialization voltage signal line on the base substrate does not overlap with an orthographic projection of the light emission control signal line on the base substrate.

In some exemplary embodiments of the present disclosure, the orthographic projection of the second initialization voltage signal line on the base substrate overlaps at least partially with the orthographic projection of the scanning control signal line on the base substrate, the orthographic projection of the second initialization voltage signal line on the base substrate does not overlap with the orthographic projection of the second reset control signal line on the base substrate, and the orthographic projection of the second initialization voltage signal line on the base substrate does not overlap with the orthographic projection of the light emission control signal line on the base substrate.

In some exemplary embodiments of the present disclosure, the orthographic projection of the third initialization voltage signal line on the base substrate overlaps at least partially with the orthographic projection of the light emission control signal line on the base substrate; the orthographic projection of the third initialization voltage signal line on the base substrate does not overlap with the orthographic projection of the first reset control signal line on the base substrate; the orthographic projection of the third initialization voltage signal line on the base substrate does not overlap with the orthographic projection of the second reset control signal line on the base substrate; and the orthographic projection of the third initialization voltage signal line on the base substrate does not overlap with the orthographic projection of the scanning control signal line on the base substrate.

In some exemplary embodiments of the present disclosure, the display substrate includes: a first semiconductor layer provided on the base substrate; a first conductive layer provided on a side of the first semiconductor layer away from the base substrate; a second conductive layer provided on a side of the first conductive layer away from the base substrate; a second semiconductor layer provided on a side of the second conductive layer away from the base substrate; a third conductive layer provided on a side of the second semiconductor layer away from the base substrate; a fourth conductive layer provided on a side of the third conductive layer away from the base substrate; and a fifth conductive layer provided on a side of the fourth conductive layer away from the base substrate, and the first initialization voltage signal line is located in the third conductive layer, and the second reset control signal line is located in the first conductive layer.

In some exemplary embodiments of the present disclosure, the first reset transistor is an N-type transistor, the first reset control signal line includes a first reset control signal sub-line and a second reset control signal sub-line that are located in different conductive layers, and an orthographic projection of the first reset control signal sub-line on the base substrate overlaps at least partially with an orthographic projection of the second reset control signal sub-line on the base substrate.

In some exemplary embodiments of the present disclosure, the first reset transistor includes an active layer located in the second semiconductor layer.

In some exemplary embodiments of the present disclosure, the pixel driving circuit further includes a compensation transistor, the compensation transistor includes an active layer, a gate electrode, a source electrode, and a drain electrode, the active layer of the compensation transistor is located in the second semiconductor layer, the display substrate further includes a compensation control signal line provided on the base substrate, the compensation control signal line is electrically connected to the gate electrode of the compensation transistor, the compensation control signal line includes a first compensation control signal sub-line located in the second conductive layer and a second compensation control signal sub-line located in the third conductive layer, and an orthographic projection of the first compensation control signal sub-line on the base substrate overlaps at least partially with an orthographic projection of the second compensation control signal sub-line on the base substrate.

In some exemplary embodiments of the present disclosure, the scanning control signal line is located in the first conductive layer, and the second initialization voltage signal line is located in the fourth conductive layer.

In some exemplary embodiments of the present disclosure, the light emission control signal line is located in the first conductive layer, and the third initialization voltage signal line is located in the third conductive layer.

In some exemplary embodiments of the present disclosure, the second reset control signal line is located in the first conductive layer.

In some exemplary embodiments of the present disclosure, the display substrate further includes a first power signal line located on the base substrate, the first power signal line extends in the second direction, and two columns of sub-pixels share one first power signal line; the display substrate includes a first conductive transfer portion located in the second conductive layer, a first power signal line transfer portion located in the fourth conductive layer, and a second voltage signal line transfer portion located in the fourth conductive layer, the pixel driving circuits of two adjacent sub-pixels in a same row include respective first conductive transfer portions and second voltage signal line transfer portions, and the pixel driving circuits of two adjacent sub-pixels in the same row share the first power signal line transfer portion, and the first power signal line is electrically connected to the first power signal line transfer portion through a first via hole, two ends of the first power signal line transfer portion are respectively electrically connected to the first conductive transfer portions of the pixel driving circuits of two adjacent sub-pixels located in the same row through a second via hole, the first conductive transfer portion is electrically connected to one end of the second voltage signal line transfer portion through a third via hole, and the other end of the second voltage signal line transfer portion is electrically connected to a source electrode or a drain electrode of a first light emission control transistor through a fourth via hole.

In some exemplary embodiments of the present disclosure, the display substrate further includes a first initialization voltage connecting portion located in the fourth conductive layer, and one end of the first initialization voltage connecting portion is electrically connected to the first initialization voltage signal line through a fifth via hole, and the other end of the first initialization voltage connecting portion is respectively electrically connected to the source electrodes or the drain electrodes of the first reset transistors of two adjacent sub-pixels in the same row through a sixth via hole.

In some exemplary embodiments of the present disclosure, the display substrate further includes a second initialization voltage connecting portion located in the fourth conductive layer; two ends of the second initialization voltage connecting portion are respectively electrically connected to the third initialization voltage signal line through a seventh via hole, and a middle portion between the two ends is electrically connected to the source electrodes or the drain electrodes of the third reset transistors of two adjacent sub-pixels in the same row through an eighth via hole; and the second initialization voltage connecting portion is located between the first initialization voltage connecting portion and the second voltage signal line transfer portion in the first direction.

In some exemplary embodiments of the present disclosure, an orthographic projection of at least part of each of the first initialization voltage signal line, the second initialization voltage signal line and the third initialization voltage signal line on the base substrate does not overlap with the orthographic projection of the control signal line on the base substrate.

In some exemplary embodiments of the present disclosure, the first reset transistor is a P-type transistor, and the first reset control signal line is located in the first conductive layer; and the orthographic projection of the second initialization voltage signal line on the base substrate overlaps at least partially with the orthographic projection of the first reset control signal line on the base substrate.

In some exemplary embodiments of the present disclosure, the first reset transistor includes an active layer located in the first semiconductor layer.

In some exemplary embodiments of the present disclosure, the display substrate further includes at least one hollow region, the at least one hollow region includes a first side, a second side, a third side, and a fourth side, the first side and the second side are opposite sides of the at least one hollow region in the first direction, and the third side and the fourth side are opposite sides of the at least one hollow region in the second direction; the display substrate includes a plurality of data lines provided on the base substrate, the plurality of data lines respectively extend in the second direction, the plurality of data lines include a first data line and a second data line that are adjacent to the at least one hollow region, and the first data line and the second data line are respectively located on the first side and the second side of the at least one hollow region in the first direction; the first reset control signal line and the scanning control signal line are adjacent to the at least one hollow region, and are respectively located on the third side and the fourth side of the at least one hollow region in the second direction; and the first reset control signal line and the scanning control signal line respectively intersect with the first data line and the second data line so as to enclose to form the at least one hollow region.

In some exemplary embodiments of the present disclosure, the display substrate further includes at least one hollow region, the at least one hollow region includes a first side, a second side, a third side, and a fourth side, the first side and the second side are opposite sides of the at least one hollow region in the first direction, and the third side and the fourth side are opposite sides of the at least one hollow region in the second direction; the display substrate includes a plurality of data lines provided on the base substrate, the plurality of data lines respectively extend in the second direction, the plurality of data lines include a first data line and a second data line that are adjacent to the at least one hollow region, and the first data line and the second data line are respectively located on the first side and the second side of the at least one hollow region in the first direction; the first reset control signal line and a compensation control signal line are adjacent to the at least one hollow region, and are respectively located on the third side and the fourth side of the at least one hollow region in the second direction; and the first reset control signal line and the compensation control signal line respectively intersect with the first data line and the second data line so as to enclose to form the at least one hollow region.

In some exemplary embodiments of the present disclosure, each of the first data line and the second data line includes a body portion and a bending portion, the bending portion of the first data line is bent in a direction away from the at least one hollow region with respect to the body portion of the first data line, the bending portion of the second data line is bent in a direction away from the at least one hollow region with respect to the body portion of the second data line, and the bending portion of the first data line and the bending portion of the second data line are bent in opposite directions.

In some exemplary embodiments of the present disclosure, each of the first reset control signal line and the scanning control signal line includes a body portion and a bending portion, the bending portion of the first reset control signal line is bent in a direction away from the at least one hollow region with respect to the body portion of the first reset control signal line, the bending portion of the scanning control signal line is bent in a direction away from the at least one hollow region with respect to the body portion of the scanning control signal line, and the bending portion of the first reset control signal line and the bending portion of the scanning control signal line are bent in opposite directions.

In some exemplary embodiments of the present disclosure, each of the first reset control signal line and the compensation control signal line includes a body portion and a bending portion, the bending portion of the first reset control signal line is bent in a direction away from the at least one hollow region with respect to the body portion of the first reset control signal line, the bending portion of the compensation control signal line is bent in a direction away from the at least one hollow region with respect to the body portion of the compensation control signal line, and the bending portion of the first reset control signal line and the bending portion of the compensation control signal line are bent in opposite directions.

In some exemplary embodiments of the present disclosure, in a sub-pixel, the ratio of the area of the overlapping portion to the area of the orthographic projection of the control signal line on the base substrate is in a range of 80% to 95%.

In some exemplary embodiments of the present disclosure, the display substrate includes a data signal transfer portion located in the fourth conductive layer, a portion of the data signal transfer portion is electrically connected to the first data line or the second data line through the fifth via hole, and in a first region, an orthographic projection of the data signal transfer portion on the base substrate overlaps at least partially with the orthographic projection of the first reset control signal sub-line on the base substrate, the orthographic projection of the data signal transfer portion on the base substrate overlaps at least partially with the orthographic projection of the second reset control signal sub-line on the base substrate, and the orthographic projection of the first reset control signal sub-line on the base substrate does not overlap completely with the orthographic projection of the second reset control signal sub-line on the base substrate.

In another aspect, a display substrate is provided, including: a base substrate; a plurality of sub-pixels provided on the base substrate, the plurality of sub-pixels are arranged in a first direction and a second direction, and at least one sub-pixel includes a light emitting element; a plurality of pixel driving circuits provided on the base substrate, the plurality of pixel driving circuits are arranged in the first direction and the second direction, the plurality of pixel driving circuits are configured to drive the light emitting elements of the plurality of sub-pixels respectively, and at least one pixel driving circuit includes a first reset transistor, a second reset transistor, and a third reset transistor; an initialization voltage signal line provided on the base substrate, the initialization voltage signal line includes a portion extending in the first direction, the initialization voltage signal line is configured to provide an initialization voltage signal to the pixel driving circuit, the initialization voltage signal line includes a first initialization voltage signal line, a second initialization voltage signal line, and a third initialization voltage signal line, and the first initialization voltage signal line, the second initialization voltage signal line and the third initialization voltage signal line are respectively electrically connected to a first electrode of the first reset transistor, a first electrode of the second reset transistor and a first electrode of the third reset transistor; and a control signal line provided on the base substrate, the control signal line includes a portion extending in the first direction, and the control signal line is configured to provide a control signal to the pixel driving circuit so as to control at least two transistors of the pixel driving circuit to turn on, in a frame of driving the pixel driving circuits of a row of sub-pixels, the control signal on the control signal line controls, in at least one first time period, the at least two transistors of the pixel driving circuit to turn on, the initialization voltage signal on the initialization voltage signal line is provided to the pixel driving circuit in a second time period, and the first time period and the second time period are separated in a timing sequence; and the initialization voltage signal line and the control signal line are located in different conductive layers, an orthographic projection of each of the first initialization voltage signal line, the second initialization voltage signal line and the third initialization voltage signal line on the base substrate overlaps at least partially with an orthographic projection of the control signal line on the base substrate, and in a sub-pixel, a ratio of an area of an overlapping portion to an area of the orthographic projection of the control signal line on the base substrate is in a range from 60% to 100%.

In yet another aspect, a display device is provided, including the display substrate as described above.

BRIEF DESCRIPTION OF THE DRAWINGS

Features and advantages of the present disclosure will become more apparent by describing in detail the exemplary embodiments of the present disclosure with reference to the accompanying drawings. In the accompanying drawings:

FIG. 5 shows a partial plan view of a light shielding layer of the display substrate, FIG. 6 shows a partial plan view of a first semiconductor layer of the display substrate, FIG. 7 shows a partial plan view of a first conductive layer of the display substrate, FIG. 8 shows a partial plan view of a second conductive layer of the display substrate, FIG. 9 shows a partial plan view of a second semiconductor layer of the display substrate, FIG. 10 shows a partial plan view of a third conductive layer of the display substrate, FIG. 11 shows a partial plan view of a first insulation layer of the display substrate, in which a plurality of via holes located in the first insulation layer are schematically shown, FIG. 12 shows a partial plan view of a fourth conductive layer of the display substrate, FIG. 13 shows a partial plan view of a second insulation layer of the display substrate, in which a plurality of via holes located in the second insulation layer are schematically shown, and FIG. 14 shows a partial plan view of a fifth conductive layer of the display substrate;

FIG. 23 shows a partial plan view of a light shielding layer of the display substrate, FIG. 24 shows a partial plan view of a first semiconductor layer of the display substrate, FIG. 25 shows a partial plan view of a first conductive layer of the display substrate, FIG. 26 shows a partial plan view of a second conductive layer of the display substrate, FIG. 27 shows a partial plan view of a second semiconductor layer of the display substrate, FIG. 28 shows a partial plan view of a third conductive layer of the display substrate, FIG. 29 shows a partial plan view of a first insulation layer of the display substrate, in which a plurality of via holes located in the first insulation layer are schematically shown, FIG. 30 shows a partial plan view of a fourth conductive layer of the display substrate, FIG. 31 shows a partial plan view of a second insulation layer of the display substrate, in which a plurality of via holes located in the second insulation layer are schematically shown, and FIG. 32 shows a partial plan view of a fifth conductive layer of the display substrate;

DETAILED DESCRIPTION OF EMBODIMENTS

Figure 1:
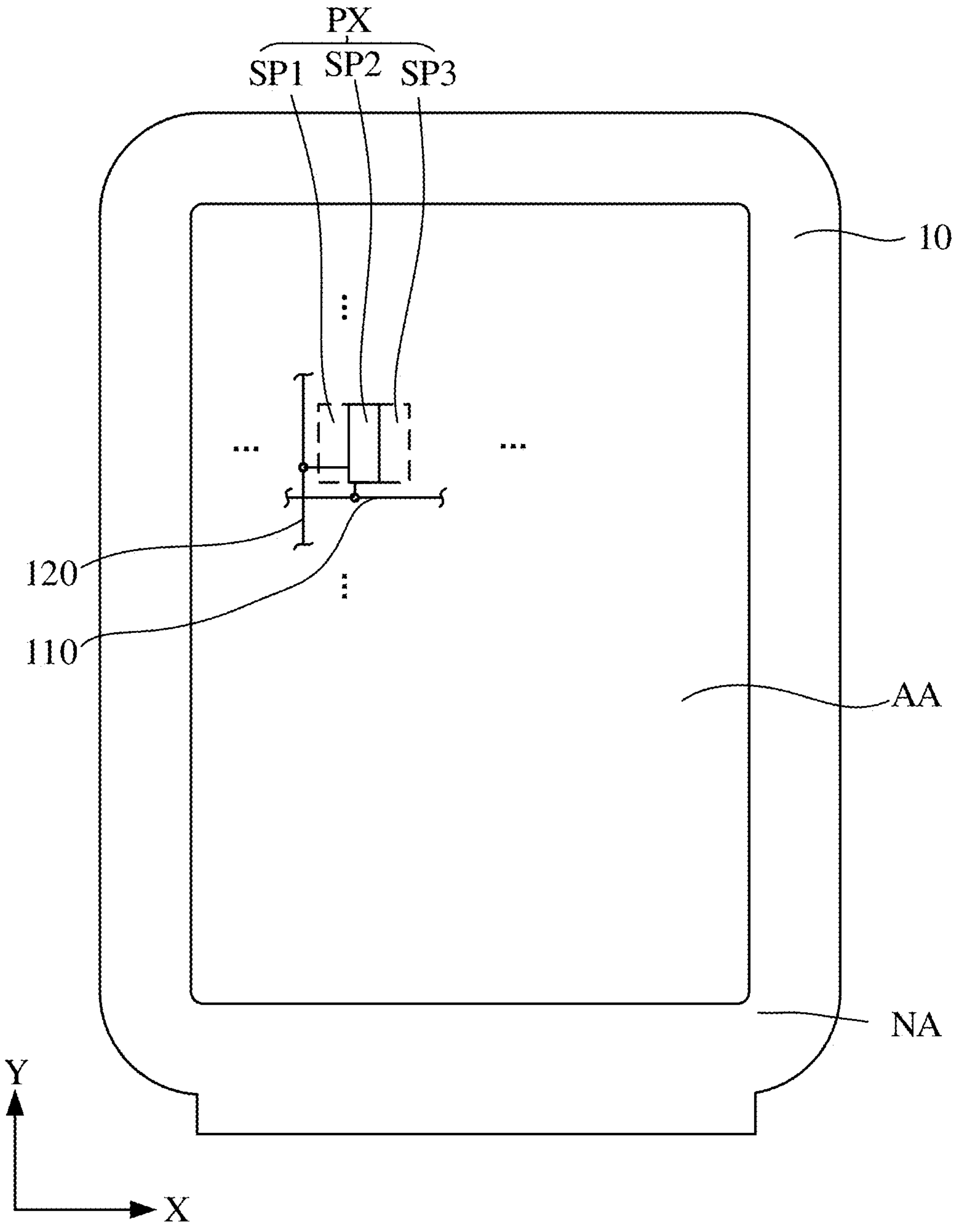
FIG. 1 shows a schematic plan view of a display substrate according to the embodiments of the present disclosure.

In order to make objectives, technical solutions and advantages of the present disclosure clearer, technical solutions of the embodiments of the present disclosure will be clearly and completely described below with reference to the accompanying drawings. Obviously, the described embodiments are just some embodiments of the present disclosure, rather than all embodiments. Based on the described embodiments of the present disclosure, all additional embodiments obtained by those ordinary skilled in the art without carrying out inventive effort fall within the scope of protection of the present disclosure.

It should be noted that in the accompanying drawings, for clarity and/or description purposes, a size and relative size of an element may be enlarged. Accordingly, the size and relative size of each element need not to be limited to those shown in the accompanying drawings. In the specification and the accompanying drawings, the same or similar reference numerals represent the same or similar components.

When an element is described as being "on", "connected to" or "coupled to" another element, the element may be directly on the another element, directly connected to the another element, or directly coupled to the another element, or an intermediate element may be provided. However, when an element is described as being "directly on", "directly connected to" or "directly coupled to" another element, no intermediate element is provided. Other terms and/or expressions used to describe a relationship between elements, such as "between" and "directly between", "adjacent to" and "directly adjacent to", "on" and "directly on", and so on, should be interpreted in a similar manner. Moreover, the term "connection" may refer to a physical connection, an electrical connection, a communicative connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For objectives of the present disclosure, "at least one selected from X, Y and Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of the listed related items.

It should be noted that although the terms "first", "second", and so on may be used here to describe various components, members, elements, regions, layers and/or portions, these components, members, elements, regions, layers and/or portions should not be limited by these terms. Rather, these terms are used to distinguish one component, member, element, region, layer and/or portion from another one. Thus, for example, a first component, a first member, a first element, a first region, a first layer and/or a first portion discussed below may be referred to as a second component, a second member, a second element, a second region, a second layer and/or a second portion without departing from teachings of the present disclosure.

For ease of description, spatial relationship terms, such as "upper", "lower", "left", "right", may be used here to describe a relationship between an element or feature and another element or feature as shown in the drawings. It should be understood that the spatial relationship terms are intended to cover other different orientations of a device in use or operation in addition to the orientation described in the drawings. For example, if a device in the drawing is turned upside down, an element or feature described as "below" or "under" another element or feature will be oriented "above" or "on" the another element or feature.

It should be noted that the expression "the same layer" herein refers to a layer structure that is formed by firstly forming, using a same film forming process, a film layer used to form a specific pattern, and then patterning, using one-time patterning process, the film layer with a same mask. Depending on different specific patterns, the one-time patterning process may include a plurality of exposure, development or etching processes, and the specific pattern in the formed layer structure may be continuous or discontinuous. That is, a plurality of elements, components, structures and/or portions located in the "same layer" are made of the same material and formed by the same patterning process. Generally, a plurality of elements, components, structures and/or portions located in the "same layer" have substantially the same thickness.

Those skilled in the art should understand that, unless otherwise specified, the expression "height" or "thickness" herein refers to a size in a direction perpendicular to a surface of each film layer provided on the display substrate, that is, a size in a light emitting direction of the display substrate, or referred to as a size in a normal direction of the display device.

Herein, directional expressions "first direction" and "second direction" are used to describe different directions along a pixel region, e.g., a longitudinal direction and a lateral direction of the pixel region, or a row direction and a column direction in which the sub-pixels are arranged. It should be understood that such expressions are just exemplary descriptions and are not limitations to the present disclosure.

Transistors used in the embodiments of the present disclosure may all be thin film transistors or field effect transistors or other devices with the same characteristics. Since the thin film transistor used here have symmetrical source electrode and drain electrode, the source electrode and the drain electrode thereof may be interchanged. In the embodiments of the present disclosure, the transistor may include a gate electrode, a first electrode, and a second electrode. The first electrode may represent one of the source electrode and the drain electrode, and the second electrode may represent the other of the source electrode and the drain electrode. In the following examples, a case of a P-type thin film transistor serving as a driving transistor is mainly described, and other transistors are of the same or different types as or from the driving transistor according to a circuit design. Similarly, in other embodiments, the driving transistor may also be shown as an N-type thin film transistor.

Herein, the expression "PPI" (Pixels Per Inch) represents a pixel density, which represents a number of pixels per inch. Generally, the higher the PPI value, the higher the density at which the display device may display an image.

Some exemplary embodiments of the present disclosure provide a display substrate. The display substrate includes: a base substrate; a plurality of sub-pixels provided on the base substrate, the plurality of sub-pixels are arranged in a first direction and a second direction, and at least one sub-pixel includes a light emitting element; a plurality of pixel driving circuits provided on the base substrate, the plurality of pixel driving circuits are arranged in the first direction and the second direction and used to drive the light emitting elements of the plurality of sub-pixels respectively, and at least one pixel driving circuit includes at least one transistor; an initialization voltage signal line provided on the base substrate, the initialization voltage signal line extends in the first direction, and the initialization voltage signal line is used to provide an initialization voltage signal to the pixel driving circuit; and a control signal line provided on the base substrate, the control signal line extends in the first direction, and the control signal line is used to provide a control signal to the pixel driving circuit so as to control the at least one transistor of the pixel driving circuit to turn on; in a frame of driving the pixel driving circuits of a row of sub-pixels, the control signal on the control signal line controls, in at least one first time period, the at least one transistor of the pixel driving circuit to turn on, the initialization voltage signal on the initialization voltage signal line is provided to the pixel driving circuit in a second time period, and the first time period and the second time period are separated in a timing sequence; the initialization voltage signal line and the control signal line are located in different conductive layers, an orthographic projection of the initialization voltage signal line on the base substrate overlaps at least partially with an orthographic projection of the control signal line on the base substrate, and in a sub-pixel, a ratio of an area of an overlapping portion to an area of the orthographic projection of the initialization voltage signal line on the base substrate or an area of the orthographic projection of the control signal line on the base substrate is in a range from 60% to 100%. In the embodiments of the present disclosure, a stack design is adopted for the signal lines separated in the timing sequence to effectively optimize a layout design of the pixel driving circuit, which may help achieve a high PPI pixel design and improve a display quality of a display device on a basis of meeting a process specification.

FIG. 1 shows a schematic plan view of a display substrate according to the embodiments of the present disclosure. Referring to FIG. 1, the display substrate according to the embodiments of the present disclosure may include a base substrate 10 and a pixel unit PX provided on the base substrate 10.

The display substrate may include a display region AA and a non-display region NA. The display region AA may be a region in which a pixel unit PX for displaying an image is provided. Each pixel unit PX will be described later. The non-display region NA is a region in which no pixel unit PX is provided, that is, a region in which no image is displayed. The non-display region NA corresponds to a bezel in a final display device, and a width of the bezel may be determined according to a width of the non-display region NA.

The display region AA may have various shapes. For example, the display region AA may be provided in various shapes such as a closed polygon including straight sides (e.g., a rectangle), a circle or an ellipse, etc. including a curved side, and a semicircle or a semi-ellipse, etc. including a straight side and a curved side. In the embodiments of the present disclosure, the display region AA is provided as a region having a quadrangular shape including straight sides. It should be understood that this is just an exemplary embodiment of the present disclosure, rather than a limitation to the present disclosure.

The non-display region NA may be arranged on at least one side of the display region AA. In the embodiments of the present disclosure, the non-display region NA may surround a periphery of the display region AA. In the embodiments of the present disclosure, the non-display region NA may include a lateral portion extending in a first direction X and a longitudinal portion extending in a second direction Y.

The pixel unit PX is arranged in the display region AA. The pixel unit PX is a minimum unit for displaying an image, and a plurality of pixel units may be provided. For example, the pixel unit PX may include light emitting devices that emit white light and/or color light.

A plurality of pixel units PX may be provided in a form of a matrix along rows extending in the first direction X and columns extending in the second direction Y. However, the embodiments of the present disclosure do not specifically limit an arrangement form of the pixel units PX, and the pixel units PX may be arranged in various forms. For example, the pixel units PX may be arranged such that a direction inclined with respect to the first direction X and the second direction Y is a column direction, and a direction intersecting the column direction is a row direction.

That is, a plurality of pixel units PX are arranged in an array in the first direction X and the second direction Y so as to form a plurality of rows of pixel units and a plurality of columns of pixel units.

A pixel unit PX may include a plurality of sub-pixels. For example, a pixel unit PX may include three sub-pixels, namely a first sub-pixel SP1, a second sub-pixel SP2, and a third sub-pixel SP3. For example, the first sub-pixel SP1 may be a red sub-pixel, the second sub-pixel SP2 may be a green sub-pixel, and the third sub-pixel SP3 may be a blue sub-pixel.

It should be noted that, in the embodiments of the present disclosure, the number of sub-pixels included in a pixel unit is not particularly restricted, and is not limited to three as described above.

For example, in the exemplary embodiments shown in FIG. 1, a scanning control signal line 110 and a data line 120 are schematically shown. That is, the display substrate may further include a plurality of scanning control signal lines 110 and a plurality of data lines 120 provided on the base substrate. The plurality of scanning control signal lines 110 supply scanning control signals respectively to the plurality of rows of pixel units, and the plurality of data lines 120 supply data signals respectively to the plurality of columns of pixel units. The scanning control signal line 110 extends in the first direction X, and the plurality of scanning control signal lines 110 are spaced apart in the second direction Y. The data line 120 extends in the second direction Y, and the plurality of data lines 120 are spaced apart in the first direction X.

For example, the scanning control signal line 110 may be a representative of lateral wires, and the data line 120 may be a representative of longitudinal wires. It should be understood that the lateral wires may further include other types of wires or wires used to supply other signals, and the longitudinal wires may further include other types of wires or wires used to supply other signals.

Each sub-pixel may include a light emitting element and a pixel driving circuit used to drive the light emitting element. For example, in an OLED display substrate or display panel, the light emitting element of the sub-pixel may include an anode, a luminescent material layer and a cathode that are arranged in a stack. The anodes of the light emitting elements of the sub-pixels are spaced apart and arranged in a form of a matrix along rows extending in the first direction X and columns extending in the second direction Y.

Hereinafter, an 8T1C (i.e., eight transistors and one capacitor) pixel driving circuit is illustrated by way of example in describing a structure of the pixel driving circuit in detail. However, the embodiments of the present disclosure are not limited to the 8T1C pixel driving circuit, and other known pixel driving circuit structures may also be applied to the embodiments of the present disclosure in a case of no conflict. It should be noted that in the embodiments of the present disclosure, in addition to the 8T1C structure shown in FIG. 2, each pixel driving circuit may be a structure including other numbers of transistors, such as a 7T1C structure, a 7T2C structure, a 6T1C structure, a 6T2C structure, or a 9T2C structure, which are not limited in the embodiments of the present disclosure.

Figure 2:
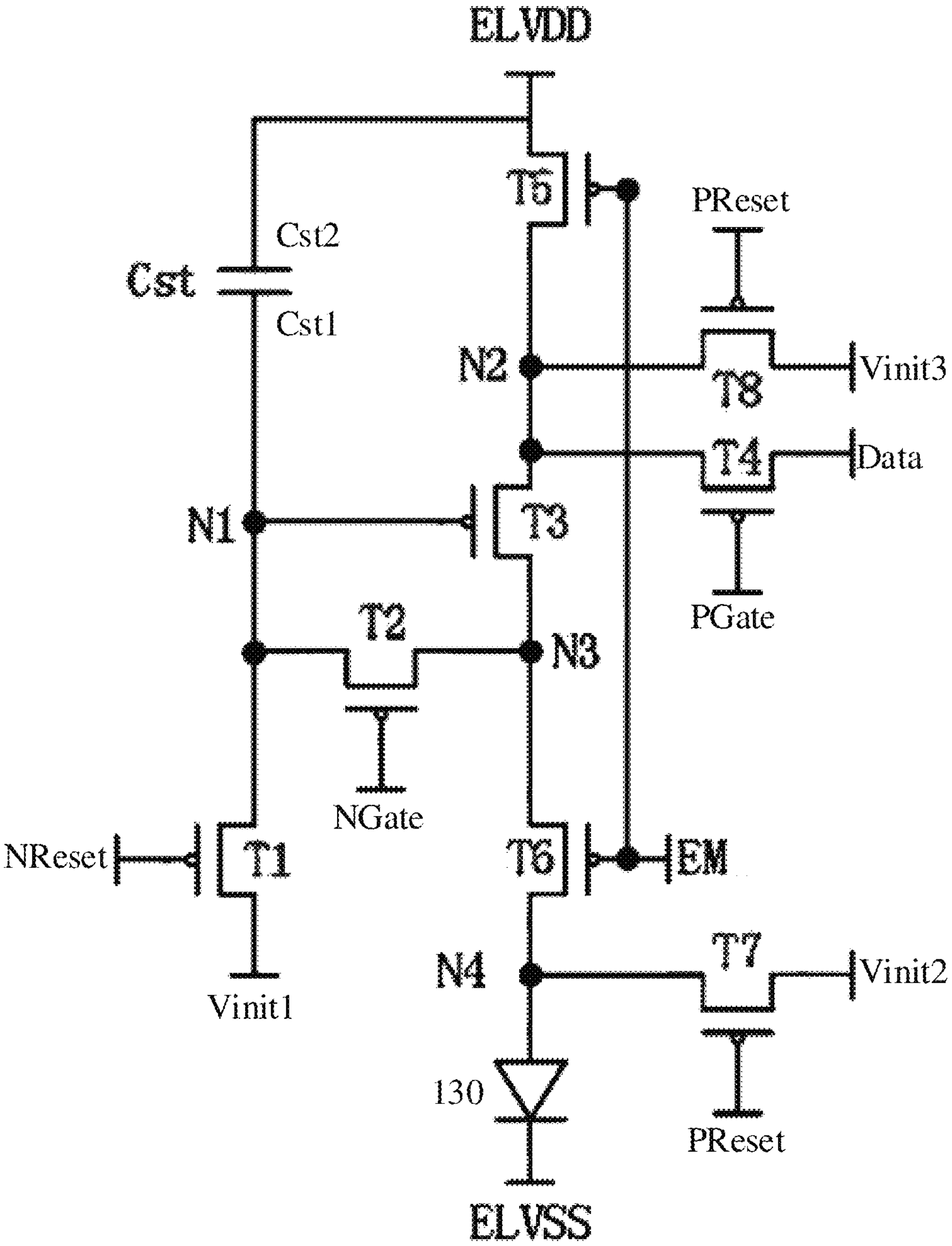
FIG. 2 shows an equivalent circuit diagram of a pixel driving circuit of a display substrate according to some exemplary embodiments of the present disclosure.

FIG. 2 shows an equivalent circuit diagram of a pixel driving circuit of a display substrate according to some exemplary embodiments of the present disclosure. The pixel driving circuit is used to drive an organic light emitting diode (OLED). Referring to FIG. 2, the pixel driving circuit may include a first reset transistor T1, a compensation transistor T2, a driving transistor T3, a data writing transistor T4, a first light emission control transistor T5, a second light emission control transistor T6, a second reset transistor T7, a third reset transistor T8, and a storage capacitor Cst. The display substrate further includes a first scanning control signal line 81 (corresponding to a first scanning control signal PGate in FIG. 2), a second scanning control signal line 82 (corresponding to a second scanning control signal NGate in FIG. 2), a first reset control signal line 83 (corresponding to a first reset control signal PReset in FIG. 2), a second reset control signal line 84 (corresponding to a second reset control signal NReset in FIG. 2), a light emission control signal line 85 (corresponding to a light emission control signal EM in FIG. 2), a first initialization voltage signal line 86 (corresponding to a first initialization voltage signal Vinit1 in FIG. 2), a second initialization voltage signal line 87 (corresponding to a second initialization voltage signal Vinit2 in FIG. 2), a third initialization voltage signal line 88 (corresponding to a third initialization voltage signal Vinit3 in FIG. 3), a data line 91 (corresponding to a data signal Data in FIG. 2), a first power signal line 92 (corresponding to a first power signal ELVDD in FIG. 2), and a second power signal line (corresponding to a second power signal ELVSS in FIG. 2).

Continuing to refer to FIG. 2, the first reset transistor T1 has a first electrode electrically connected to the first initialization voltage signal line 86, a second electrode electrically connected to a gate electrode of the driving transistor T3, i.e., at a node N1, and a gate electrode electrically connected to the first reset control signal line 83. Under a control of the first reset control signal line 83, a first initialization voltage signal Vinit1 transmitted by the first initialization voltage signal line 86 is selectively written to the node N1.

The compensation transistor T2 has a first electrode electrically connected to a first electrode of the driving transistor T3, i.e., at a node N3, a second electrode electrically connected to the gate electrode of the driving transistor T3, i.e., at the node N1, and a gate electrode electrically connected to the second scanning control signal line 82 so as to receive a compensation control signal.

The driving transistor T3 has the first electrode electrically connected to the first electrode of the compensating transistor T2, i.e., at the node N3, a second electrode electrically connected to a second electrode of the first light emission control transistor T5, i.e., at a node N2, and the gate electrode electrically connected to the node N1.

The data writing transistor T4 has a first electrode electrically connected to the second electrode of the driving transistor T3, i.e., at the node N2, a second electrode electrically connected to the data line 91 so as to receive a data signal, and a gate electrode electrically connected to the first scanning control signal line 81 so as to receive a first scanning control signal. Under a control of the first scanning control signal, the data signal is selectively written to the node N2.

The first light emission control transistor T5 has a first electrode electrically connected to the first power signal line 92 so as to receive a first power signal ELVDD, a second electrode electrically connected to the second electrode of the driving transistor T3 (i.e., at the node N2), and a gate electrode electrically connected to the light emission control signal line 85 so as to receive a light emission control signal EM.

The second light emission control transistor T6 has a first electrode electrically connected to the first electrode of the driving transistor T3 (i.e., at the node N3), a second electrode electrically connected to a first electrode of a light emitting element 130 (i.e., at a node N4), and a gate electrode electrically connected to the light emission control signal line 85 so as to receive a light emission control signal EM.

The second reset transistor T7 has a first electrode electrically connected to the second initialization voltage signal line 87 so as to receive a second initialization voltage signal Vinit2, a second electrode electrically connected to the first electrode of the light emitting element 130 (i.e., at the node N4), and a gate electrode electrically connected to the second reset control signal line 84 so as to receive a second reset control signal.

The third reset transistor T8 has a first electrode electrically connected to the third initialization voltage signal line 88 so as to receive a third initialization voltage signal Vinit3, a second electrode electrically connected to the second electrode of the driving transistor T3 (i.e., at the node N2), and a gate electrode electrically connected to the second reset control signal line 84 so as to receive a second reset control signal.

The storage capacitor Cst has one end (hereinafter referred to as a first capacitor electrode) Cst1 electrically connected to the gate electrode of the driving transistor T3 (i.e., at the node N1), and the other end (hereinafter referred to as a second capacitor electrode) Cst2 electrically connected to the first power signal line 92. The cathode of the light emitting element 130 is electrically connected to the second power signal line so as to receive a second power signal ELVSS. Accordingly, the light emitting element 130 receives a driving current from the driving transistor T3 so as to emit light, thereby displaying an image.

For example, the first power signal line 92 and the second power signal line mentioned above may be signal lines for respectively transmitting voltage signals ELVDD and ELVSS, and may be connected to a voltage source to output constant voltage signals, such as a positive voltage signal and a negative voltage signal.

It should be noted that transistors may be divided into N-type transistors and P-type transistors according to different semiconductor characteristics. When a transistor serves as a switching transistor, an N-type switching transistor is turned on under a control of a high-level switching control signal and turned off under a control of a low-level switching control signal, while a P-type switching transistor is turned on under a control of a low-level switching control signal and turned off under a control of a high-level switching control signal.

In the embodiments of the present disclosure, the pixel driving circuit may be an LTPO circuit, which is prepared using a low temperature poly silicon (LTPS) technology and oxide (IGZO). In a low temperature poly silicon (LTPS) thin film transistor, an active layer may be formed using a poly silicon deposition. The LTPS has a high electron mobility, a fast response speed, and advantages such as high brightness, high resolution, and low power consumption, etc. In an oxide thin-film transistor (oxide TFT), for example, an oxide semiconductor such as indium gallium zinc oxide (IGZO) may be used as an active layer of TFT. The oxide semiconductor has a high electron mobility and good turn-off characteristics. Compared with LTPS, the oxide semiconductor has a simple manufacture process and a high compatibility with an amorphous silicon manufacture process. Certainly, the oxide thin-film transistor may also be other metal oxide semiconductors, such as indium zinc tin oxide (IZTO) or indium gallium zinc tin oxide (IGZTO), etc. The use of oxide thin-film transistor may effectively reduce a size of the transistor and prevent a leakage current, so that the pixel circuit may be applied to low-frequency driving, while a resolution of the display substrate may be improved.

In some exemplary embodiments of the present disclosure, an exemplary 8T1C circuit includes eight thin film transistors (T1~T8), where T1 and T2 are N-type thin film transistors NMOS using oxide TFT, and the others are P-type thin film transistor PMOS using LTPS TFT. Accordingly, the reset control signal applied to the gate electrode of the transistor T1 is referred to as NReset, the scanning control signal applied to the gate electrode of the transistor T2 is referred to as NGate, the scanning control signal applied to the gate electrode of the transistor T4 is referred to as PGate, and the reset control signal applied to the gate electrodes of the transistors T7 and T8 is referred to as PReset.

It should be noted that in the above descriptions, the node N1, the node N2, the node N3 and the node N4 do not represent actual components, but represent junction points of relevant circuit connections in the circuit diagram.

It should also be noted that in the embodiments of the present disclosure, a valid signal (level) refers to a signal (level) used to turn on a corresponding switching element, and an invalid signal (level) refers to a signal (level) used to turn off a corresponding switching element. Such explanation also applies to other embodiments of the present disclosure. The valid level and the invalid level just represent that the level of the signal has two state variables, and do not represent that the valid level or the invalid level has a specific value.

Figure 3:
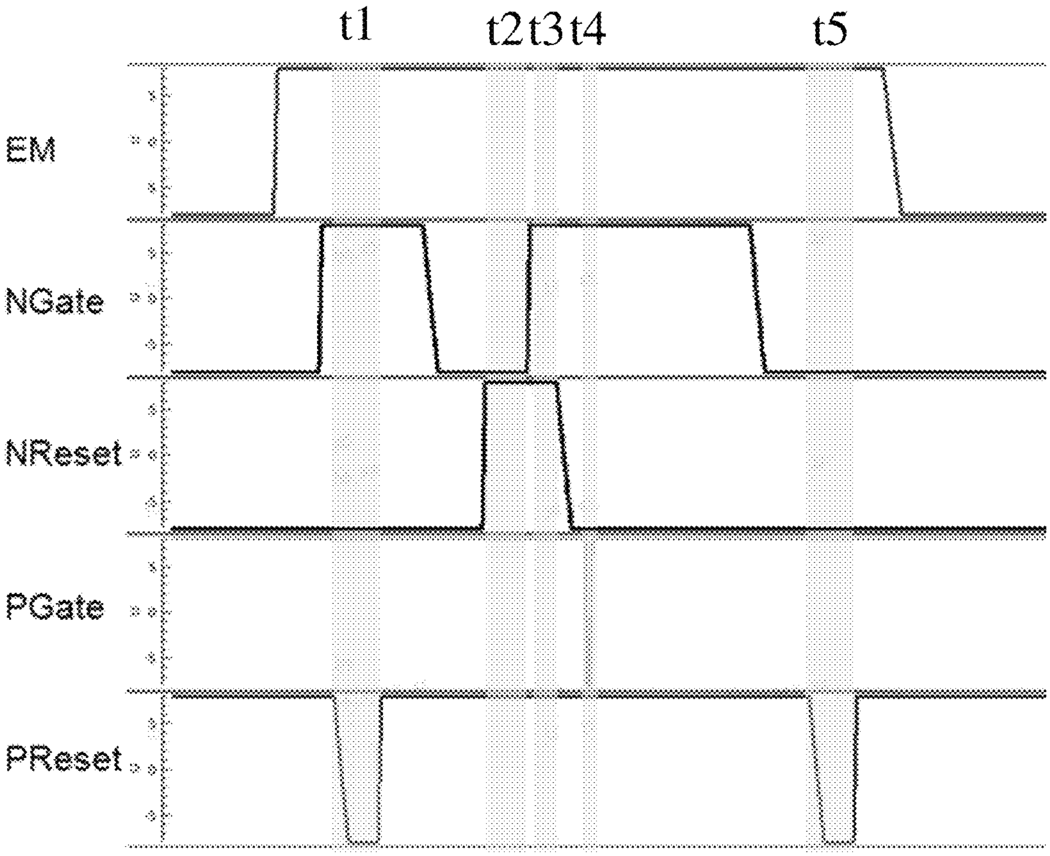
FIG. 3 shows a timing sequence diagram of signals used to drive a pixel driving circuit according to some exemplary embodiments of the present disclosure.

FIG. 3 shows a timing sequence diagram of signals used to drive a pixel driving circuit according to some exemplary embodiments of the present disclosure. Referring to FIG. 2 and FIG. 3, the embodiments of the present disclosure provide a method for driving a pixel driving circuit, which is applied to a pixel driving circuit described in any embodiment of the present disclosure. A refresh driving cycle (i.e., a frame) of the driving method may include a first reset stage, a write stage t4, and a first bias stage t5. It should be noted that in the embodiments of FIG. 3, EM represents a light emission control signal transmitted on the light emission control signal line 85, NGate represents a second scanning control signal transmitted on the second scanning control signal line 82, NReset represents a first reset control signal transmitted on the first reset control signal line 83, PGate represents a first scanning control signal transmitted on the first scanning control signal line 81, and PReset represents a second reset control signal transmitted on the second reset control signal line 84.

For example, in the embodiment, the first reset stage may include a first reset sub-stage t1, a second reset sub-stage t2, and a third reset sub-stage t3. In the first reset sub-stage t1, the second reset sub-stage t2 and the third reset sub-stage t3, the nodes N1, N2 and N3 of the driving transistor T3 are selectively reset.

In the write stage t4, EM is at a high level, NGate is at a high level, NReset is at a low level, PGate is at a low level, and PReset is at a high level. The compensation transistor T2 and the data writing transistor T4 are turned on. In this stage, the driving transistor T3 is turned on, the data signal is applied to the gate electrode of the driving transistor T3 through the data writing transistor T4 and the compensation transistor T2 so as to achieve writing of the data signal and achieve a voltage compensation for the gate electrode of the driving transistor T3. In this stage, a voltage at the node N1 is Vdata+Vth, a voltage at the node N2 is Vdata, and a voltage at the node N3 is Vdata, where Vth is a threshold voltage of the driving transistor T3.

In the first bias stage t5, EM is at a high level, NGate is at a low level, NReset is at a low level, PGate is at a high level, and PReset is at a low level. The second reset transistor T7 and the third reset transistor T8 are turned on. In this stage, the driving transistor T3 is turned on, and the third initialization voltage signal Vinit3 is applied to the first electrode and the second electrode of the driving transistor T3 through the third reset transistor T8. In this stage, the voltage at the node N1 is Vdata+Vth, the voltage at the node N2 is Vinit3, and the voltage at the node N3 is Vinit3, where Vth is the threshold voltage of the driving transistor T3. In this stage, the node N2 and the node N3 are reset to a high voltage by the third reset transistor T8, which is equivalent to adding a negative bias voltage to the gate-source electrode of the driving transistor T3, so that a recovery process of the threshold voltage of the driving transistor T3 may change again in the light emitting stage.

It should be noted that the refresh driving cycle (i.e., a frame) of the driving method may further include a first light emitting stage t6, in which the light emitting element 130 emits light in response to a driving current of the driving transistor T3. The light emission control signal EM is at a low level, the first light emission control transistor T5 and the second light emission control transistor T6 are turned on at the low level, and the driving transistor T3 is turned on. The other transistors are in an off state under a control of corresponding switching control signals.

The driving transistor T3 operates in a saturation state. According to saturation state current characteristics, a saturation current I flowing through the driving transistor T3 and used to drive the light emitting element 130 to emit light is directly proportional to $(Vdata-VDD)^2$. It can be seen that a working current of the light emitting element 130 is not affected by the threshold voltage Vth of the driving transistor T3, so that a drift of the threshold voltage Vth of the driving transistor T3 caused by a manufacture process and a long-term operation may be completely solved, a problem of low-frequency flicker, etc. may be effectively improved, thereby a non-uniform panel display may be improved.

Referring to FIG. 2 and FIG. 3 in combination, in the timing sequence diagram, the second reset control signal PReset transmitted on the second reset control signal line 84 is in a valid state in stages t1 and t5, while in stages t1 and t5, the first reset control signal NReset transmitted on the first reset control signal line 83 is at a low level, that is, the first reset transistor T1 is in an off state. At this time, the first initialization voltage signal Vinit1 may not be transmitted to the node N1 through the first reset transistor T1. In fact, the first reset control signal NReset transmitted on the first reset control signal line 83 is at a high level in stages t2 and t3, that is, the first reset transistor T1 is turned on in stages t2 and t3. That is to say, the second reset control signal PReset transmitted on the second reset control signal line 84 is separated from the first initialization voltage signal Vinit1 in the timing sequence.

In the timing sequence diagram, the first scanning control signal PGate transmitted on the first scanning control signal line 81 is in a valid state in stage t4, while in stage t4, the second reset control signal PReset transmitted on the second reset control signal line 84 is at a high level, that is, the second reset transistor T7 and the third reset transistor T8 are both in an off state. At this time, the second initialization voltage signal Vinit2 may not be transmitted to the node N4 through the second reset transistor T7, and the third initialization voltage signal Vinit3 may not be transmitted to the node N2 through the third reset transistor T8. In fact, the second reset control signal PReset transmitted on the second reset control signal line 84 is at a low level in stages t1 and t5, that is, the second reset transistor T7 and the third reset transistor T8 are turned on in stages t1 and t5. That is to say, the first scanning control signal PGate transmitted on the first scanning control signal line 81 is separated from the second initialization voltage signal Vinit2 in the timing sequence.

In the timing sequence diagram, the light emission control signal EM transmitted on the light emission control signal line 85 is in an invalid state in stages t1 to t5, and the second reset control signal PReset transmitted on the second reset control signal line 84 is at a low level in stages t1 and t5, that is, the second reset transistor T7 and the third reset transistor T8 are turned on in stages t1 and t5. That is to say, the light emission control signal EM transmitted on the light emission control signal line 85 is separated from the third initialization voltage signal Vinit3 in the timing sequence.

In the embodiments of the present disclosure, a stack design may be adopted for the signal lines used to transmit signals separated in the timing sequence. For example, since the second reset control signal PReset transmitted on the second reset control signal line 84 is separated from the first initialization voltage signal Vinit1 in the timing sequence, the second reset control signal line 84 and the first initialization voltage signal line 86 may be stacked; since the first scanning control signal PGate transmitted on the first scanning control signal line 81 is separated from the second initialization voltage signal Vinit2 in the timing sequence, the first scanning control signal line 81 and the second initialization voltage signal line 87 may be stacked; since the light emission control signal EM transmitted on the light emission control signal line 85 is separated from the third initialization voltage signal Vinit3 in the timing sequence, the light emission control signal line 85 and the third initialization voltage signal line 88 may be stacked. In this way, since the signals transmitted on stacked signal lines are staggered in the timing sequence, there is no adverse effect on the signals. Moreover, it is possible to effectively utilize a space of the display substrate for layout, which may help achieve a high PPI display panel.

Figure 4:
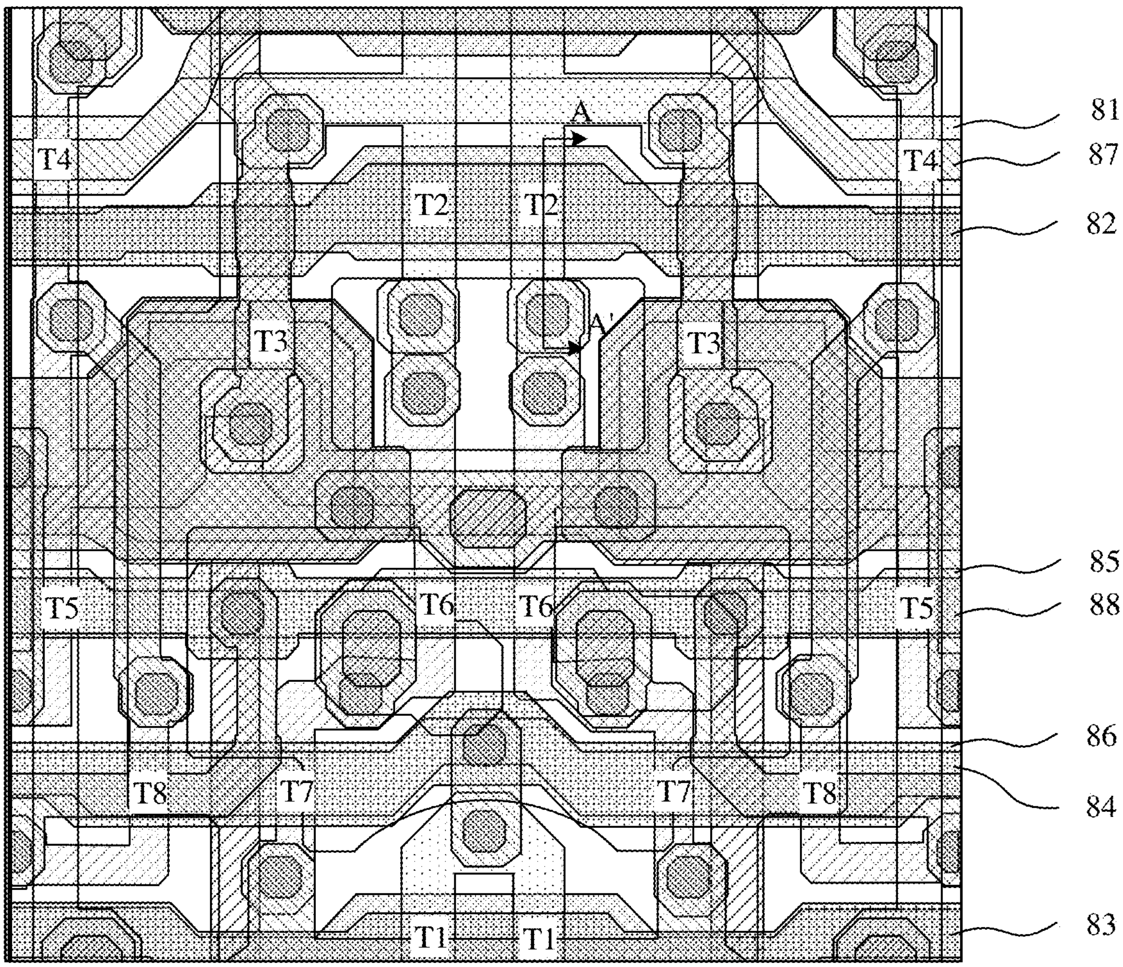
FIG. 4 shows a partial plan view of a display substrate according to some exemplary embodiments of the present disclosure.
Figure 5:
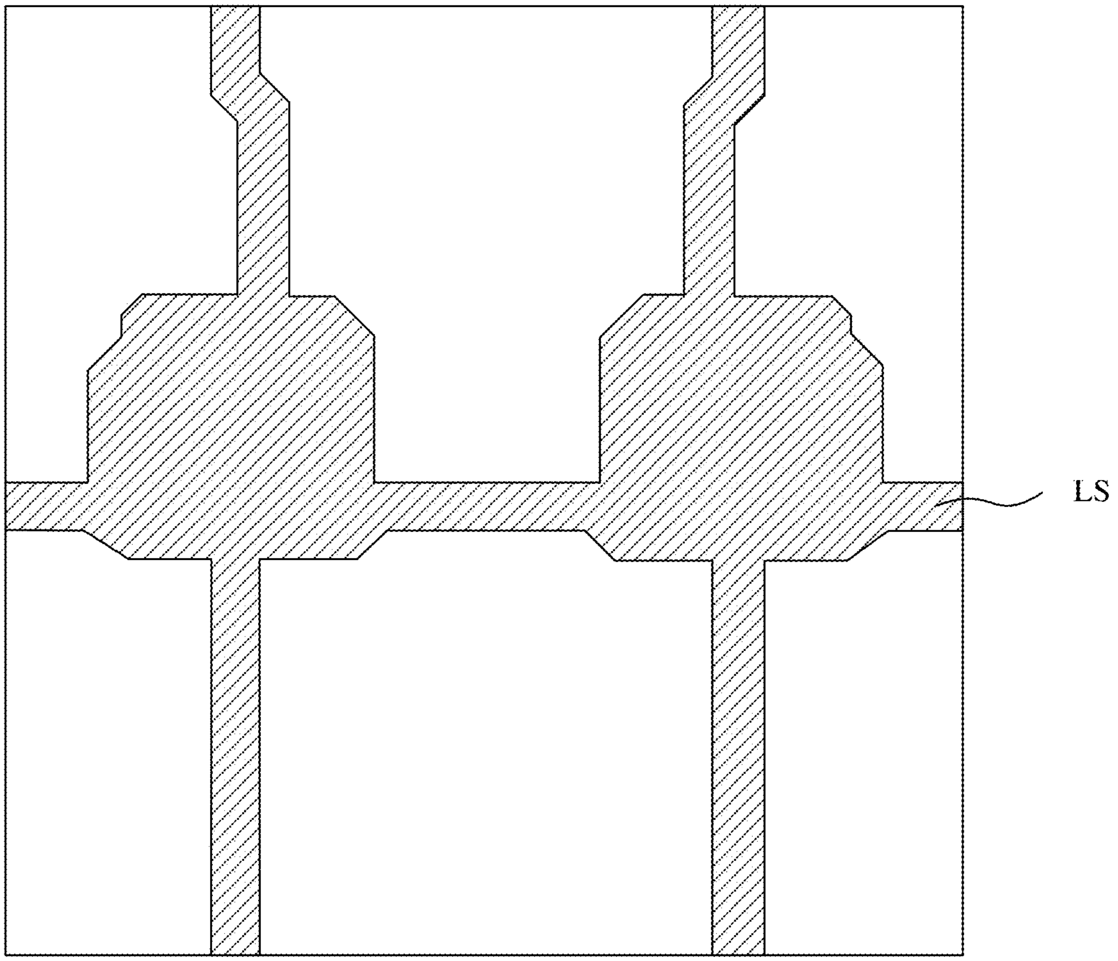
FIG. 5 to FIG. 14 respectively show partial plan views of a display substrate according to some exemplary embodiments of the present disclosure, where
Figure 6:
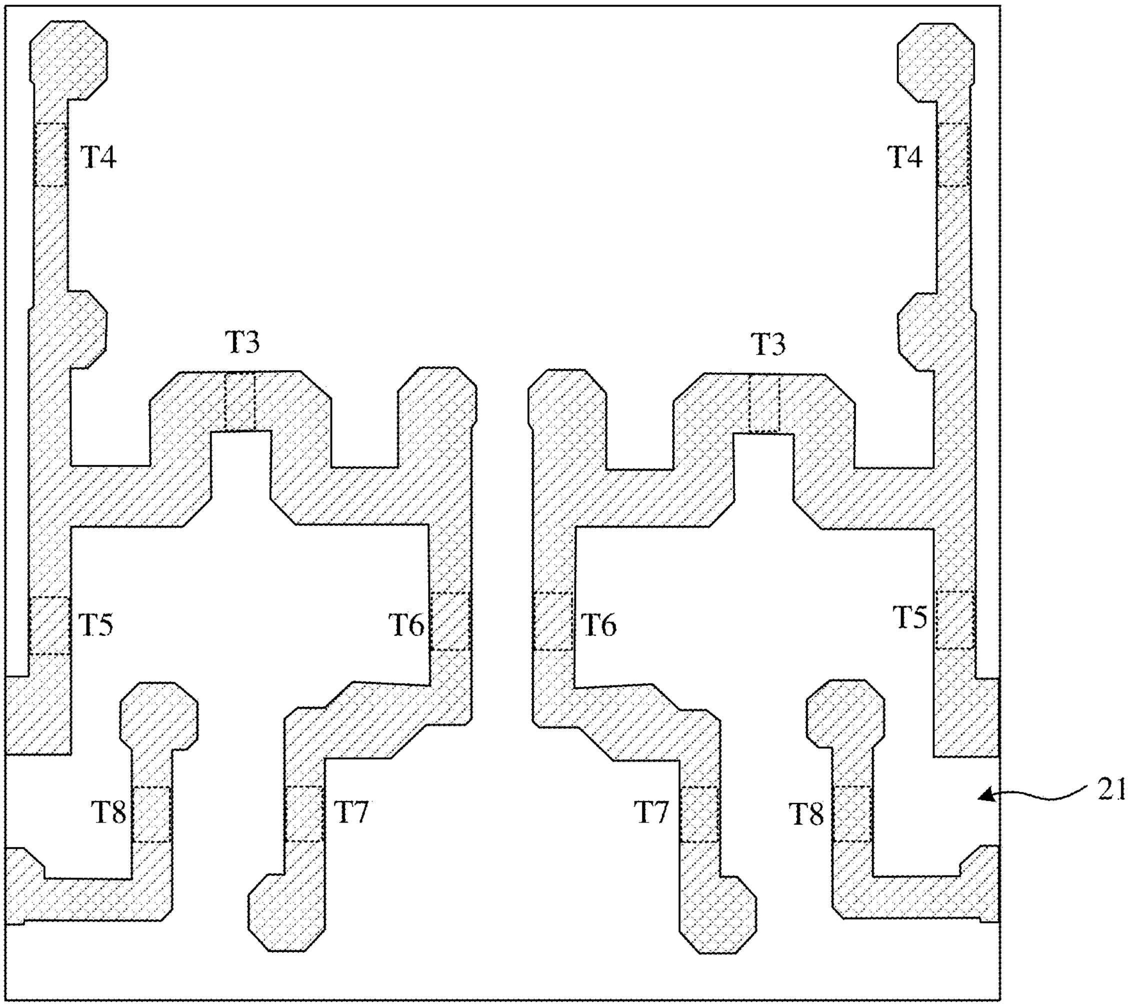
Figure 7:
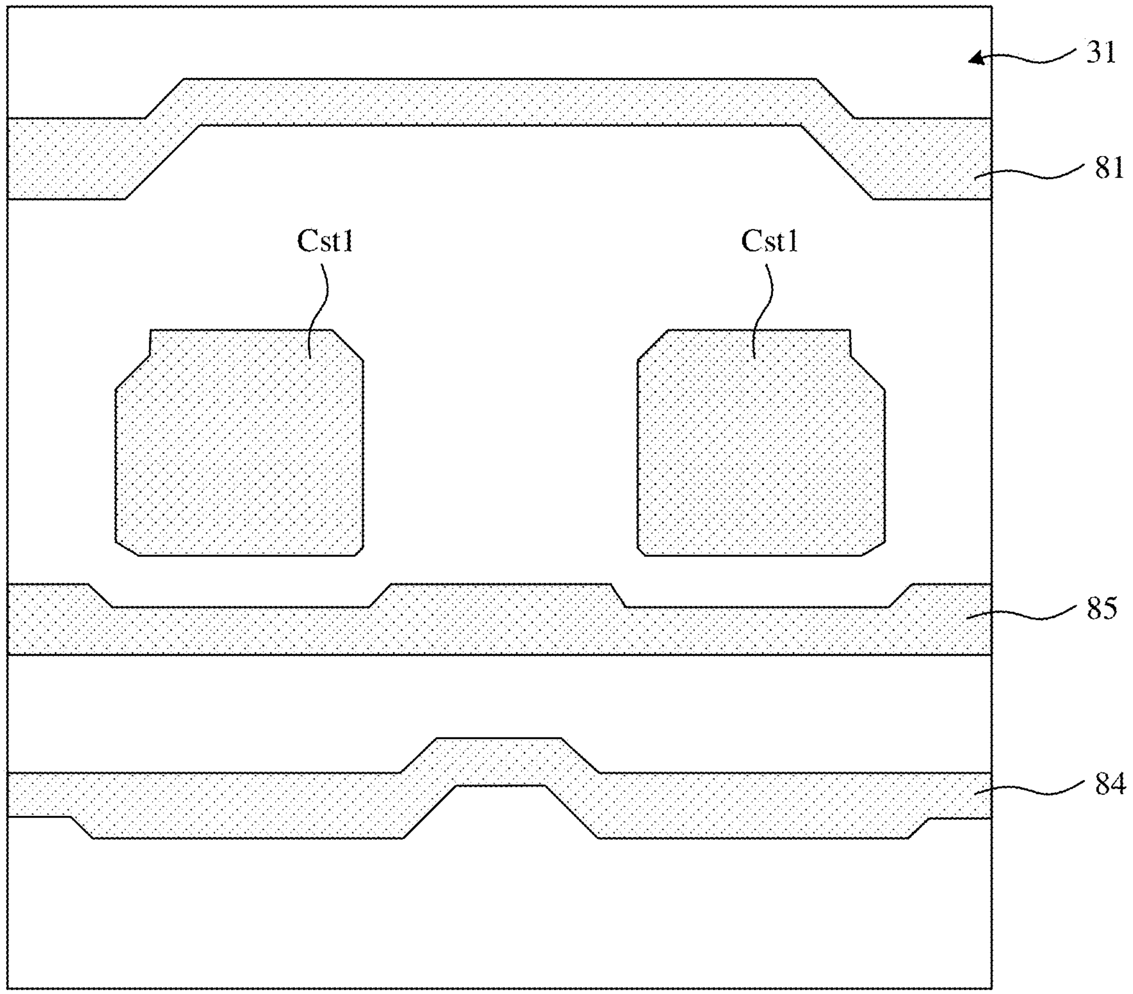
Figure 8:
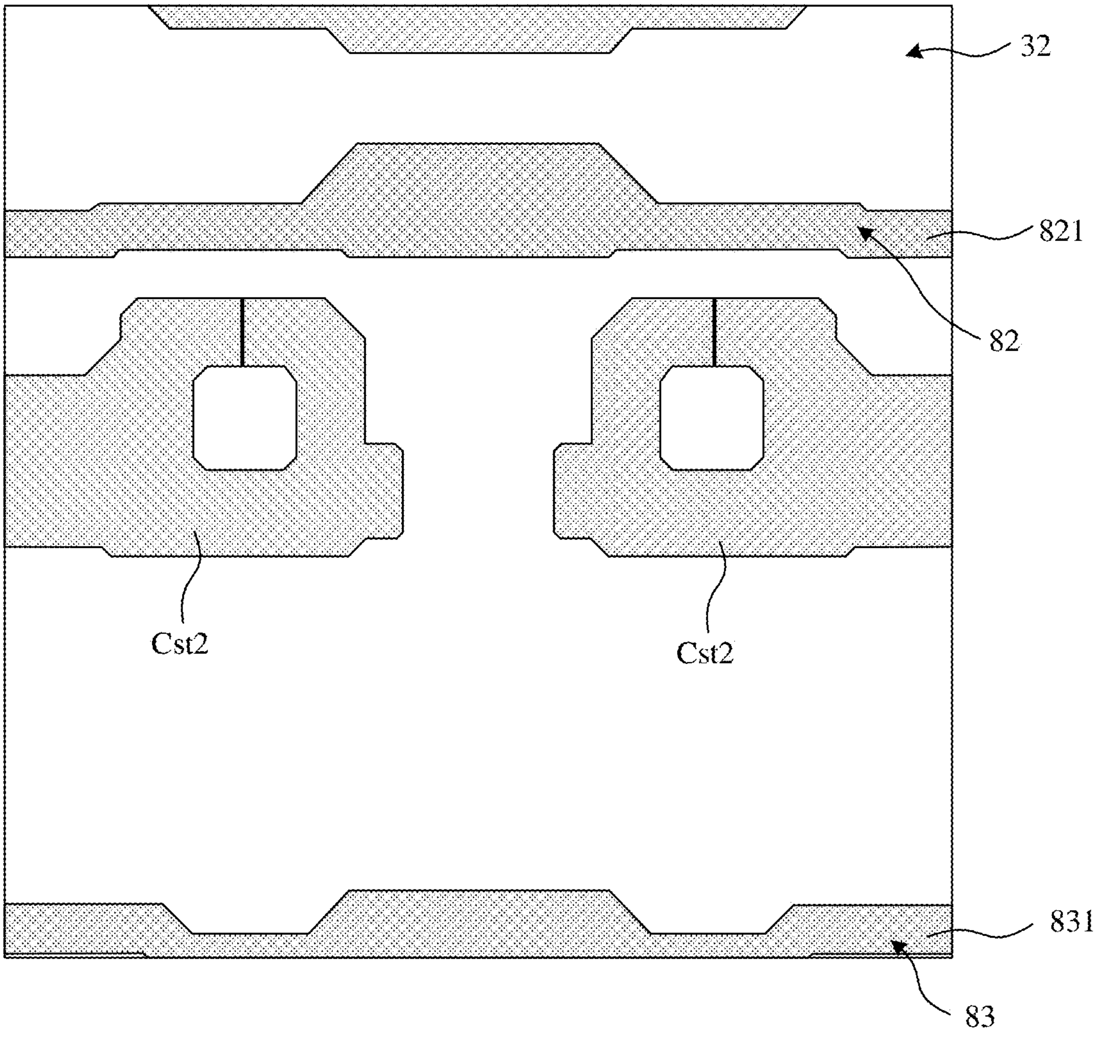
Figure 9:
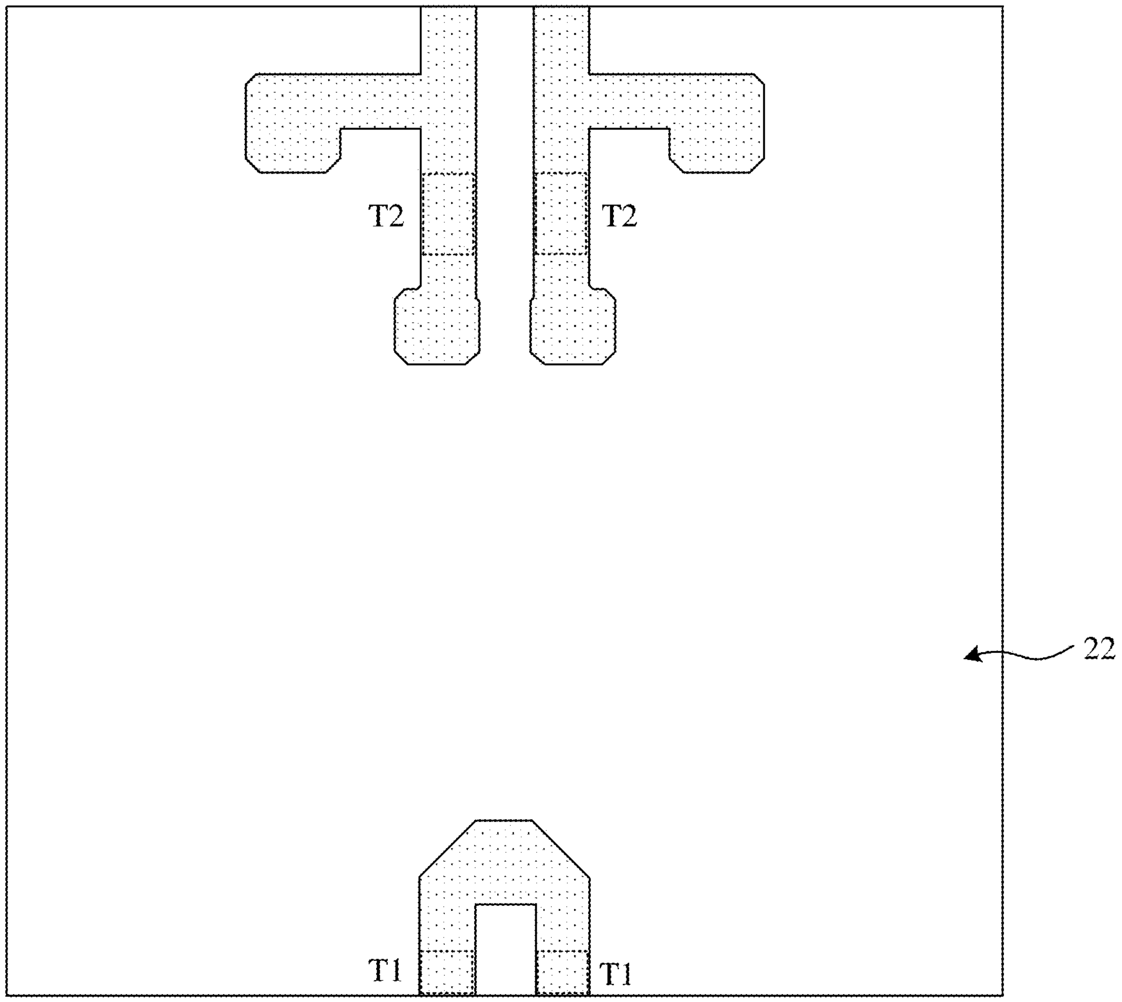
Figure 10:
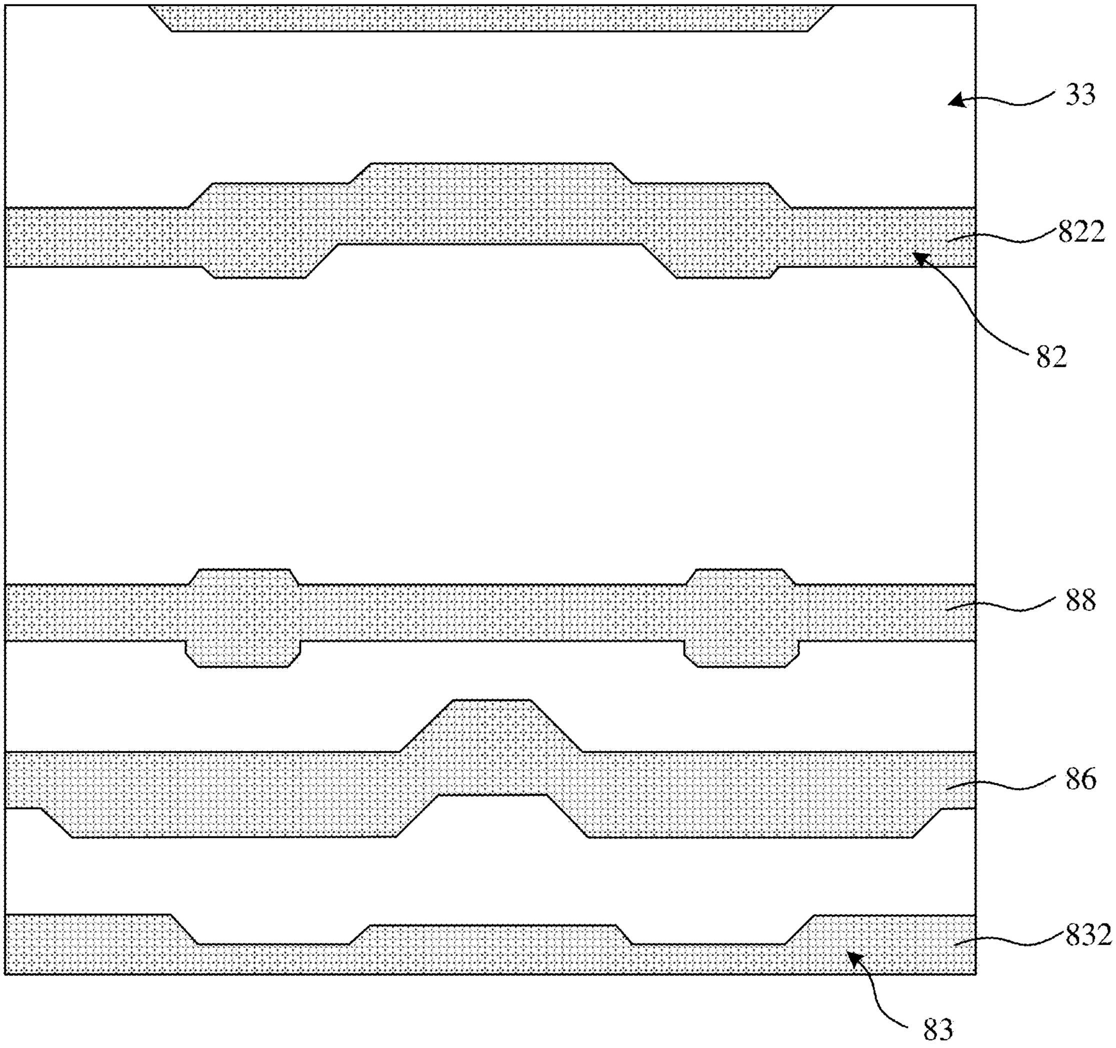
Figure 11:
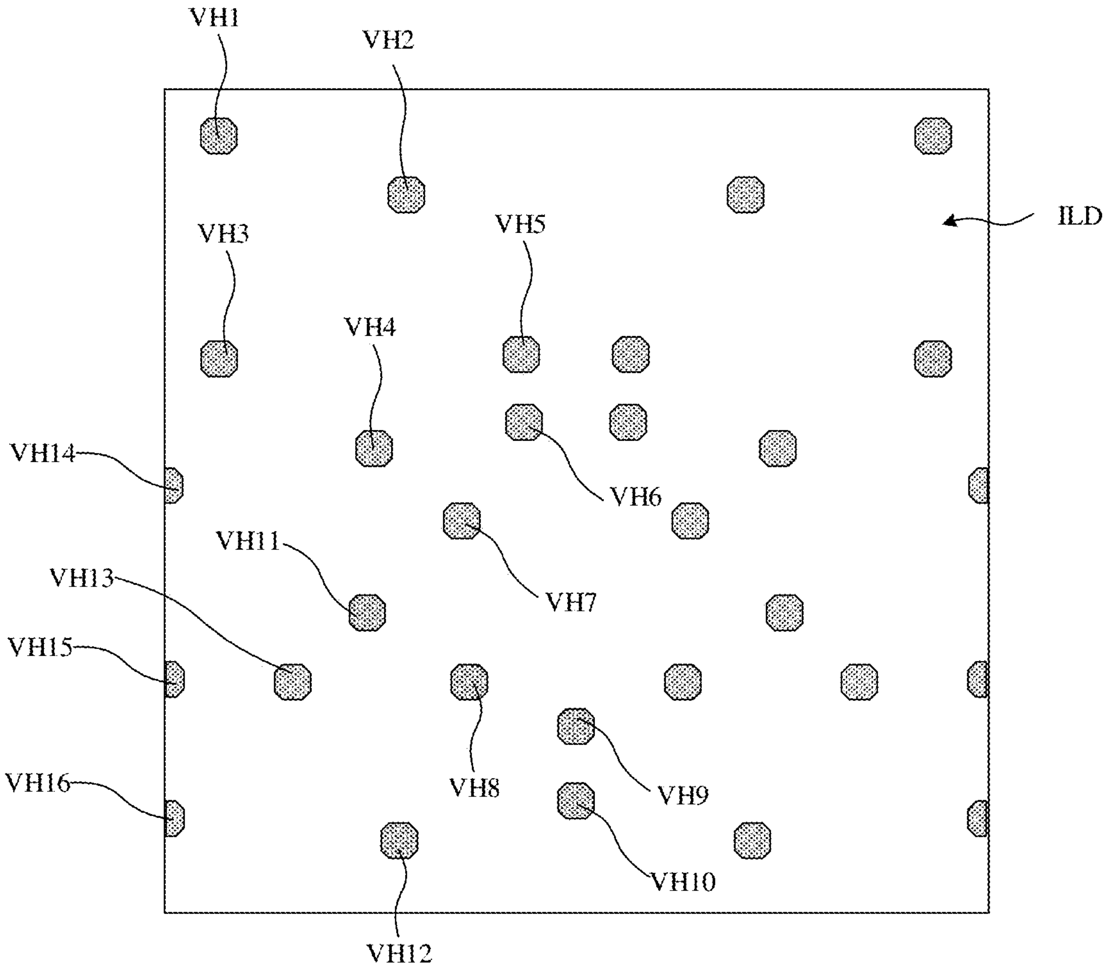
Figure 12:
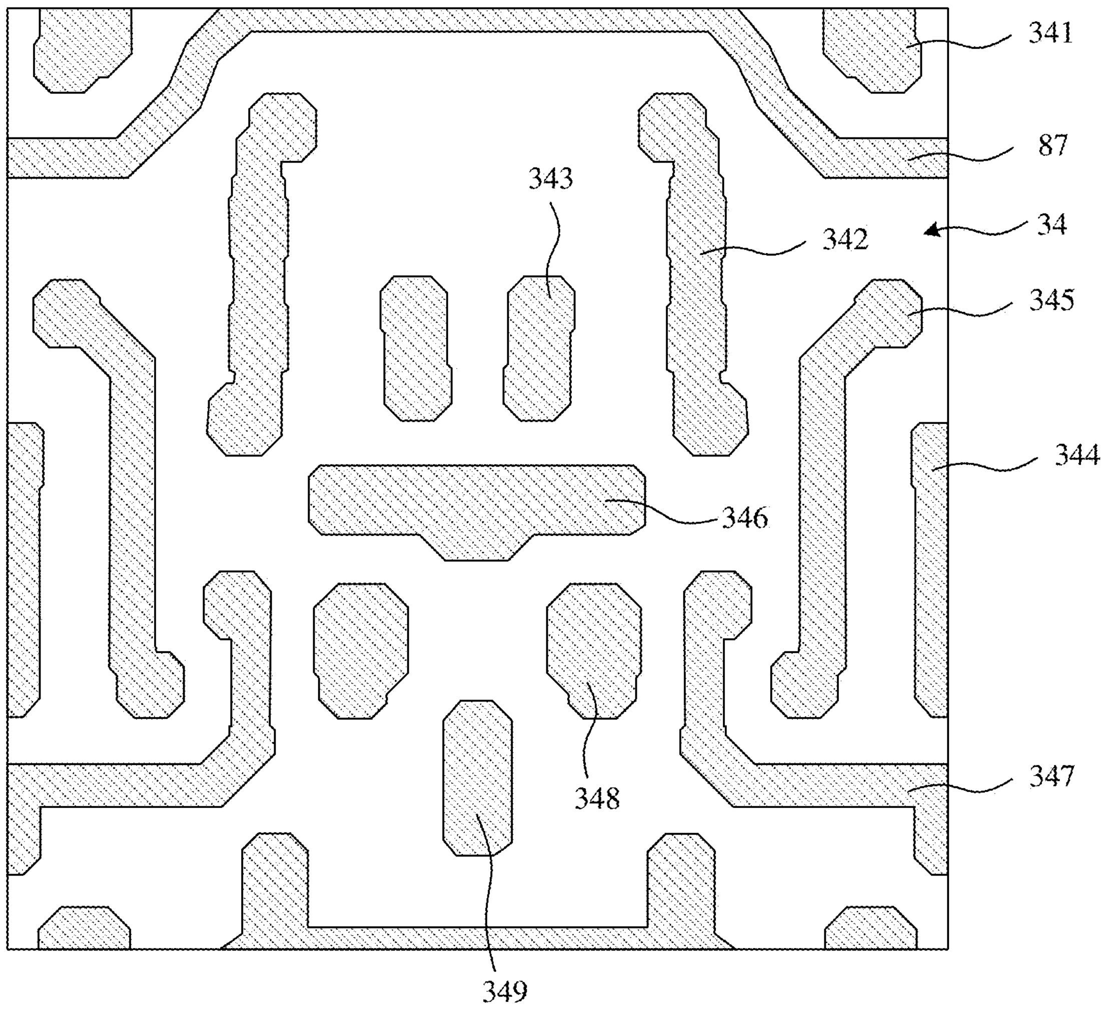
Figure 13:
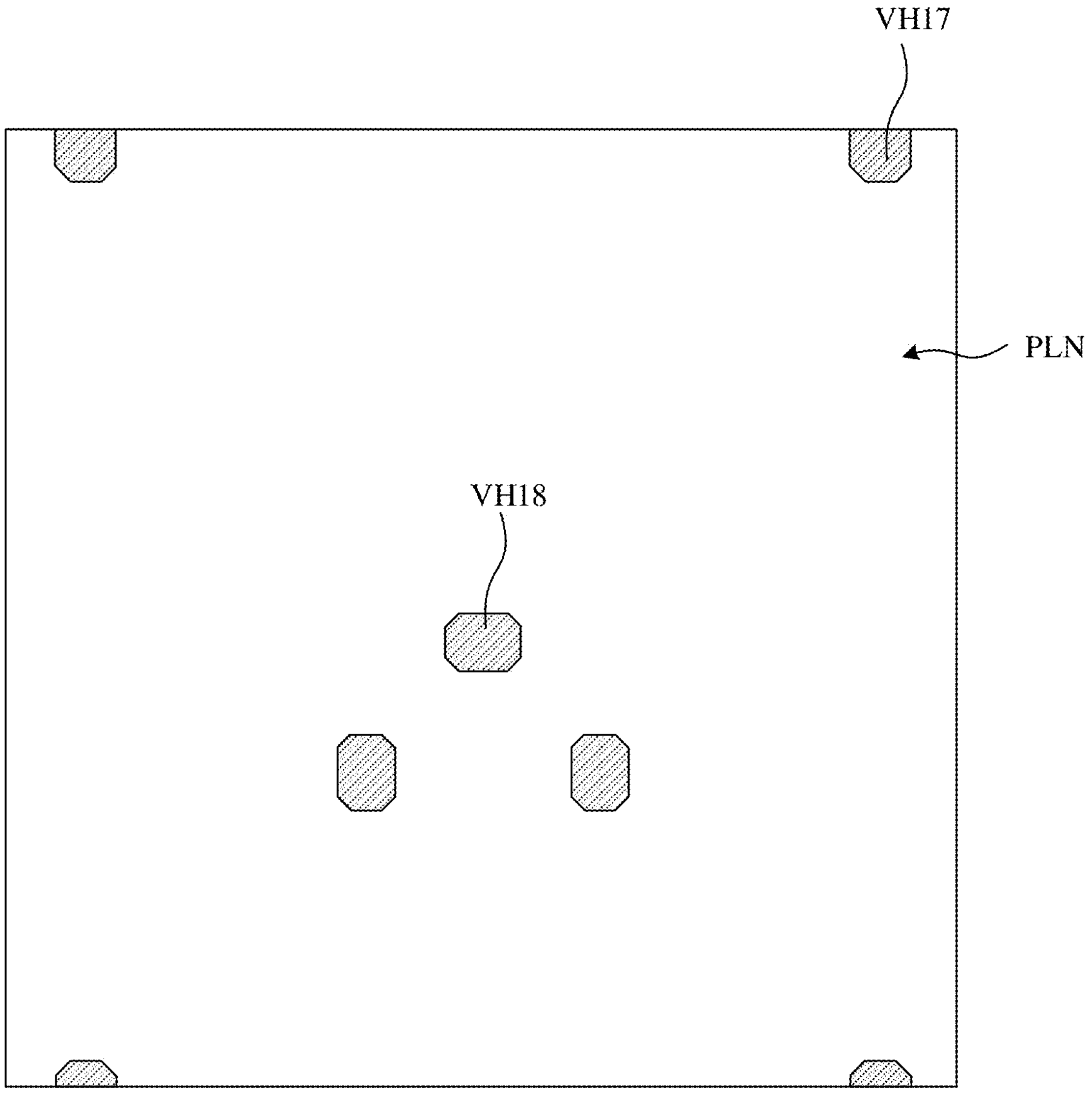
Figure 14:
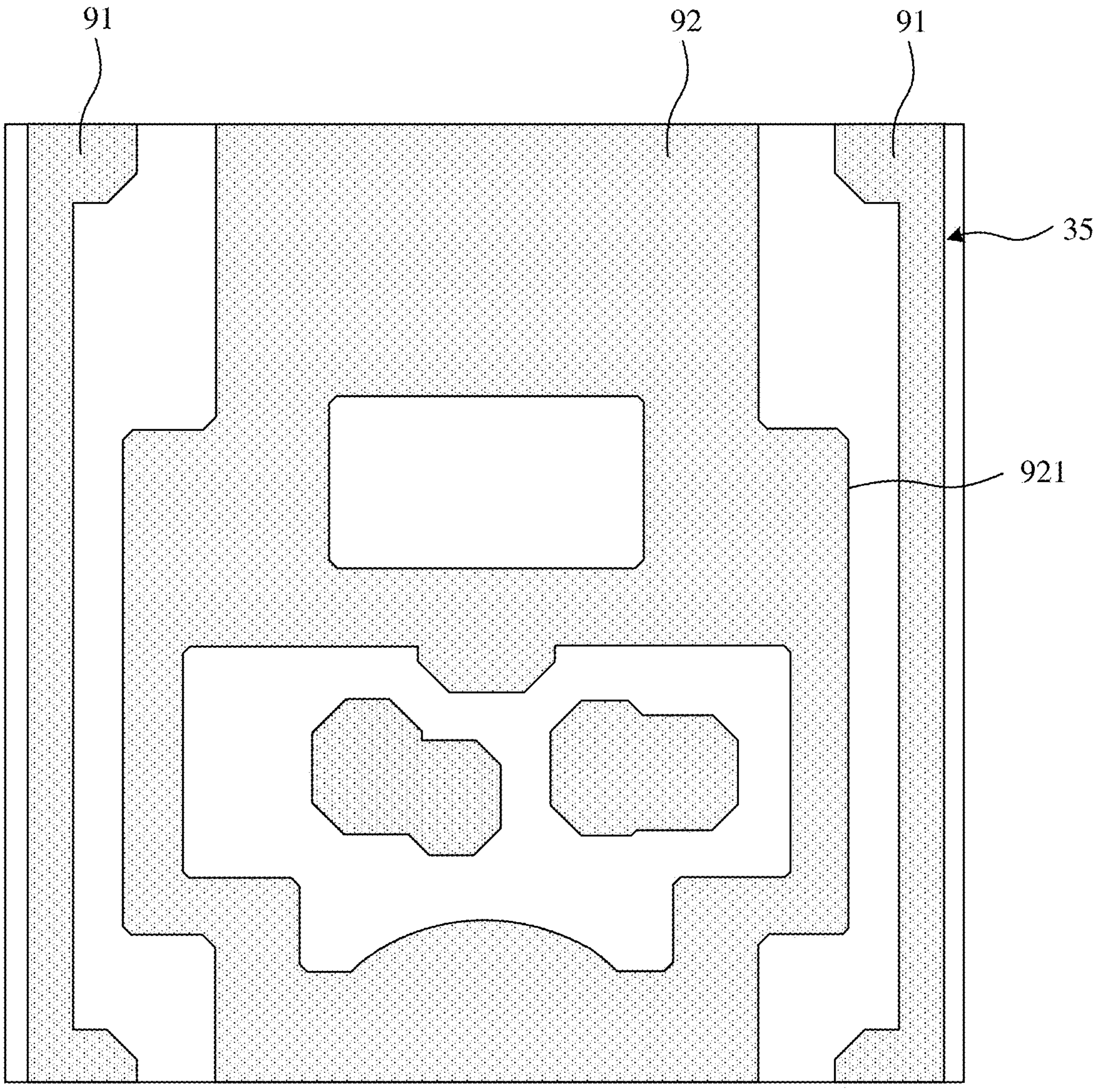
Figure 50:
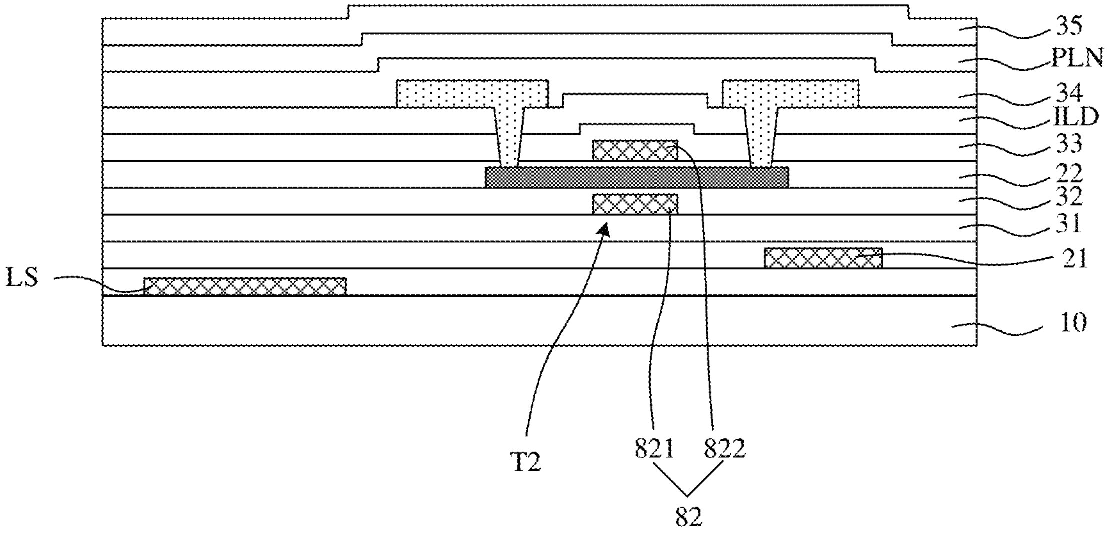
FIG. 50 shows a schematic cross-sectional view of the display substrate according to some exemplary embodiments of the present disclosure taken along line A-A' in FIG. 4.

FIG. 4 shows a partial plan view of a display substrate according to some exemplary embodiments of the present disclosure, in which pixel driving circuits of two adjacent sub-pixels are schematically shown. FIG. 5 to FIG. 14 respectively show partial plan views of a display substrate according to some exemplary embodiments of the present disclosure, where FIG. 5 shows a partial plan view of a light shielding layer of the display substrate, FIG. 6 shows a partial plan view of a first semiconductor layer of the display substrate, FIG. 7 shows a partial plan view of a first conductive layer of the display substrate, FIG. 8 shows a partial plan view of a second conductive layer of the display substrate, FIG. 9 shows a partial plan view of a second semiconductor layer of the display substrate, FIG. 10 shows a partial plan view of a third conductive layer of the display substrate, FIG. 11 shows a partial plan view of a first insulation layer of the display substrate, in which a plurality of via holes located in the first insulation layer are schematically shown, FIG. 12 shows a partial plan view of a fourth conductive layer of the display substrate, FIG. 13 shows a partial plan view of a second insulation layer of the display substrate, in which a plurality of via holes located in the second insulation layer are schematically shown, and FIG. 14 shows a partial plan view of a fifth conductive layer of the display substrate. FIG. 50 shows a schematic cross-sectional view of the display substrate according to some exemplary embodiments of the present disclosure taken along line A-A' in FIG. 4.

Referring to FIG. 4 to FIG. 14 and FIG. 50, the display substrate may include a base substrate 10, a light shielding layer LS provided on the base substrate 10, a first semiconductor layer 21 provided on a side of the light shielding layer LS away from the base substrate, a first conductive layer 31 provided on a side of the first semiconductor layer 21 away from the base substrate, a second conductive layer 32 provided on a side of the first conductive layer 31 away from the base substrate, a second semiconductor layer 22 provided on a side of the second conductive layer 32 away from the base substrate, a third conductive layer 33 provided on a side of the second semiconductor layer 22 away from the base substrate, a fourth conductive layer 34 provided on a side of the third conductive layer 33 away from the base substrate, and a fifth conductive layer 35 provided on a side of the fourth conductive layer 34 away from the base substrate.

For example, the first conductive layer 31, the second conductive layer 32 and the third conductive layer 33 may be conductive layers made of a gate material, such as Mo. For example, the fourth conductive layer 34 and the fifth conductive layer 35 may be conductive layers made of a source/drain material, such as Ti/Al/Ti.

A semiconductor material used to form an active layer may include amorphous silicon, polycrystalline silicon, oxide semiconductors, etc. An oxide semiconductor material may include IGZO (indium gallium zinc oxide), ZnO (zinc oxide), etc.

In the embodiments of the present disclosure, at least one insulation layer may be provided between two adjacent conductive layers. The insulation layer may be made of an insulation material such as silicon nitride, silicon oxide, or silicon oxynitride. The insulation layer may have a single film layer structure or a stack structure composed of a plurality of film layers. For example, in the shown embodiments, the display substrate may include a first insulation layer ILD provided between the third conductive layer 33 and the fourth conductive layer 34, and a second insulation layer PLN provided between the fourth conductive layer 34 and the fifth conductive layer 35. It should be understood that the display substrate may include more insulation layers. For a structure of the insulation layer, reference may be made to a structure of an insulation layer in existing display substrates, which will not be described in detail here.

FIG. 6 shows the first semiconductor layer 21. For example, as shown in FIG. 6, the first semiconductor layer 21 may be used to manufacture an active layer of the driving transistor T3, an active layer of the data writing transistor T4, an active layer of the second light emission control transistor T5, an active layer of the first light emission control transistor T6, an active layer of the second reset transistor T7, and an active layer of the third reset transistor T8, so as to form channel regions of the above-mentioned transistors. The first semiconductor layer 21 may include active region (channel regions) patterns and doping region (source/drain region) patterns of the above-mentioned transistors of each sub-pixel, and the active region patterns and the doping region patterns of the above-mentioned transistors in a same pixel driving circuit may be integrated.

For example, the first semiconductor layer 21 may include a low temperature poly silicon layer formed as a whole, and the source region and the drain region may be conductized by doping or other means so as to achieve an electrical connection of structures. For example, the source region and the drain region may be regions doped with p-type impurities.

FIG. 7 shows the first conductive layer 31 located on a side of the first semiconductor layer 21 away from the base substrate. For example, as shown in FIG. 7, the first scanning control signal line 81, the first capacitor electrode Cst1 of the storage capacitor Cst, the light emission control signal line 85 and the second reset control signal line 84 may be located in the first conductive layer 31. For example, the first conductive layer 31 may include the gate electrode of the driving transistor T3, the gate electrode of the data writing transistor T4, the gate electrode of the second light emission control transistor T5, the gate electrode of the first light emission control transistor T6, the gate electrode of the second reset transistor T7, and the gate electrode of the third reset transistor T8.

It should be noted that dashed rectangular boxes in FIG. 6 show overlapping portions of the first semiconductor layer 21 and the first conductive layer 31, namely the channel regions. For the channel region of each transistor, active semiconductor layers on two sides of each channel region are conductized as the first electrode and the second electrode of each transistor through ion doping and other processes. A source electrode and a drain electrode of the transistor may be symmetrical in structure, and thus may have no difference in physical structure. In the embodiments of the present disclosure, in order to distinguish the transistor, except for the gate electrode serving as a control electrode, one of the electrodes is directly described as the first electrode and the other is described as the second electrode. Therefore, in the embodiments of the present disclosure, the first electrode and the second electrode may be interchanged as needed in all or part of the transistors in the embodiments of the present disclosure.

For example, referring to FIG. 4, FIG. 6 and FIG. 7, the gate electrode of the data writing transistor T4 may be a portion of the first scanning control signal line 81 overlapping with the first semiconductor layer 21. The gate electrode of the first light emission control transistor T6 may be a first portion of the light emission control signal line 85 overlapping with the first semiconductor layer 21, and the gate electrode of the second light emission control transistor T5 may be a second portion of the light emission control signal line 85 overlapping with the first semiconductor layer 21. The gate electrode of the third reset transistor T8 is a first portion of the second reset control signal line 84 overlapping with the first semiconductor layer 21, and the gate electrode of the second reset transistor T7 is a second portion of the second reset control signal line 84 overlapping with the first semiconductor layer 21.

FIG. 8 shows the second conductive layer 32 located on a side of the first conductive layer 31 away from the base substrate. For example, as shown in FIG. 8, the second scanning control signal line 82, the second capacitor electrode Cst2 of the storage capacitor Cst and the first reset control signal line 83 may be located in the second conductive layer 32.

FIG. 9 shows the second semiconductor layer 22 located on a side of the second conductive layer 32 away from the base substrate. For example, as shown in FIG. 9, the second semiconductor layer 22 includes a channel region of the first reset transistor T1 and a channel region of the compensation transistor T2. For example, in a case that an oxide semiconductor is used in the active layer of the first reset transistor T1 and the active layer of the compensation transistor T2, the oxide semiconductor instead of the low temperature polysilicon material may be used in the transistor due to good hysteresis characteristics and low leakage current of the oxide semiconductor, so as to form a low temperature polysilicon oxide (LTPO) pixel driving circuit, which may achieve a low leakage and improve a stability of a gate voltage of the transistor.

For example, as shown in FIG. 4, FIG. 8 and FIG. 9, the gate electrode of the first reset transistor T1 may be a portion of the first reset control signal line 83 overlapping with the second semiconductor layer 22, and the gate electrode of the compensation transistor T2 may be a portion of the second scanning control signal line 82 overlapping with the second semiconductor layer 22.

FIG. 10 shows the third conductive layer 33 on a side of the second semiconductor layer 22 away from the base substrate. For example, as shown in FIG. 10, another second scanning control signal line 82, another first reset control signal line 83, the first initialization voltage signal line 86 and the third initialization voltage signal line 88 may be located in the third conductive layer 33.

For example, as shown in FIG. 4 to FIG. 10, another first reset control signal line 83 overlaps with the channel region of the first reset transistor T1, and the first reset transistor T1 includes a top gate electrode and a bottom gate electrode located on two sides of the active layer; another second scanning control signal line 82 overlaps with the channel region of the compensation transistor T2, and the compensation transistor T2 includes a top gate electrode and a bottom gate electrode located on two sides of the active layer.

That is to say, in the embodiments of the present disclosure, the first reset transistor T1 and the compensation transistor T2 may have a dual gate structure, that is, including a top gate electrode and a bottom gate electrode respectively.

In the embodiments of the present disclosure, the first reset control signal line 83 may include a first reset control signal sub-line 831 and a second reset control signal sub-line 832. The first reset control signal line located in the second conductive layer 32 is described as the first reset control signal sub-line 831, and the first reset control signal line located in the third conductive layer 33 is described as the second reset control signal sub-line 832. A portion of the first reset control signal sub-line 831 overlapping with the second semiconductor layer 22 forms the bottom gate electrode of the first reset transistor T1, and a portion of the second reset control signal sub-line 832 overlapping with the second semiconductor layer 22 forms the top gate electrode of the first reset transistor T1.

The second scanning control signal line 82 may include a first scanning control signal sub-line 821 and a second scanning control signal sub-line 822. The second scanning control signal line located in the second conductive layer 32 is described as the first scanning control signal sub-line 821, and the second scanning control signal line located in the third conductive layer 33 is described as the second scanning control signal sub-line 822. A portion of the first scanning control signal sub-line 821 overlapping with the second semiconductor layer 22 forms the bottom gate electrode of the compensation transistor T2, and a portion of the second scanning control signal sub-line 822 overlapping with the second semiconductor layer 22 forms the top gate electrode of the compensation transistor T2.

For example, the first reset transistor T1 and the compensation transistor T2 may be N-type transistors. The driving transistor T3, the data writing transistor T4, the second light emission control transistor T5, the first light emission control transistor T6, the second reset transistor T7 and the third reset transistor T8 may be P-type transistors.

FIG. 12 shows the fourth conductive layer 34 located on a side of the third conductive layer 33 away from the base substrate. For example, as shown in FIG. 12, the second initialization voltage signal line 87 may be located in the fourth conductive layer 34, and the display substrate may further include a plurality of connecting portions located in the fourth conductive layer 34. For example, the plurality of connecting portions may include a connecting portion 341, a connecting portion 342, a connecting portion 343, a second voltage signal line transfer portion 344, a connecting portion 345, a first power signal line transfer portion 346, a connecting portion 347, a connecting portion 348, and a first initialization voltage connecting portion 349.

FIG. 14 shows the fifth conductive layer 35 located on a side of the fourth conductive layer 34 away from the base substrate. For example, as shown in FIG. 14, the data line 91 and the first power signal line 92 may be located in the fifth conductive layer 35.

Referring to FIG. 4 to FIG. 14, the connecting portion 341 may be used to electrically connect the data line 91 located in the fifth conductive layer 35 to the first electrode of the data writing transistor T4. For example, the data line 91 located in the fifth conductive layer 35 is electrically connected to a portion of the connecting portion 341 through a via hole VH17 located in the second insulation layer PLN, and another portion of the connecting portion 341 is electrically connected to the first electrode of the data writing transistor T4 through a via hole VH1 located in the first insulation layer ILD.

The connecting portion 342 may be used to electrically connect the gate electrode of the driving transistor T3 to the second electrode of the compensation transistor T2, that is, to form the node N1. For example, a portion (such as one end) of the connecting portion 342 is electrically connected to the second electrode of the compensation transistor T2 through a via hole VH2 located in the first insulation layer ILD, and another portion (such as the other end) of the connecting portion 342 is electrically connected to the gate electrode of the driving transistor T3 through a via hole VH4 located in the first insulation layer ILD. The connecting portion 343 may be used to electrically connect the first electrode of the compensation transistor T2 to the first electrode of the first light emission control transistor T6, that is, to form the node N3. For example, a portion (such as one end) of the connecting portion 343 is electrically connected to the first electrode of the compensation transistor T2 through a via hole VH5 located in the first insulation layer ILD, and another portion (such as the other end) of the connecting portion 343 is electrically connected to the first electrode of the first light emission control transistor T6 through a via hole VH6 located in the first insulation layer ILD. The connecting portion 345 may be used to electrically connect the second electrode of the third reset transistor T8 to the node N2. For example, a portion (such as one end) of the connecting portion 345 is electrically connected to the second electrode of the third reset transistor T8 through a via hole VH13 located in the first insulation layer ILD, and another portion (such as the other end) of the connecting portion 345 is electrically connected to the node N2 through a via hole VH3 located in the first insulation layer ILD.

The connecting portion 347 may be used to electrically connect the first electrode of the third reset transistor T8 to the third initialization voltage signal line 88. For example, a portion (such as one end) of the connecting portion 347 is electrically connected to the third initialization voltage signal line 88 through a via hole VH11 located in the first insulation layer ILD, and another portion (such as the other end) of the connecting portion 347 is electrically connected to the first electrode of the third reset transistor T8 through a via hole VH16 located in the first insulation layer ILD.

Figure 19:
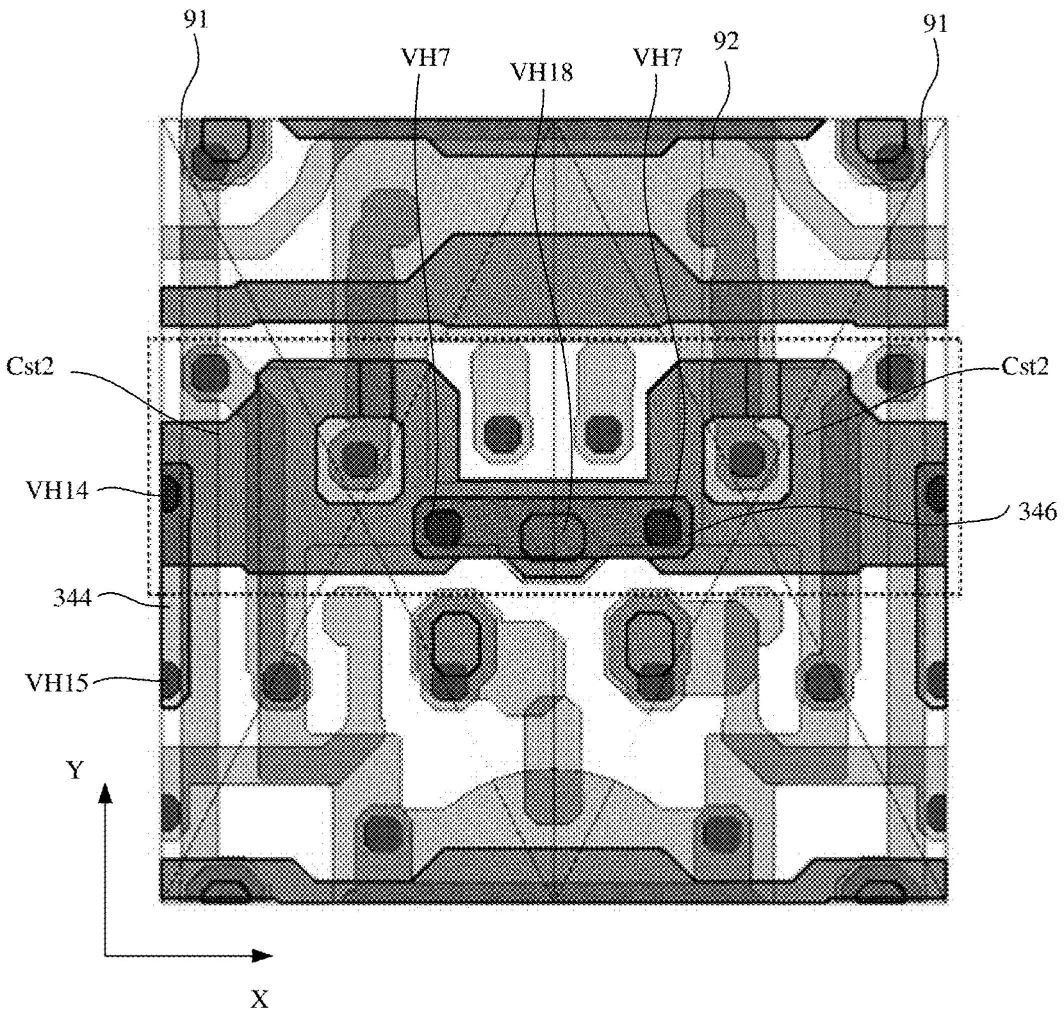
FIG. 19 shows a partial enlarged view of a display substrate according to the exemplary embodiments of the present disclosure, in which a transfer method of a first power signal line is schematically shown.

FIG. 19 shows a partial enlarged view of a display substrate according to the exemplary embodiments of the present disclosure, in which a transfer method of the first power signal line is schematically shown. Referring to FIG. 14 and FIG. 19, the data line 91 and the first power signal line 92 extend in the second direction Y. For example, each column of sub-pixels has a corresponding data line 91, and two adjacent columns of sub-pixels share a first power signal line 92. As shown in FIG. 14, a shared first power signal line 92 is located between the pixel driving circuits of two adjacent columns of sub-pixels. A body portion of the first power signal line 92 extends in the second direction Y, and the first power signal line 92 has a larger width in the first direction X. For ease of description, a portion with an increased width of the first power signal line 92 is referred to as a widening portion 921 (as shown in FIG. 14), and the widening portion 921 extends in the first direction X relative to the body portion of the first power signal line 92.

Two adjacent columns of sub-pixels share a first power signal line transfer portion 346 located in the fourth conductive layer 34. The widening portion 921 of the first power signal line 92 is respectively electrically connected to a middle portion of the first power signal line transfer portion 346 through a via hole VH18 located in the second insulation layer PLN.

The second capacitive electrode Cst2 located in the second conductive layer 32 further serves as a conductive transfer portion. One end of the first power signal line transfer portion 346 is electrically connected to a conductive transfer portion Cst2 of the pixel driving circuit of one sub-pixel through a via hole VH7 located in the first insulation layer ILD, and the other end of the first power signal line transfer portion 346 is electrically connected to a conductive transfer portion Cst2 of the pixel driving circuit of another sub-pixel through the via hole VH7 located in the first insulation layer ILD.

The pixel driving circuit of each sub-pixel further includes a second voltage signal line transfer portion 344. In the pixel driving circuit of a sub-pixel, a portion of the conductive transfer portion Cst2 is electrically connected to one end of the second voltage signal line transfer portion 344 through a via hole VH14, and the other end of the second voltage signal line transfer portion 344 is electrically connected to the second electrode of the second light emission control transistor T5 through a via hole VH15.

through such connection method, the first power signal on the first power signal line 92 shared by two adjacent columns of sub-pixels may be transmitted to the second light emission control transistors T5 of the two adjacent columns of sub-pixels.

In the embodiments of the present disclosure, the first power signal line 92 is communicated in the first direction X mainly through the conductive transfer portion Cst2 located in the second conductive layer, and in the second direction Y mainly through the body portion located in the fifth conductive layer. Lateral and longitudinal first power signal lines 92 are connected between two sub-pixels through one via hole VH18 located in the second insulation layer PLN and two via holes VH7 located in the first insulation layer ILD. Two sub-pixels share a via hole VH18 located in the second insulation layer PLN. The first power signal of each sub-pixel is firstly transferred to the first power signal line transfer portion 346 through the longitudinally extending body portion, then to the conductive transfer portion Cst2 laterally extending in the second conductive layer through the first power signal line transfer portion 346, then to the second voltage signal line transfer portion 344 through another via hole VH14 located in the first insulation layer ILD of the conductive transfer portion Cst2, and finally to the second light emission control transistor T5 through the second voltage signal line transfer portion 344. In the embodiments of the present disclosure, the conductive transfer portion Cst2 located in the second conductive layer 32 serves as both a conductive transfer portion for laterally transmitting the first power signal and a first power signal transfer jumper in the sub-pixel.

A portion of the connecting portion 348 is electrically connected to the first electrode of the first light emission control transistor T6 through a via hole VH8. In this way, the node N4 may be led out for a subsequent electrical connection between the first electrode of the first light emission control transistor T6 and the anode of the light emitting element 130.

In some embodiments of the present disclosure, the display substrate further includes a first initialization voltage connecting portion located in the fourth conductive layer. One end of the first initialization voltage connecting portion is electrically connected to the first initialization voltage signal line through a fifth via hole, and the other end of the first initialization voltage connecting portion is respectively electrically connected to the source electrodes or the drain electrodes of the first reset transistors of two adjacent sub-pixels in a same row through a sixth via hole.

Exemplarily, a portion (such as one end) of the first initialization voltage connecting portion 349 is electrically connected to the first initialization voltage signal line 86 through a via hole VH9, and another portion (such as the other end) of the first initialization voltage connecting portion 349 is electrically connected to the first electrode of the first reset transistor T1 through a via hole VH10. The another portion of the first initialization voltage connecting portion 349 is electrically connected to the first electrodes of the first reset transistors of two adjacent sub-pixels in the same row through the sixth via hole. By sharing the first initialization voltage connecting portion 349, it is possible to effectively reduce an area occupation of the via holes, which may help increase a pixel density.

A portion of the second initialization voltage signal line 87 is electrically connected to the first electrode of the second reset transistor T7 through a via hole VH12.

Figure 15:
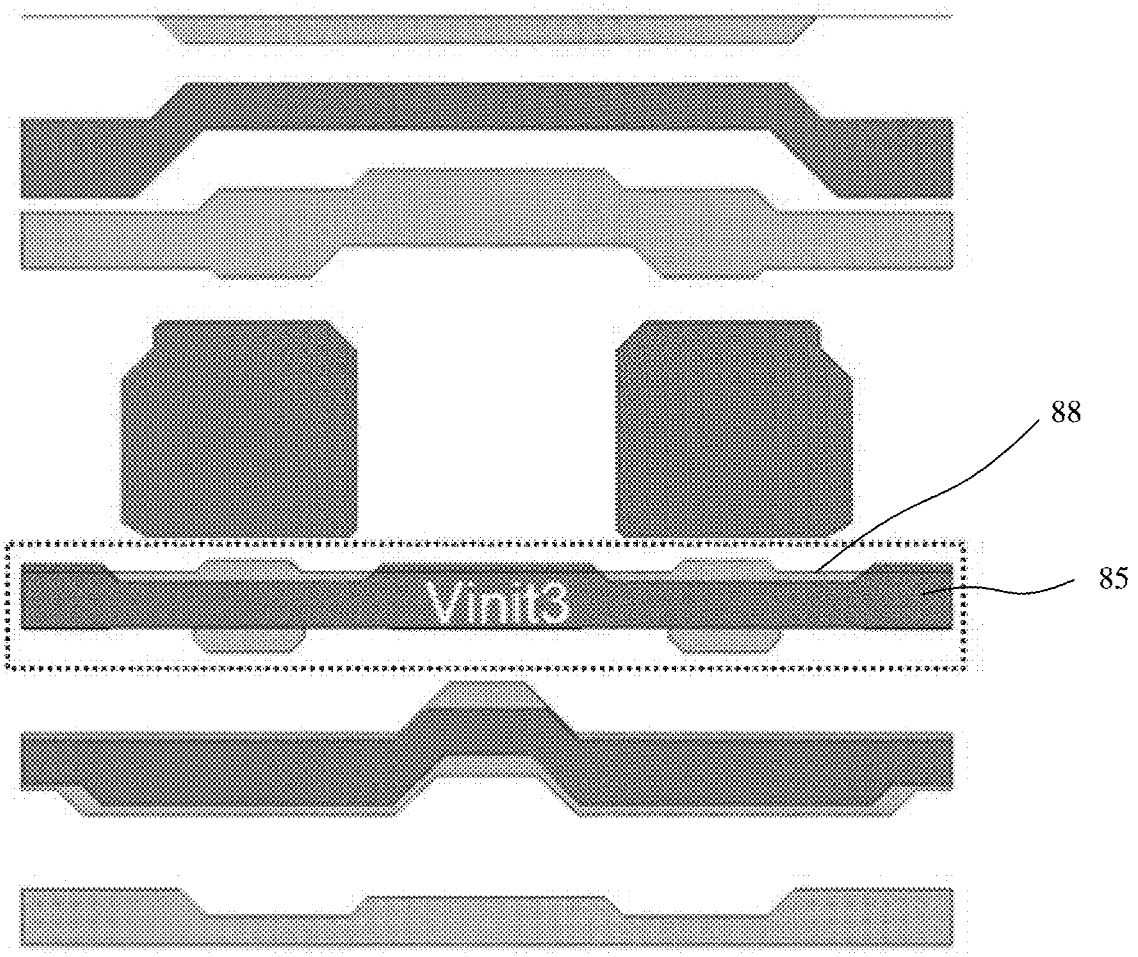
FIG. 15 shows a partial plan view of a display substrate according to the exemplary embodiments of the present disclosure, in which a superimposition of a first conductive layer and a third conductive layer is schematically shown.
Figure 16:
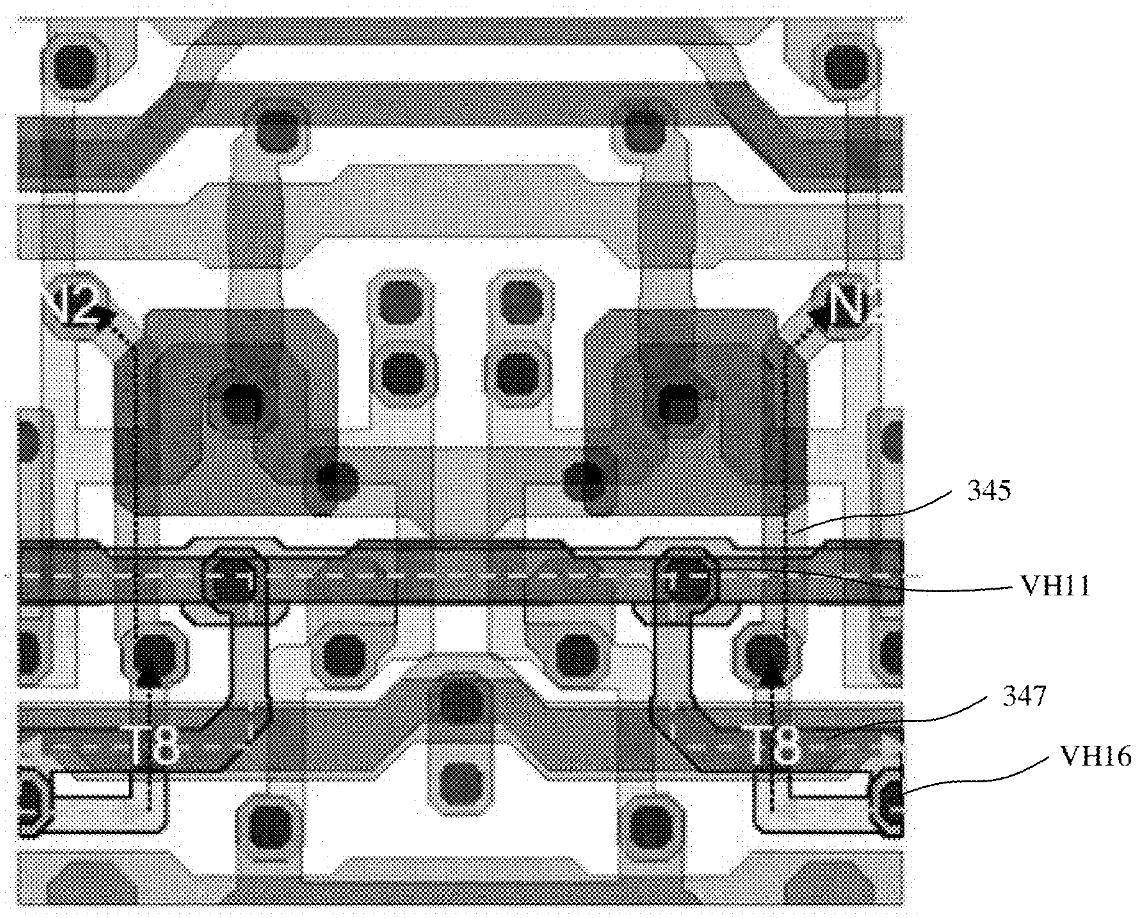
FIG. 16 shows a partial plan view of a display substrate according to the exemplary embodiments of the present disclosure, in which a superimposition of a first conductive layer, a third conductive layer and a fourth conductive layer is schematically shown.

FIG. 15 shows a partial plan view of a display substrate according to the exemplary embodiments of the present disclosure, in which a superimposition of the first conductive layer and the third conductive layer is schematically shown. FIG. 16 shows a partial plan view of a display substrate according to the exemplary embodiments of the present disclosure, in which a superimposition of the first conductive layer, the third conductive layer and the fourth conductive layer is schematically shown.

In some exemplary embodiments of the present disclosure, the display substrate further includes a second initialization voltage connecting portion located in the fourth conductive layer. Two ends of the second initialization voltage connecting portion are electrically connected to the third initialization voltage signal line through the seventh via hole, and a middle portion between the two ends is electrically connected to the source electrodes or the drain electrodes of the third reset transistors of two adjacent sub-pixels in the same row through the eighth via hole. The second initialization voltage connecting portion is located between the first initialization voltage connecting portion and the second voltage signal line transfer portion in the first direction.

Exemplarily, referring to FIG. 15 and FIG. 16 in combination, an orthographic projection of the light emission control signal line 85 on the base substrate 10 overlaps at least partially with an orthographic projection of the third initialization voltage signal line 88 on the base substrate 10, the orthographic projection of the third initialization voltage signal line on the base substrate 10 does not overlap with an orthographic projection of the first reset control signal line on the base substrate, the orthographic projection of the third initialization voltage signal line on the base substrate 10 does not overlap with an orthographic projection of the second reset control signal line on the base substrate, the orthographic projection of the third initialization voltage signal line on the base substrate 10 does not overlap with an orthographic projection of the scanning control signal line on the base substrate, and the orthographic projection of the light emission control signal line 85 on the base substrate overlaps at least partially with the orthographic projection of the third initialization voltage signal line 88 on the base substrate 10. For example, in a sub-pixel, a ratio of an area of an overlapping portion to an area of the orthographic projection of the initialization voltage signal line on the base substrate or an area of the orthographic projection of the control signal line on the base substrate is in a range of 80% to 95%, that is, the orthographic projection of the light emission control signal line 85 on the base substrate 10 and the orthographic projection of the third initialization voltage signal line 88 on the base substrate 10 overlap mostly but not completely. The third initialization voltage signal line 88 extending in the first direction X is electrically connected to a portion (such as one end) of the connecting portion 347 through the via hole VH11, and another portion (such as the other end) of the connecting portion 347 is electrically connected to the first electrode of the third reset transistor T8 through the via hole VH16. The second electrode of the third reset transistor T8 is further electrically connected to the node N2 through the connecting portion 345.

The connecting portion 347 may be used to electrically connect the first electrode of the third reset transistor T8 to the third initialization voltage signal line 88. The connecting portion 347 includes first ends respectively located in two adjacent sub-pixels and a middle portion located between the two first ends. The first ends of the connecting portion 347 are respectively electrically connected to the third initialization voltage signal line 88 through the via hole VH11. The middle portion between the two first ends of the connecting portion 347 is electrically connected to the first electrodes of the third reset transistors T8 of adjacent sub-pixels through the via hole VH16. Between two adjacent sub-pixels, the connecting portion 347 is located between the second voltage signal line transfer portion 344 and the first initialization voltage connecting portion 349 in the first direction. The second reset control signal PReset transmitted on the second reset control signal line 84 is at a low level in stages t1 and t5, that is, the third reset transistor T8 is turned on in stages t1 and t5. In these stages, the third initialization voltage signal transmitted on the third initialization voltage signal line 88 refreshes the node N2. The light emission control signal EM transmitted on the light emission control signal line 85 is in an invalid state in stages t1 to t5. That is to say, the light emission control signal EM transmitted on the light emission control signal line 85 is separated from the third initialization voltage signal Vinit3 in the timing sequence. In the embodiments of the present disclosure, the orthographic projection of the light emission control signal line 85 on the base substrate 10 overlaps at least partially with the orthographic projection of the third initialization voltage signal line 88 on the base substrate 10, that is, a stack design is adopted. With such stack design, the light emission control signal EM transmitted on the light emission control signal line 85 and the third initialization voltage signal Vinit3 are staggered in terms of working sequence and do not work simultaneously, so that a signal crosstalk may be prevented. In a case that the light emission control signal EM transmitted on the light emission control signal line 85 and the third initialization voltage signal Vinit3 do not affect each other, the stack design of the light emission control signal line 85 and the third initialization voltage signal line 88 may effectively optimize a pixel spatial layout, which is conducive to a high-resolution pixel design.

Figure 17:
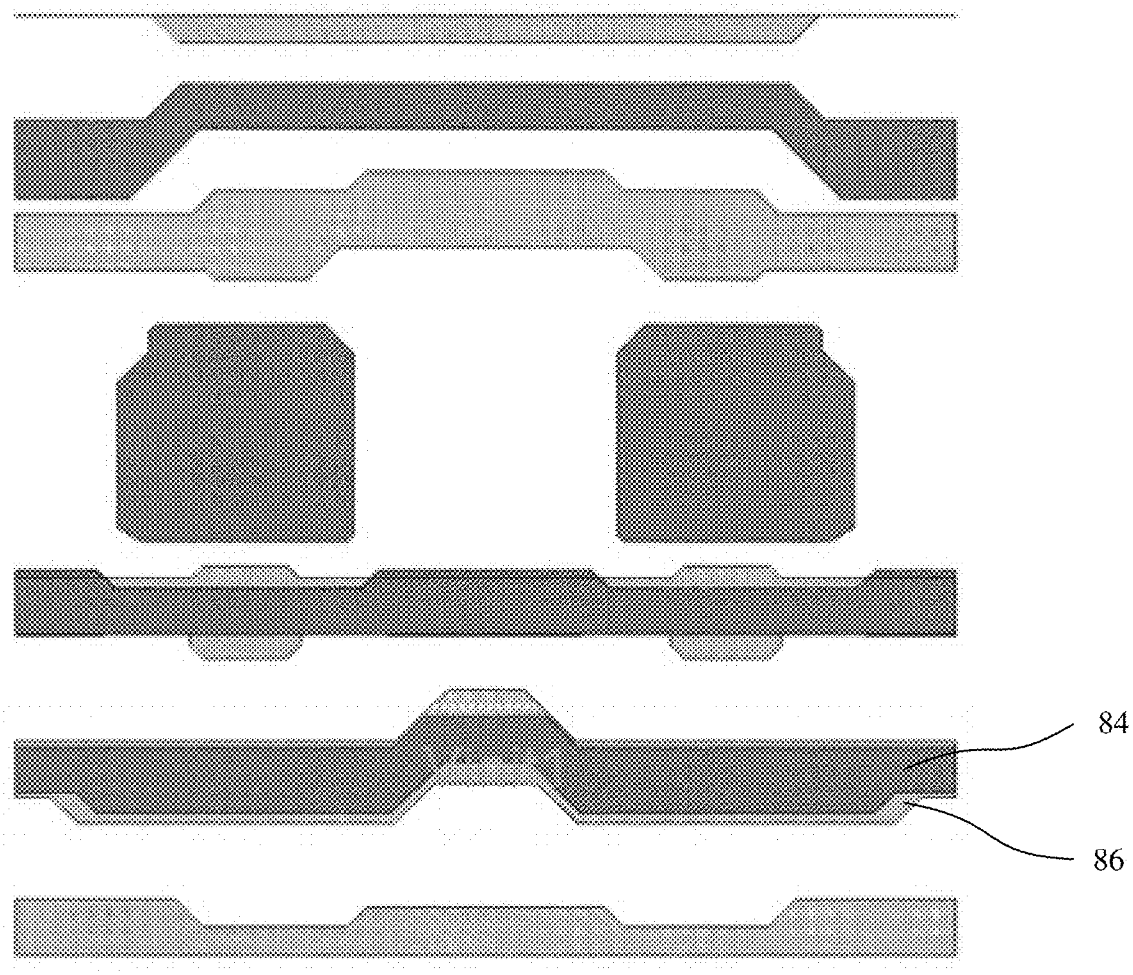
FIG. 17 shows a partial plan view of a display substrate according to the exemplary embodiments of the present disclosure, in which a superimposition of a first conductive layer and a third conductive layer is schematically shown.
Figure 18:
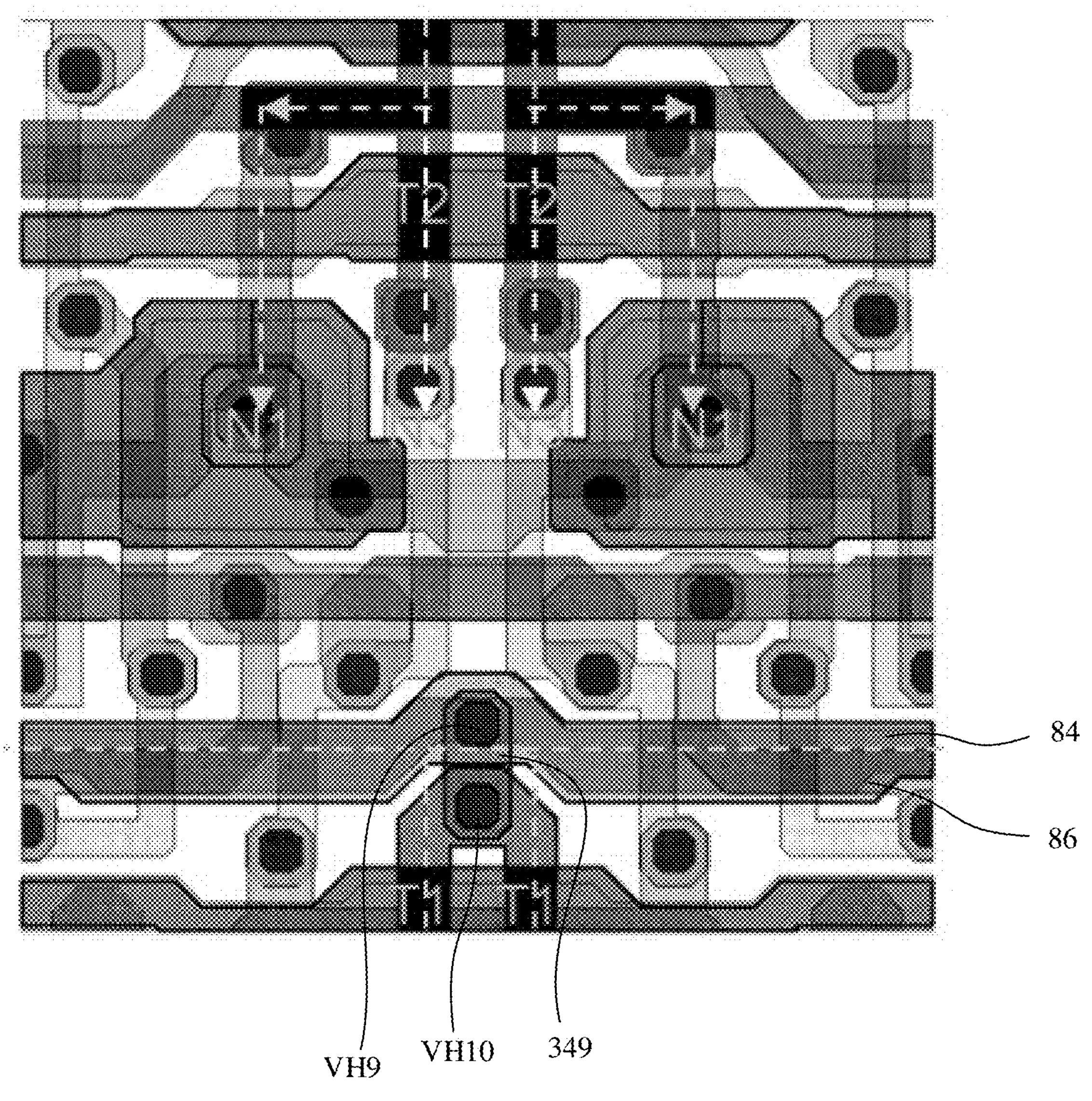
FIG. 18 shows a partial plan view of a display substrate according to the exemplary embodiments of the present disclosure, in which a superimposition of a second semiconductor layer, a first conductive layer, a second conductive layer, a third conductive layer and a fourth conductive layer are schematically shown.

FIG. 17 shows a partial plan view of a display substrate according to the exemplary embodiments of the present disclosure, in which a superimposition of the first conductive layer and the third conductive layer is schematically shown. FIG. 18 shows a partial plan view of a display substrate according to the exemplary embodiments of the present disclosure, in which a superimposition of the second semiconductor layer, the first conductive layer, the second conductive layer, the third conductive layer and the fourth conductive layer are schematically shown.

Referring to FIG. 17 and FIG. 18, an orthographic projection of the second reset control signal line 84 on the base substrate 10 overlaps at least partially with an orthographic projection of the first initialization voltage signal line 86 on the base substrate 10. The orthographic projection of the first initialization voltage signal line on the base substrate does not overlap with the orthographic projection of the first reset control signal line on the base substrate, the orthographic projection of the first initialization voltage signal line on the base substrate does not overlap with the orthographic projection of the scanning control signal line on the base substrate, and the orthographic projection of the first initialization voltage signal line on the base substrate does not overlap with the orthographic projection of the light emission control signal line on the base substrate. The orthographic projection of the second reset control signal line 84 on the base substrate 10 overlaps at least partially with the orthographic projection of the first initialization voltage signal line 86 on the base substrate 10. For example, in a sub-pixel, a ratio of an area of an overlapping portion to an area of the orthographic projection of the first initialization voltage signal line on the base substrate is in a range of 60% to 100%, or a ratio of the area of the overlapping portion to an area of the orthographic projection of the second reset control signal line on the base substrate is in a range of 60% to 100%. In some optional embodiments, the ratio of the area of the overlapping portion to the area of the orthographic projection of the second reset control signal line on the base substrate may be in a range of 80% to 95%, that is, the orthographic projection of the second reset control signal line 84 on the base substrate 10 and the orthographic projection of the first initialization voltage signal line 86 on the base substrate 10 overlap mostly but not completely. The first initialization voltage signal line 86 is electrically connected to a portion (such as one end) of the first initialization voltage connecting portion 349 through the via hole VH9, and another portion (such as the other end) of the first initialization voltage connecting portion 349 is electrically connected to the first electrode of the first reset transistor T1 through the via hole VH10. The second electrode of the first reset transistor T1 is further electrically connected to the first electrode of the compensation transistor T2, and the gate electrode of the driving transistor T3 is also electrically connected to the first electrode of the compensation transistor T2 through the connecting portion 342, thereby forming the node N1. In some optional embodiments, the orthographic projection of the second reset control signal line on the base substrate and the orthographic projection of the first initialization voltage signal line on the base substrate may overlap mostly, for example, a ratio of the area of the overlapping portion to the area of the orthographic projection of the second reset control signal line on the base substrate or the area of the orthographic projection of the first initialization voltage signal line on the base substrate is 60%, or the two may overlap completely, for example, the ratio is 100%. In some embodiments, an orthographic projection of the second initialization voltage signal line on the base substrate may overlap partially with the orthographic projection of the scanning control signal line on the base substrate. In addition, the orthographic projection of the second initialization voltage signal line on the base substrate may also overlap partially with the orthographic projection of the first reset control signal line on the base substrate.

In the timing sequence diagram, the second reset control signal PReset transmitted on the second reset control signal line 84 is in a valid state in stages t1 and t5, while in stages t1 and t5, the first reset control signal NReset transmitted on the first reset control signal line 83 is at a low level, that is, the first reset transistor T1 is in an off state. At this time, the first initialization voltage signal Vinit1 may not be transmitted to the node N1 through the first reset transistor T1. In fact, the first reset control signal NReset transmitted on the first reset control signal line 83 is at a high level in stages t2 and t3, that is, the first reset transistor T1 is turned on in stages t2 and t3. That is to say, the second reset control signal PReset transmitted on the second reset control signal line 84 is separated from the first initialization voltage signal Vinit1 in the timing sequence. In the embodiments of the present disclosure, the orthographic projection of the first scanning control signal line 81 on the base substrate 10 overlaps at least partially with the orthographic projection of the first initialization voltage signal line 86 on the base substrate 10, that is, a stack design is adopted. The orthographic projection of the first initialization voltage signal line on the base substrate does not overlap with the orthographic projection of the first reset control signal line on the base substrate, the orthographic projection of the first initialization voltage signal line on the base substrate does not overlap with the orthographic projection of the scanning control signal line on the base substrate, and the orthographic projection of the first initialization voltage signal line on the base substrate does not overlap with the orthographic projection of the light emission control signal line on the base substrate. With such stack design, the second rest control signal PReset transmitted on the second reset control signal line 84 and the first initialization voltage signal Vinit1 are staggered in terms of working sequence and do not work simultaneously, so that a signal crosstalk may be prevented. In a case that the second rest control signal PReset transmitted on the second reset control signal line 84 and the first initialization voltage signal Vinit1 do not affect each other, the stack design of the first scanning control signal line 81 and the first initialization voltage signal line 86 may effectively optimize a pixel spatial layout, which is conducive to a high-resolution pixel design. The orthographic projection of the first scanning control signal line 81 on the base substrate 10 overlaps at least partially with the orthographic projection of the first initialization voltage signal line 86 on the base substrate 10, and for example, a ratio of an area of an overlapping portion to an area of the orthographic projection of the first scanning control signal line 81 on the base substrate 10 is in a range of 80% to 95%, or a ratio of the area of the overlapping portion to the area of the orthographic projection of the first initialization voltage signal line 86 on the base substrate 10 is in a range of 80% to 95%.

Figure 20:
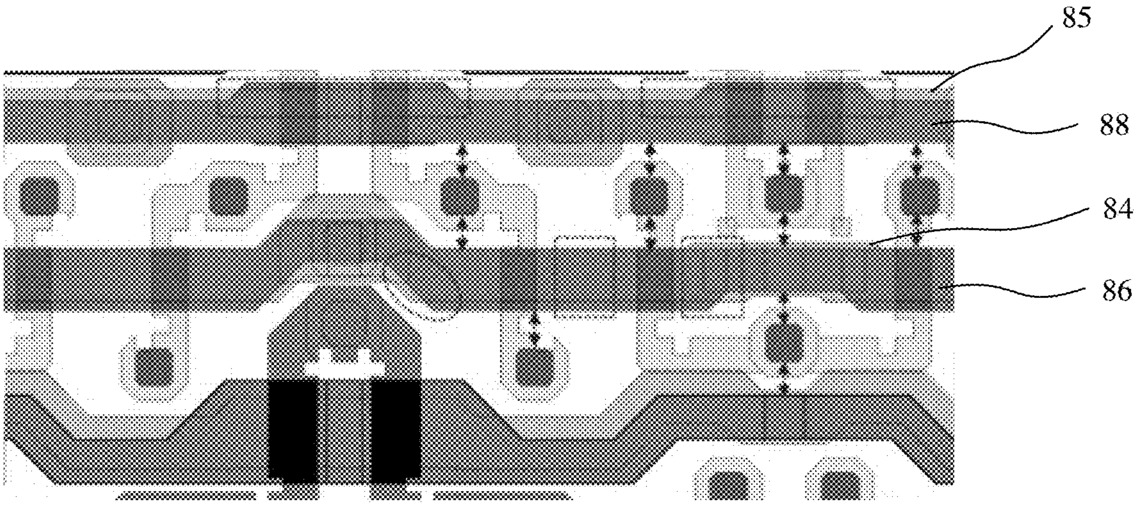
FIG. 20 shows a partial enlarged view of a display substrate according to the exemplary embodiments of the present disclosure, in which a staggering design of stacked signal lines is schematically shown.

FIG. 20 shows a partial enlarged view of a display substrate according to the exemplary embodiments of the present disclosure, in which a staggering design of stacked signal lines is schematically shown.

As shown in FIG. 20, in the embodiments of the present disclosure, an orthographic projection of at least part of each of the first initialization voltage signal line 86, the second initialization voltage signal line 87 and the third initialization voltage signal line 88 on the base substrate does not overlap with the orthographic projection of the control signal line on the base substrate. That is, in a case of a stack design, a portion, such as regions shown by dashed rectangular box and dashed elliptical box near the first initialization voltage signal line 86 in FIG. 20, of the first initialization voltage signal line 86 located in the third conductive layer 33 is staggered with the control signal line (such as the second reset control signal line or a third reset control signal line 84) located below and located in the first conductive layer 31. A portion of the third initialization voltage signal line 88 is staggered with the control signal line (such as the light emission control signal line 85) located below and located in the first conductive layer 31, such as regions shown by dashed rectangular box near the third initialization voltage signal line 88 in FIG. 20. The second initialization voltage signal line 87 located in the fourth conductive layer 34 is staggered with the control signal line (such as the scanning control signal line 81) located below and located in the first conductive layer 31.

As shown in FIG. 20, an arrow represents a distance between adjacent signal line and via hole. It should be understood that the distance between adjacent signal line and via hole needs to meet a specified process specification. On a basis of meeting the specified process specification, a partial staggering design of the initialization voltage signal line with the control signal line below may reduce an overlapping area between the two signal lines, thereby reducing a load on the signal lines.

Figure 21:
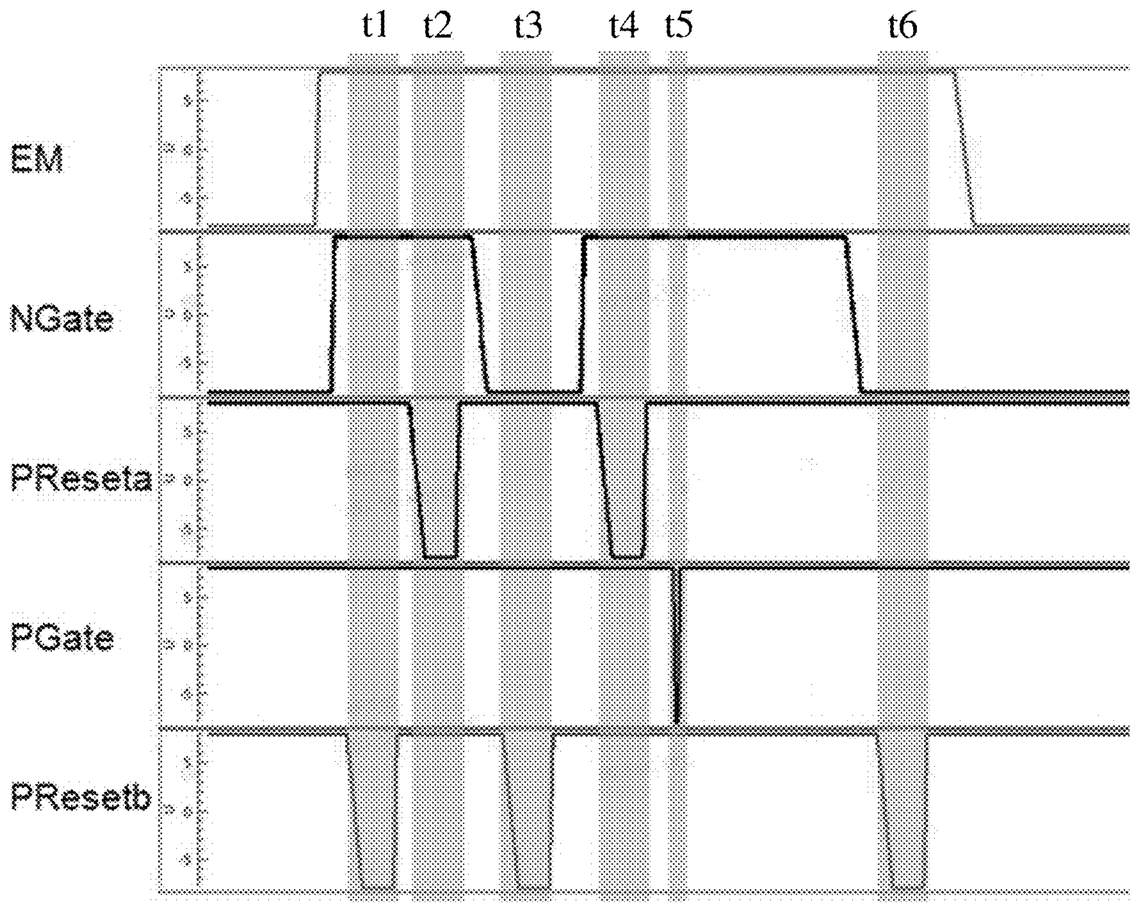
FIG. 21 shows a timing sequence diagram of signals used to drive a pixel driving circuit according to other exemplary embodiments of the present disclosure.

FIG. 21 shows a timing sequence diagram of signals used to drive a pixel driving circuit according to other exemplary embodiments of the present disclosure.

In the exemplary embodiments shown in FIG. 2 and FIG. 21, the 8T1C circuit includes eight thin film transistors (T1~T8), where T2 is an N-type thin film transistor NMOS using an oxide transistor, while T1 and T3~T8 are P-type thin film transistors PMOS using low temperature polysilicon transistors.

Referring to FIG. 2 and FIG. 21 in combination, in the timing sequence diagram, the first reset control signal PReseta is transmitted on the first reset control signal line 83, the second reset control signal or the third reset control signal Presetb is transmitted on the second reset control signal line or the third reset control signal line 84, the light emission control signal EM is transmitted on the light emission control signal line 85, the compensation control signal NGate is transmitted on a compensation control signal line 82, and the scanning control signal PGate is transmitted on the scanning control signal line 81. As shown in FIG. 21, the second reset control signal or the third reset control signal PResetb transmitted on the second reset control signal line or the third reset control signal line 84 is in a valid state in stages t1, t3 and t6, while in stages t1, t3 and t6, the first reset control signal Preseta transmitted on the first reset control signal line 83 is in an off state. At this time, the first initialization voltage signal Vinit1 may not be transmitted to the node N1 through the first reset transistor T1. According to the timing sequence diagram in FIG. 21, in stages t2 and t4, the first reset control signal PReseta transmitted on the first reset control signal line 83 is in a valid state, that is, the first reset transistor T1 is turned on in stages t2 and t4. That is to say, the second reset control signal PResetb transmitted on the second reset control signal line 84 is separated from the first initialization voltage signal Vinit1 in the timing sequence. Therefore, the second reset control signal line or the third control signal line 84 may be stacked with the first initialization voltage signal line 86 so as to achieve a stack of different film layers of the display substrate without interference of signals on the signal lines, so that a space utilization of the signal lines may be improved, and the pixels may be arranged at a higher PPI on the basis of meeting existing process specifications, that is, a design of high PPI pixels may be achieved.

As shown in FIG. 21, in the timing sequence diagram, the first scanning control signal PGate transmitted on the first scanning control signal line 81 is in a valid state in stage t5, while in stage t5, the second reset control signal or the third reset control signal PResetb transmitted on the second reset control signal line or the third reset control signal line 84 is at a high level, that is, the second reset transistor T7 and the third reset transistor T8 are both in an off state. At this time, the second initialization voltage signal Vinit2 may not be transmitted to the node N4 through the second reset transistor T7, and the third initialization voltage signal Vinit3 may not be transmitted to the node N2 through the third reset transistor T8. In fact, the second reset control signal PResetb transmitted on the second reset control signal line 84 is at a low level in stages t1, t3 and t6, that is, the second reset transistor T7 and the third reset transistor T8 are turned on in stages t1, t3 and t6. According to the timing sequence diagram, an on/off state of the first reset control signal Preseta transmitted on the first reset control signal line 83 is different from an on/off state of the second reset control signal or the third reset control signal Presetb in stages t1 to t6. For example, the first reset control signal Preseta is in a valid state in stages t2 and t4, and is in an off state at other stages. The second reset control signal Presetb is in a valid state in stages t1, t3 and t6, that is, the second reset transistor T7 or the third reset transistor T8 is controlled to turn on in stages t1, t3 and t6. The first reset control signal Preseta transmitted on the first reset control signal line 83 is separated from the second initialization voltage signal Vinit2 in the timing sequence. Therefore, the first reset control signal line may be stacked with the second initialization voltage signal line so as to achieve a stack of different film layers of the display substrate without interference of signals on the signal lines, so that the space utilization of the signal lines may be improved, and the pixels may be arranged at a higher PPI on the basis of meeting existing process specifications, that is, a design of high PPI pixels may be achieved.

In the timing sequence diagram, the light emission control signal EM transmitted on the light emission control signal line 85 is in an invalid state in stages t1 to t6. The second reset control signal or the third reset control signal PResetb transmitted on the second reset control signal line or the third reset control signal line 84 is at a low level in stages t1, t3 and t6, that is, the second reset transistor T7 and the third reset transistor T8 are turned on in stages t1, t3 and t6. That is to say, the light emission control signal EM transmitted on the light emission control signal line 85 is separated from the third initialization voltage signal Vinit3 in the timing sequence.

In the embodiments of the present disclosure, a stack design may be adopted for the signal lines used to transmit signals separated in the timing sequence. For example, since the second reset control signal PResetb transmitted on the second reset control signal line or the third reset control signal line 84 is separated from the first initialization voltage signal Vinit1 in the timing sequence, the second reset control signal line or the third reset control signal line 84 may be stacked with the first initialization voltage signal line 86.

Since the first reset control signal PReseta transmitted on the first reset control signal line 83 is separated from the second initialization voltage signal Vinit2 in the timing sequence, the first reset control signal line 81 may be stacked with the second initialization voltage signal line 87; since the light emission control signal EM transmitted on the light emission control signal line 85 is separated from the second initialization voltage signal or the third initialization voltage signal Vinit3 in the timing sequence, the light emission control signal line 85 may be stacked with the third initialization voltage signal line 88. In this way, since the signals transmitted on the stacked signal lines are staggered in the timing sequence, there is no adverse effect on the signals. Meanwhile, it is possible to effectively utilize the space of the display substrate for layout, which may help achieve the high PPI display panel.

In some optional embodiments of the present disclosure, the pixel driving circuit includes the first reset transistor, and the first reset transistor includes the gate electrode, the source electrode, and the drain electrode. The initialization voltage signal line includes the first initialization voltage signal line electrically connected to the source electrode or the drain electrode of the first reset transistor. The orthographic projection of the first initialization voltage signal line on the base substrate overlaps at least partially with the orthographic projection of the control signal line on the base substrate, and the control signal line includes the reset control signal line. For example, in the pixel driving circuit, only the orthographic projection of the first initialization voltage signal line on the base substrate overlaps at least partially with the orthographic projection of the control signal line on the base substrate, and other wire portions do not overlap. The control signal line in this example may include the second reset control signal line used to control the gate electrode of the second reset transistor.

In some optional embodiments of the present disclosure, the pixel driving circuit includes the second reset transistor, and the second reset transistor includes the gate electrode, the source electrode, and the drain electrode. The initialization voltage signal line includes the second initialization voltage signal line electrically connected to the source electrode or the drain electrode of the second reset transistor. The orthographic projection of the second initialization voltage signal line on the base substrate overlaps at least partially with the orthographic projection of the control signal line on the base substrate, and the control signal line includes the scanning control signal line. For example, in the pixel driving circuit, only the orthographic projection of the second initialization voltage signal line on the base substrate overlaps at least partially with the orthographic projection of the control signal line on the base substrate, and other wire portions do not overlap. The control signal line here may include the first scanning control signal line used to control the gate electrode of the data writing transistor.

In some optional embodiments of the present disclosure, the pixel driving circuit includes the third reset transistor, and the third reset transistor includes the gate electrode, the source electrode, and the drain electrode. The initialization voltage signal line includes the third initialization voltage signal line electrically connected to the source electrode or the drain electrode of the third reset transistor. The orthographic projection of the third initialization voltage signal line on the base substrate overlaps at least partially with the orthographic projection of the control signal line on the base substrate, and the control signal line includes the light emission control signal line. For example, in the pixel driving circuit, only the orthographic projection of the third initialization voltage signal line on the base substrate overlaps at least partially with the orthographic projection of the control signal line on the base substrate, and other wire portions do not overlap. The control signal line here may include, for example, the light emission control signal line used to control the gate electrode(s) of the first light emission control transistor and/or the second light emission control transistor.

Figure 22:
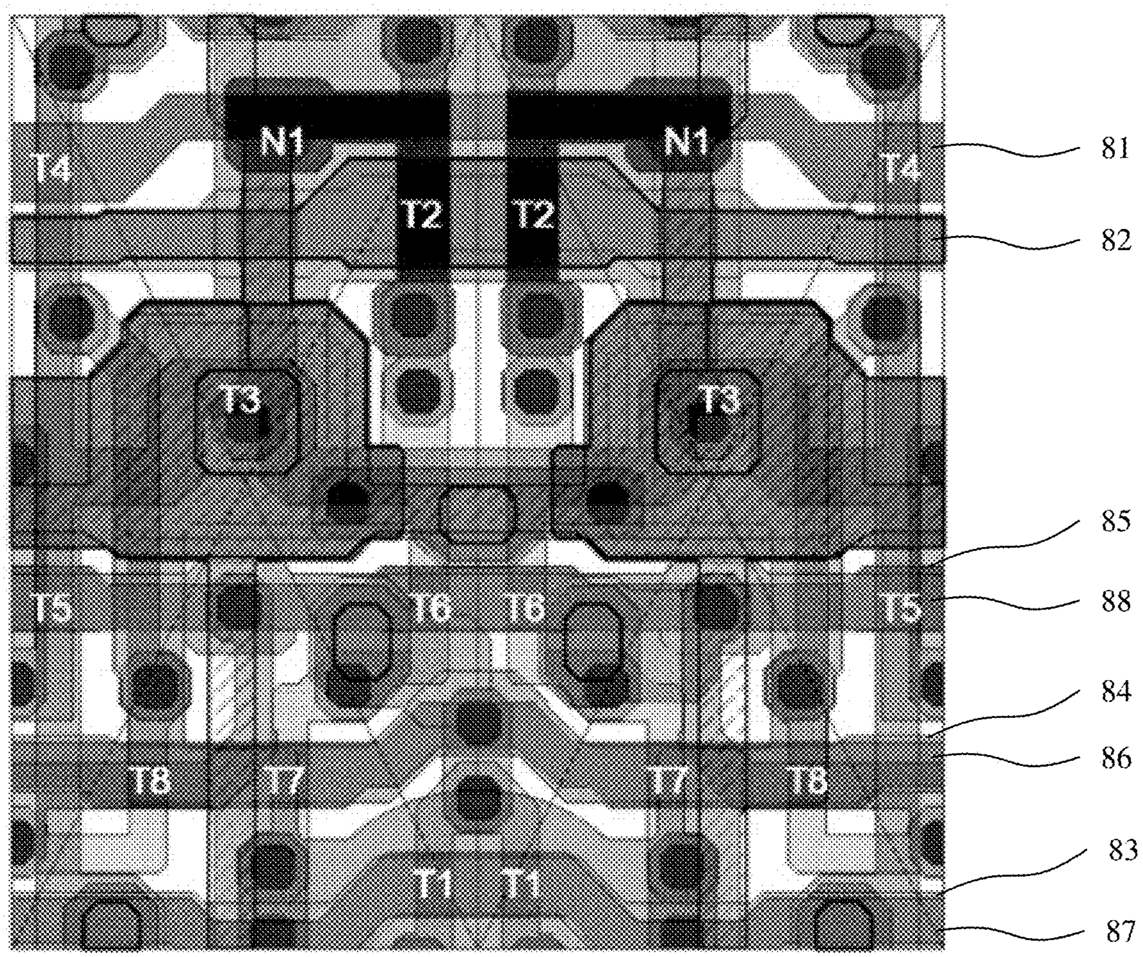
FIG. 22 shows a partial plan view of a display substrate according to other exemplary embodiments of the present disclosure.
Figure 23:
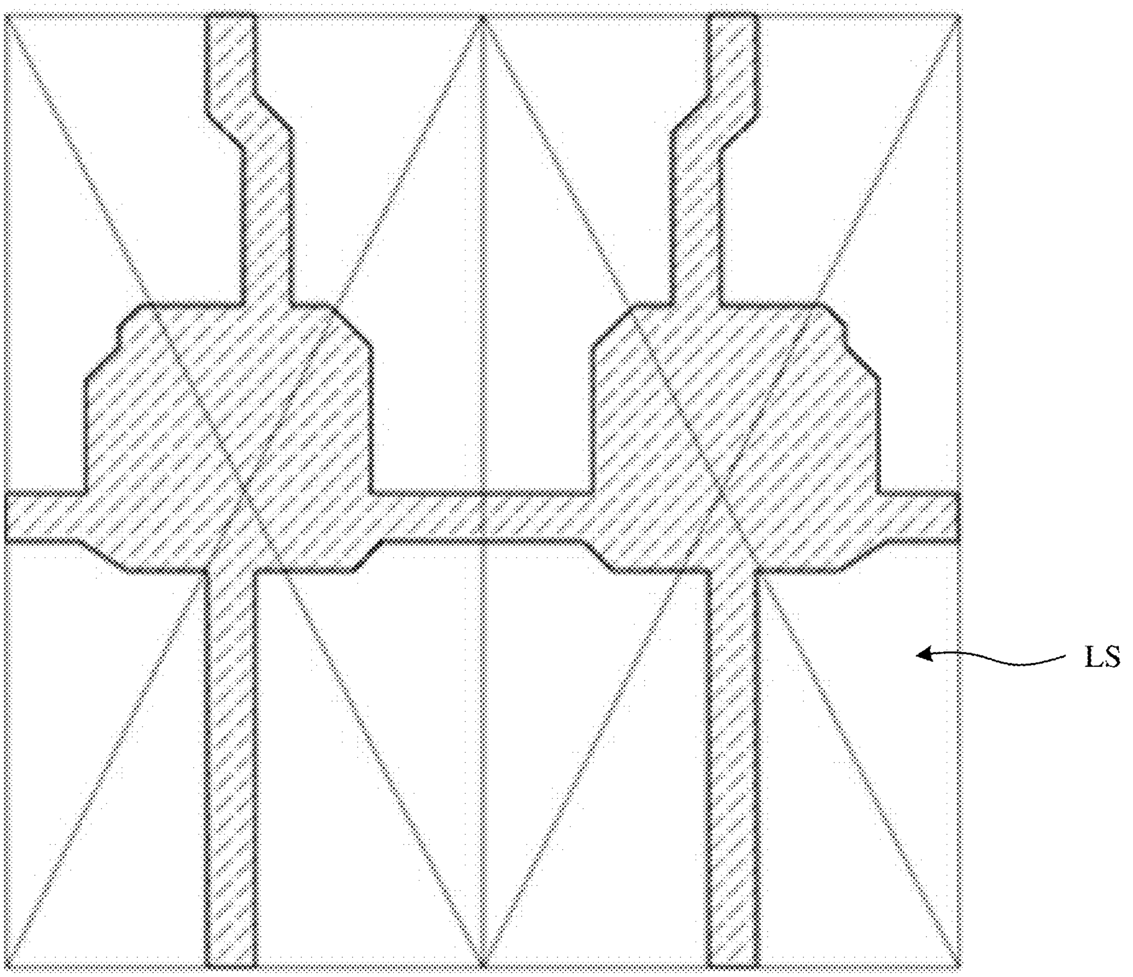
FIG. 23 to FIG. 32 show partial plan views of a display substrate according to some exemplary embodiments of the present disclosure, where
Figure 24:
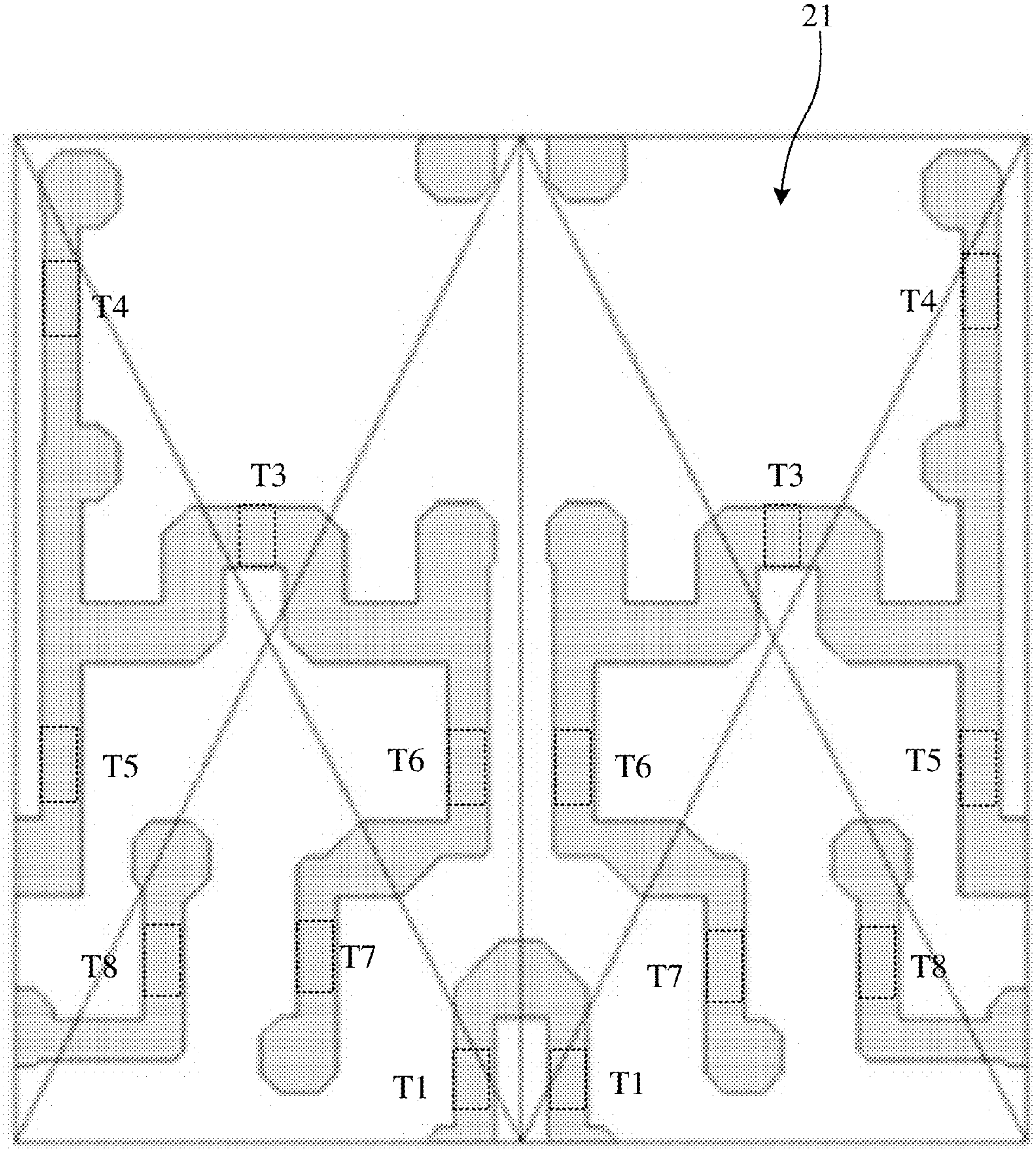
Figure 25:
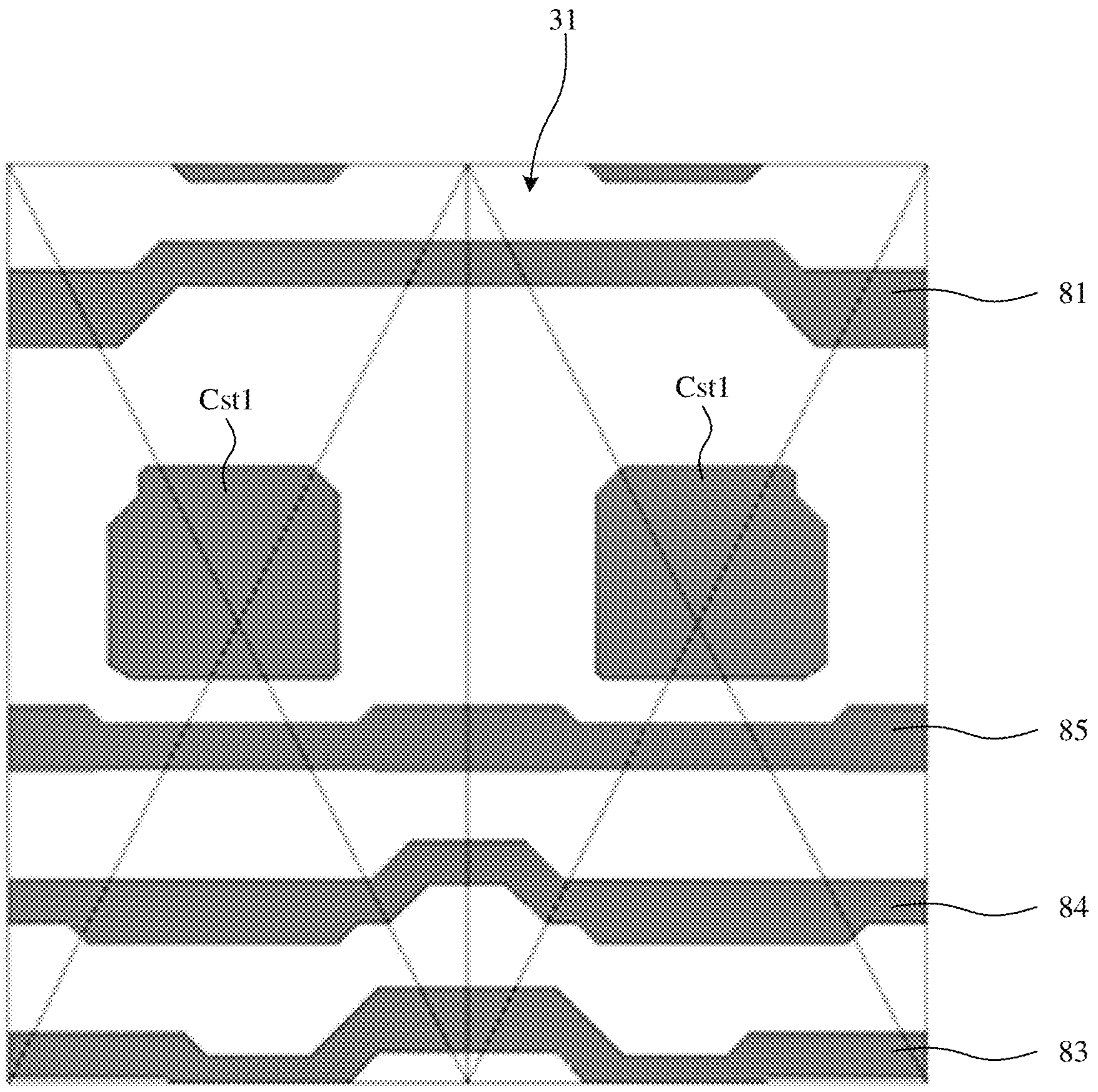
Figure 26:
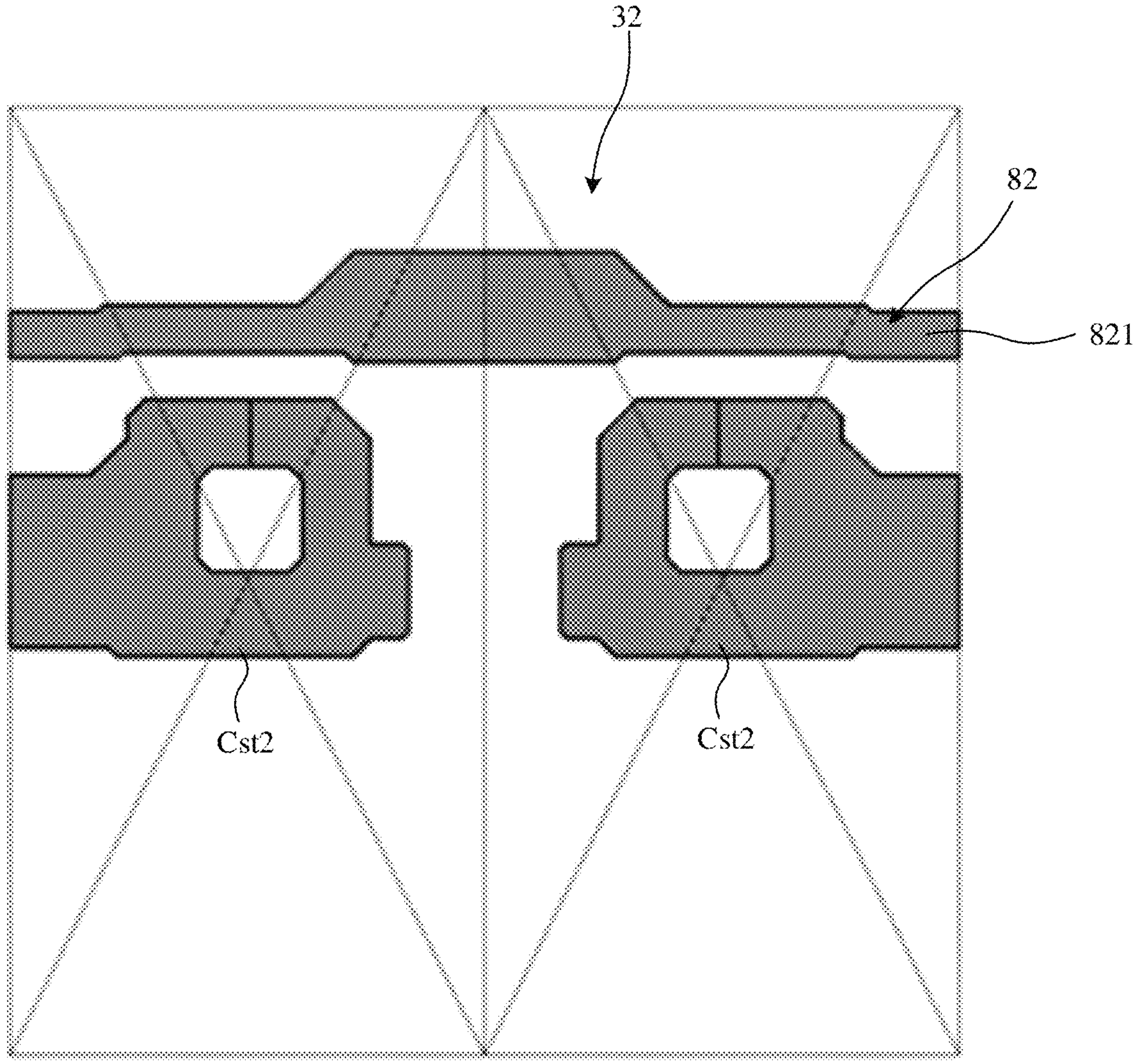
Figure 27:
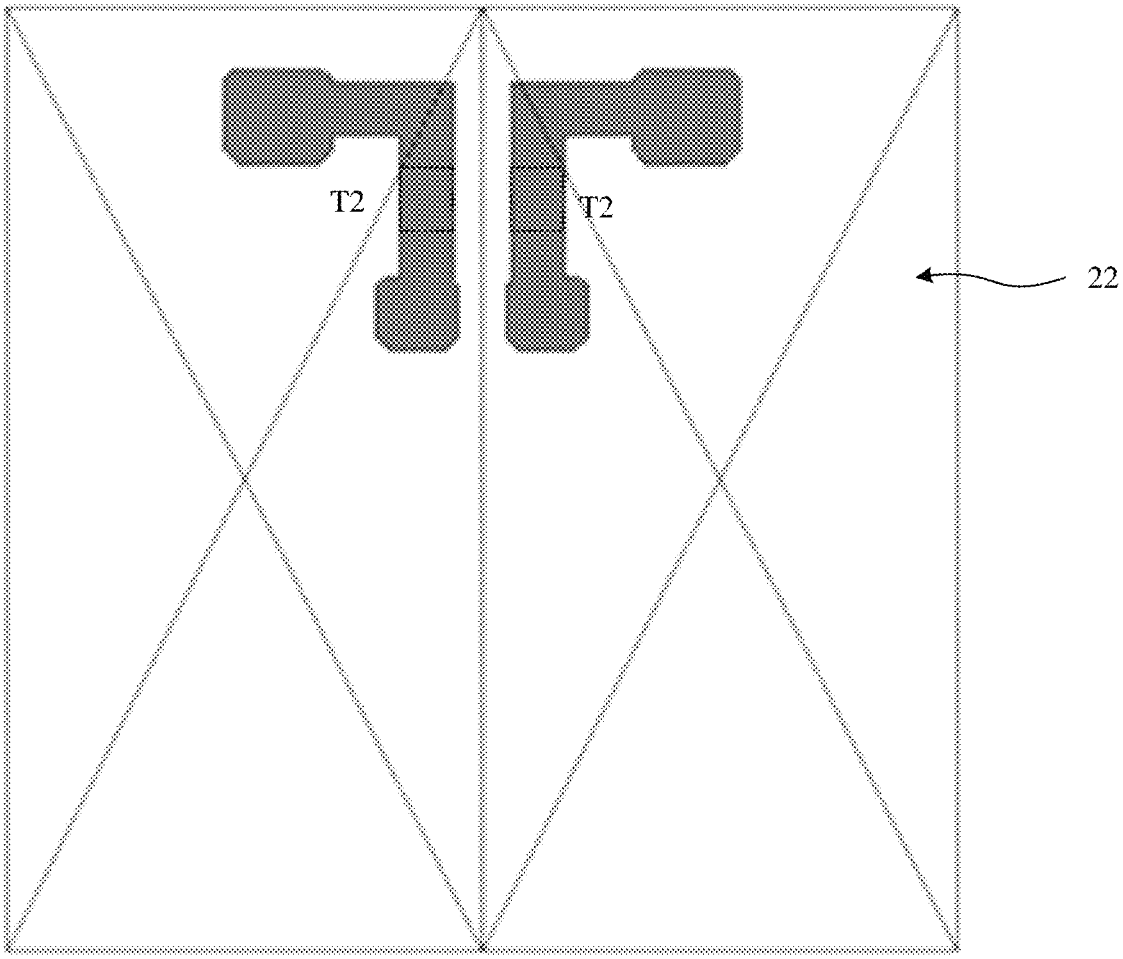
Figure 28:
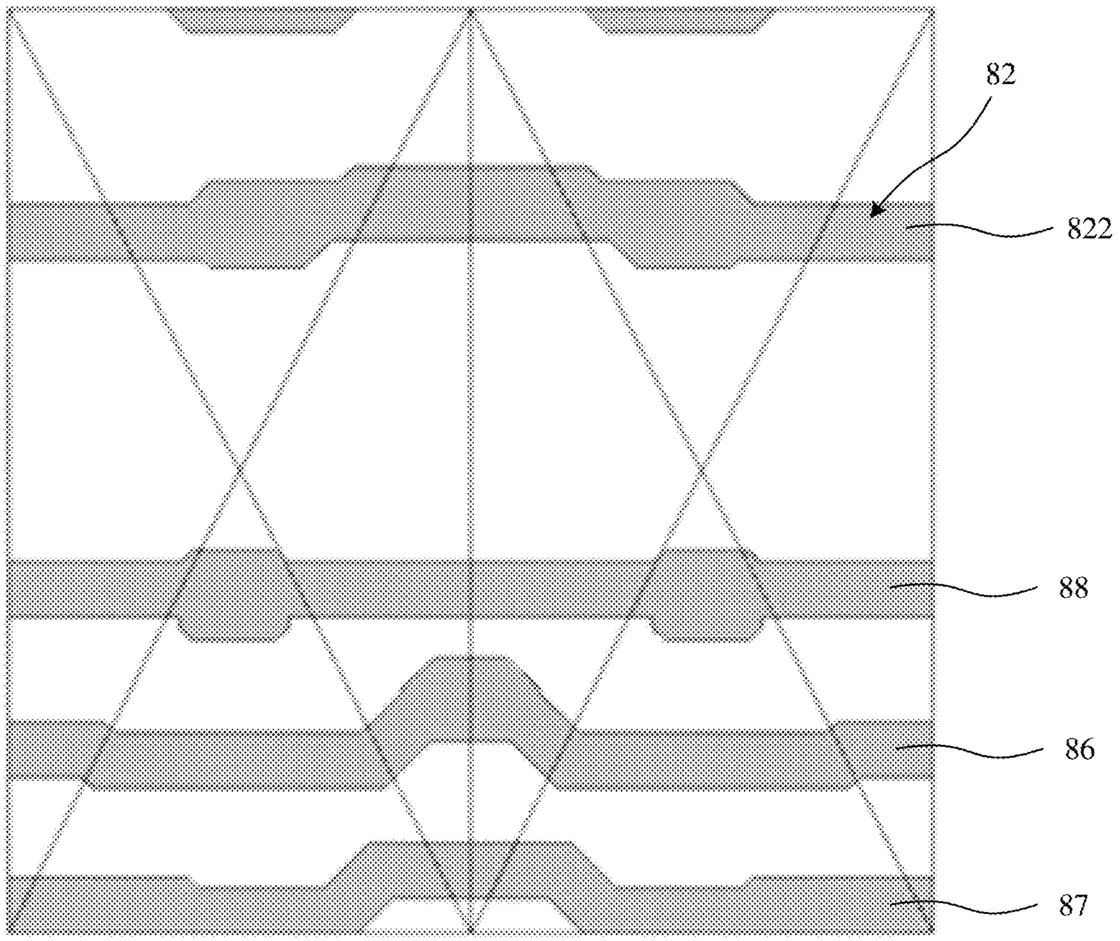
Figure 29:
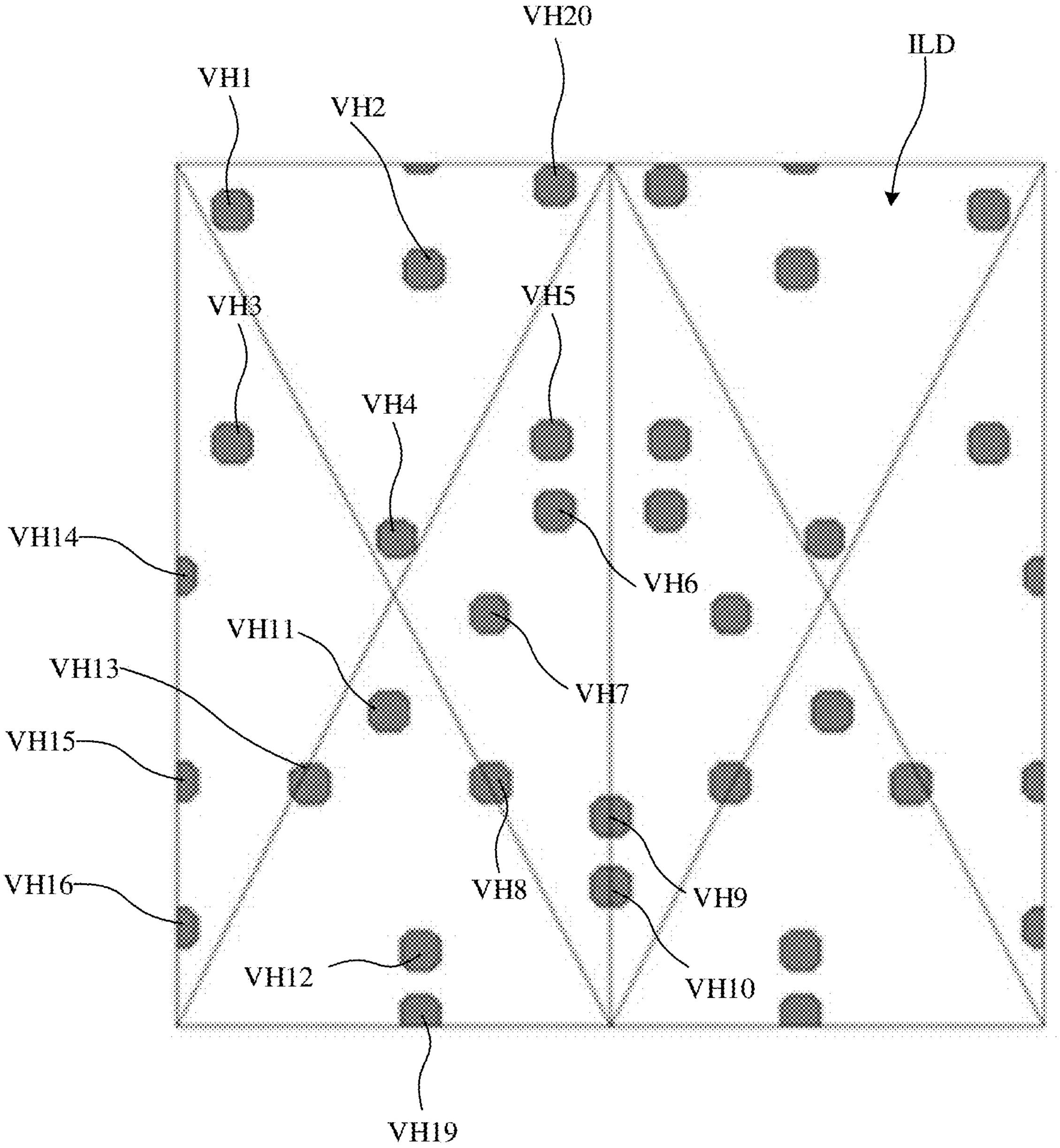
Figure 30:
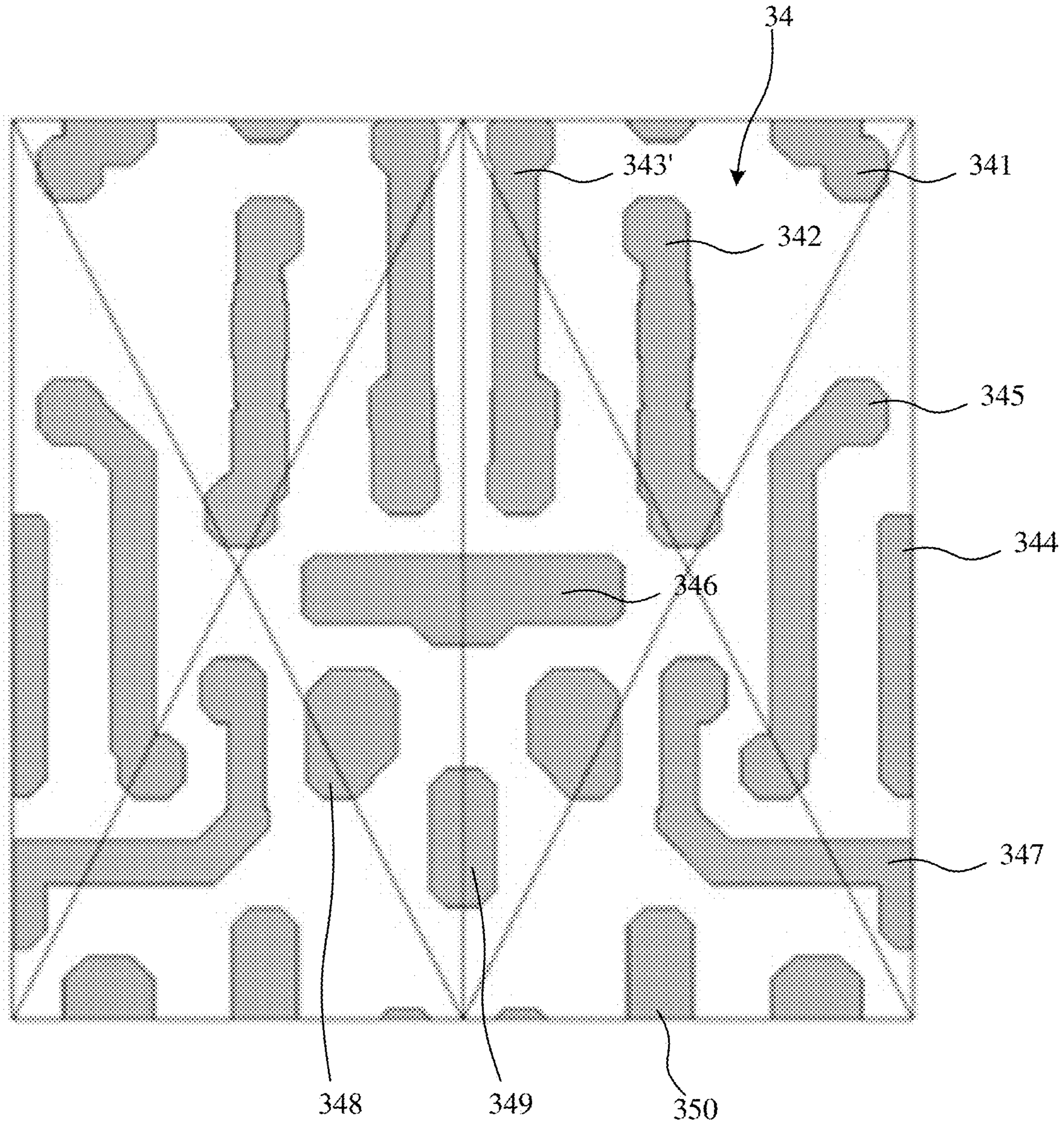
Figure 31:
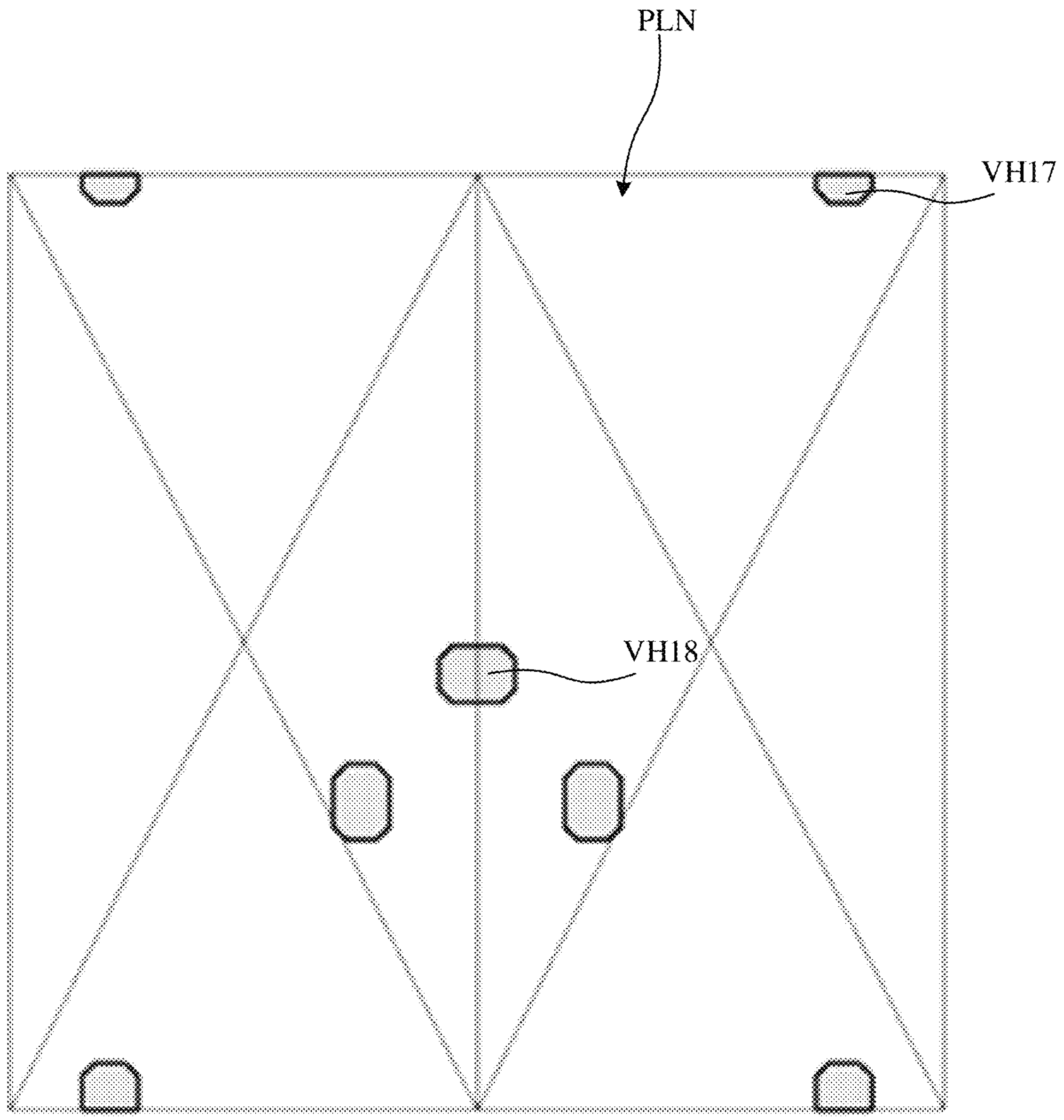
Figure 32:
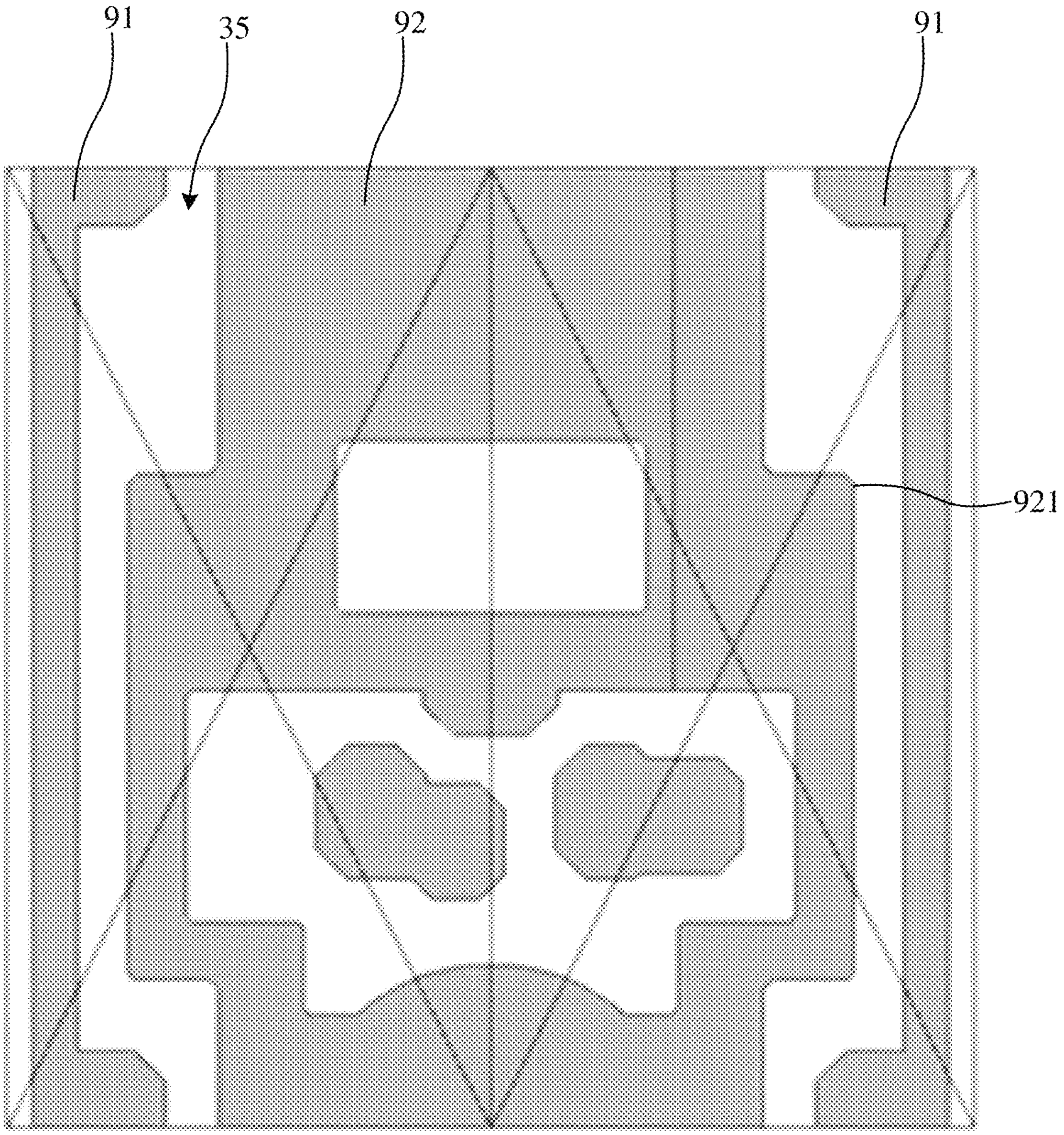

FIG. 22 shows a partial plan view of a display substrate according to other exemplary embodiments of the present disclosure, in which pixel driving circuits of two adjacent sub-pixels are schematically shown. FIG. 23 to FIG. 32 respectively show partial plan views of the display substrate according to the embodiment of FIG. 22 of the present disclosure, where FIG. 23 shows a partial plan view of a light shielding layer of the display substrate, FIG. 24 shows a partial plan view of a first semiconductor layer of the display substrate, FIG. 25 shows a partial plan view of a first conductive layer of the display substrate, FIG. 26 shows a partial plan view of a second conductive layer of the display substrate, FIG. 27 shows a partial plan view of a second semiconductor layer of the display substrate, FIG. 28 shows a partial plan view of a third conductive layer of the display substrate, FIG. 29 shows a partial plan view of a first insulation layer of the display substrate, in which a plurality of via holes located in the first insulation layer are schematically shown, FIG. 30 shows a partial plan view of a fourth conductive layer of the display substrate, FIG. 31 shows a partial plan view of a second insulation layer of the display substrate, in which a plurality of via holes located in the second insulation layer are schematically shown, and FIG. 32 shows a partial plan view of a fifth conductive layer of the display substrate.

Referring to FIG. 21 to FIG. 22 and FIG. 50, the display substrate may include a base substrate 10, a light shielding layer LS provided on the base substrate 10, a first semiconductor layer 21 provided on a side of the light shielding layer LS away from the base substrate, a first conductive layer 31 provided on a side of the first semiconductor layer 21 away from the base substrate, a second conductive layer 32 provided on a side of the first conductive layer 31 away from the base substrate, a second semiconductor layer 22 provided on a side of the second conductive layer 32 away from the base substrate, a third conductive layer 33 provided on a side of the second semiconductor layer 22 away from the base substrate, a fourth conductive layer 34 provided on a side of the third conductive layer 33 away from the base substrate, and a fifth conductive layer 35 provided on a side of the fourth conductive layer 34 away from the base substrate.

FIG. 24 shows the first semiconductor layer 21. For example, as shown in FIG. 24, the first semiconductor layer 21 may be used to manufacture an active layer of the first reset transistor T1, an active layer of the driving transistor T3, an active layer of the data writing transistor T4, an active layer of the second light emission control transistor T5, an active layer of the first light emission control transistor T6, an active layer of the second reset transistor T7, and an active layer of the third reset transistor T8, so as to form channel regions of the above-mentioned transistors. The first semiconductor layer 21 may include active region (channel region) patterns and doping region (source/drain region) patterns of the above-mentioned transistors of each sub-pixel, and the active region patterns and the doping region patterns of the above-mentioned transistors in a same pixel driving circuit may be integrated.

For example, the first semiconductor layer 21 may include a low temperature polysilicon layer formed as a whole, and the source region and the drain region may be conductized by doping or other means so as to achieve an electrical connection of structures. For example, the source region and the drain region may be regions doped with p-type impurities.

FIG. 25 shows the first conductive layer 31 located on a side of the first semiconductor layer 21 away from the base substrate. For example, as shown in FIG. 25, the first scanning control signal line 81, the first capacitor electrode Cst1 of the storage capacitor Cst, the light emission control signal line 85, the second reset control signal line 84 and the first reset control signal line 83 may be located in the first conductive layer 31. For example, the first conductive layer 31 may include the gate electrode of the first reset transistor T1, the gate electrode of the driving transistor T3, the gate electrode of the data writing transistor T4, the gate electrode of the second light emission control transistor T5, the gate electrode of the first light emission control transistor T6, the gate electrode of the second reset transistor T7, and the gate electrode of the third reset transistor T8.

It should be noted that dashed rectangular boxes in FIG. 25 show overlapping portions of the first semiconductor layer 21 and the first conductive layer 31, namely the channel regions. For the channel region of each transistor, active semiconductor layers on two sides of each channel region are conductized as the first electrode and the second electrode of each transistor through ion doping and other processes. A source electrode and a drain electrode of a transistor may be symmetrical in structure, and thus may have no difference in physical structure. In the embodiments of the present disclosure, in order to distinguish the transistor, except for the gate electrode serving as a control electrode, one of the electrodes is directly described as the first electrode and the other is described as the second electrode. Therefore, in the embodiments of the present disclosure, the first electrode and the second electrode may be interchanged as needed in all or part of the transistors in the embodiments of the present disclosure.

For example, referring to FIG. 22, FIG. 24 and FIG. 25 in combination, the gate electrode of the first reset transistor T1 may be a portion of the first reset control signal line 83 overlapping with the first semiconductor layer 21. The gate electrode of the data writing transistor T4 may be a portion of the first scanning control signal line 81 overlapping with the first semiconductor layer 21. The gate electrode of the first light emission control transistor T6 may be a first portion of the light emission control signal line 85 overlapping with the first semiconductor layer 21, and the gate electrode of the second light emission control transistor T5 may be a second portion of the light emission control signal line 85 overlapping with the first semiconductor layer 21.

The gate electrode of the third reset transistor T8 is a first portion of the second reset control signal line 84 overlapping with the first semiconductor layer 21, and the gate electrode of the second reset transistor T7 is a second portion of the second reset control signal line 84 overlapping with the first semiconductor layer 21.

FIG. 26 shows the second conductive layer 32 located on a side of the first conductive layer 31 away from the base substrate. For example, as shown in FIG. 26, the second scanning control signal line 82, the second capacitor electrode Cst2 of the storage capacitor Cst and the compensation control signal line 82 may be located in the second conductive layer 32.

FIG. 27 shows the second semiconductor layer 22 located on a side of the second conductive layer 32 away from the base substrate. For example, as shown in FIG. 27, the second semiconductor layer 22 includes the channel region of the compensation transistor T2. For example, in a case that an oxide semiconductor is used in the active layer of the compensation transistor T2, the oxide semiconductor instead of the low temperature polysilicon material may be used in the transistor due to good hysteresis characteristics and low leakage current of the oxide semiconductor, so as to form a low temperature polysilicon oxide (LTPO) pixel driving circuit, which may achieve a low leakage and improve a stability of a gate voltage of the transistor.

For example, as shown in FIG. 22, FIG. 26 and FIG. 27, the gate electrode of the compensation transistor T2 may be a portion of the second scanning control signal line 82 overlapping with the second semiconductor layer 22, specifically a portion of a first scanning control signal sub-line 821 and a second scanning control signal sub-line 822 overlapping with the second semiconductor layer 22.

FIG. 28 shows the third conductive layer 33 on a side of the second semiconductor layer 22 away from the base substrate. For example, as shown in FIG. 28, another second scanning control signal line 82, the first initialization voltage signal line 86, the second initialization voltage signal line 87 and the third initialization voltage signal line 88 may be located in the third conductive layer 33.

For example, as shown in FIG. 22 to FIG. 28, another second scanning control signal line 82 overlaps with the channel region of the compensation transistor T2, and the compensation transistor T2 includes a top gate electrode and a bottom gate electrode located on two sides of the active layer.

That is to say, in the embodiments of the present disclosure, the compensation transistor T2 may have a dual gate structure, that is, including a top gate electrode and a bottom gate electrode.

In the embodiments of the present disclosure, the second scanning control signal line 82 may include the first scanning control signal sub-line 821 and the second scanning control signal sub-line 822. The second scanning control signal line located in the second conductive layer 32 is described as the first scanning control signal sub-line 821, and the second scanning control signal line located in the third conductive layer 33 is described as the second scanning control signal sub-line 822. A portion of the first scanning control signal sub-line 821 overlapping with the second semiconductor layer 22 forms the bottom gate electrode of the compensation transistor T2, and a portion of the second scanning control signal sub-line 822 overlapping with the second semiconductor layer 22 forms the top gate electrode of the compensation transistor T2.

For example, the compensation transistor T2 may be an N-type transistor, while the first reset transistor T1, the driving transistor T3, the data writing transistor T4, the second light emission control transistor T5, the first light emission control transistor T6, the second reset transistor T7 and the third reset transistor T8 may be P-type transistors.

FIG. 30 shows the fourth conductive layer 34 located on a side of the third conductive layer 33 away from the base substrate. For example, as shown in FIG. 30, the display substrate may further include a plurality of connecting portions located in the fourth conductive layer 34. For example, the plurality of connecting portions may include a connecting portion 341, a connecting portion 342, a connecting portion 343', a second voltage signal line transfer portion 344, a connecting portion 345, a first power signal line transfer portion 346, a connecting portion 347, a connecting portion 348, a first initialization voltage connecting portion 349, and a connecting portion 350.

FIG. 32 shows the fifth conductive layer 35 located on a side of the fourth conductive layer 34 away from the base substrate. For example, as shown in FIG. 32, the data line 91 and the first power signal line 92 may be located in the fifth conductive layer 35.

Referring to FIG. 22 to FIG. 32 in combination, a layout of the connecting portion 341, the connecting portion 342, the second voltage signal line transfer portion 344, the connecting portion 345, the first power signal line transfer portion 346, the connecting portion 347, the connecting portion 348 and the first initialization voltage connecting portion 349 is the same as the layout shown in FIG. 12, which will not be repeated here.

The connecting portion 343' and the connecting portion 350 in the embodiment have some differences from other connecting portions shown above. Specifically, the connecting portion 343' may be used to electrically connect the first electrode of the compensation transistor T2 to the first electrode of the first light emission control transistor T6, that is, to form the node N3. For example, a portion (such as a middle portion) of the connecting portion 343' is electrically connected to the first electrode of the compensation transistor T2 through the via hole VH5 located in the first insulation layer ILD, another portion (such as one end) of the connecting portion 343' is electrically connected to the first electrode of the first light control transistor T6 through the via hole VH6 located in the first insulation layer ILD, and still another portion (such as the other end) of the connecting portion 343' is electrically connected to the second electrode of the first reset transistor through a via hole VH20 located in the first insulation layer ILD.

The connecting portion 350 may be used to electrically connect the second initialization voltage signal line 87 to the first electrode of the second reset transistor T7. Specifically, the connecting portion 350 is electrically connected to the second initialization voltage signal line 87 through a via hole VH19 and electrically connected to the first electrode of the second reset transistor T7 through the via hole VH12.

Figure 33:
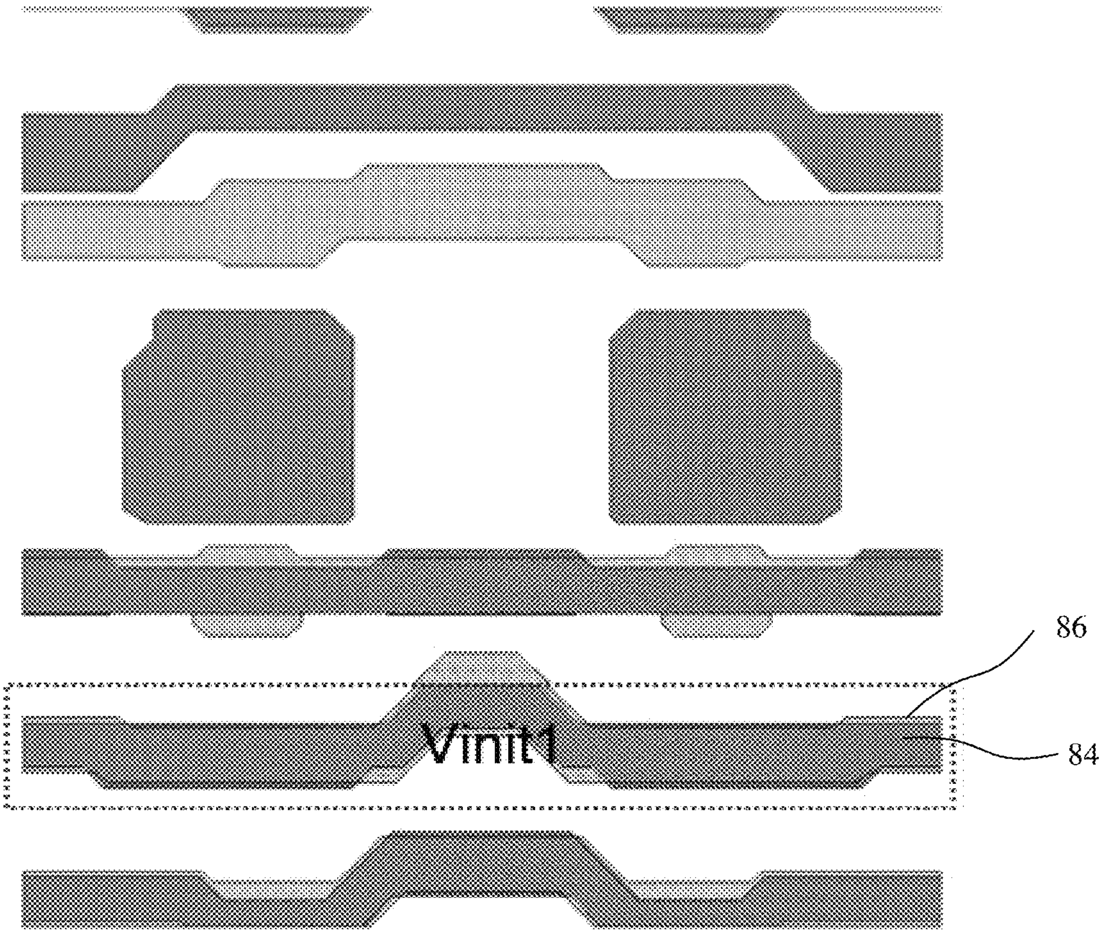
FIG. 33 and FIG. 35 show partial plan views of the display substrate shown in FIG. 23, in which a superimposition of a first conductive layer and a third conductive layer is schematically shown.
Figure 34:
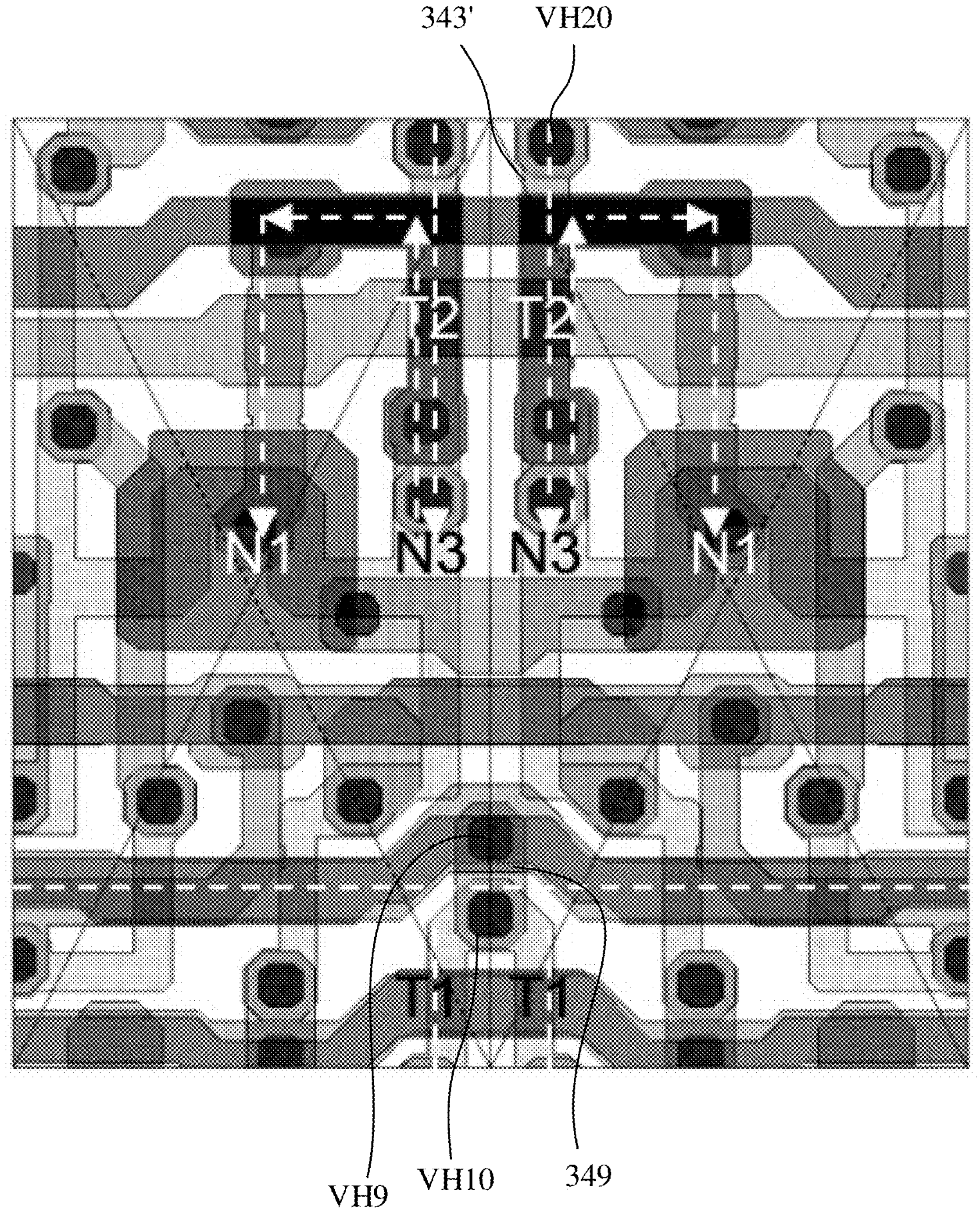
FIG. 34 and FIG. 36 show partial plan views of the display substrate shown in FIG. 23, in which a superimposition of a first conductive layer, a third conductive layer and a fourth conductive layer is schematically shown.
Figure 35:
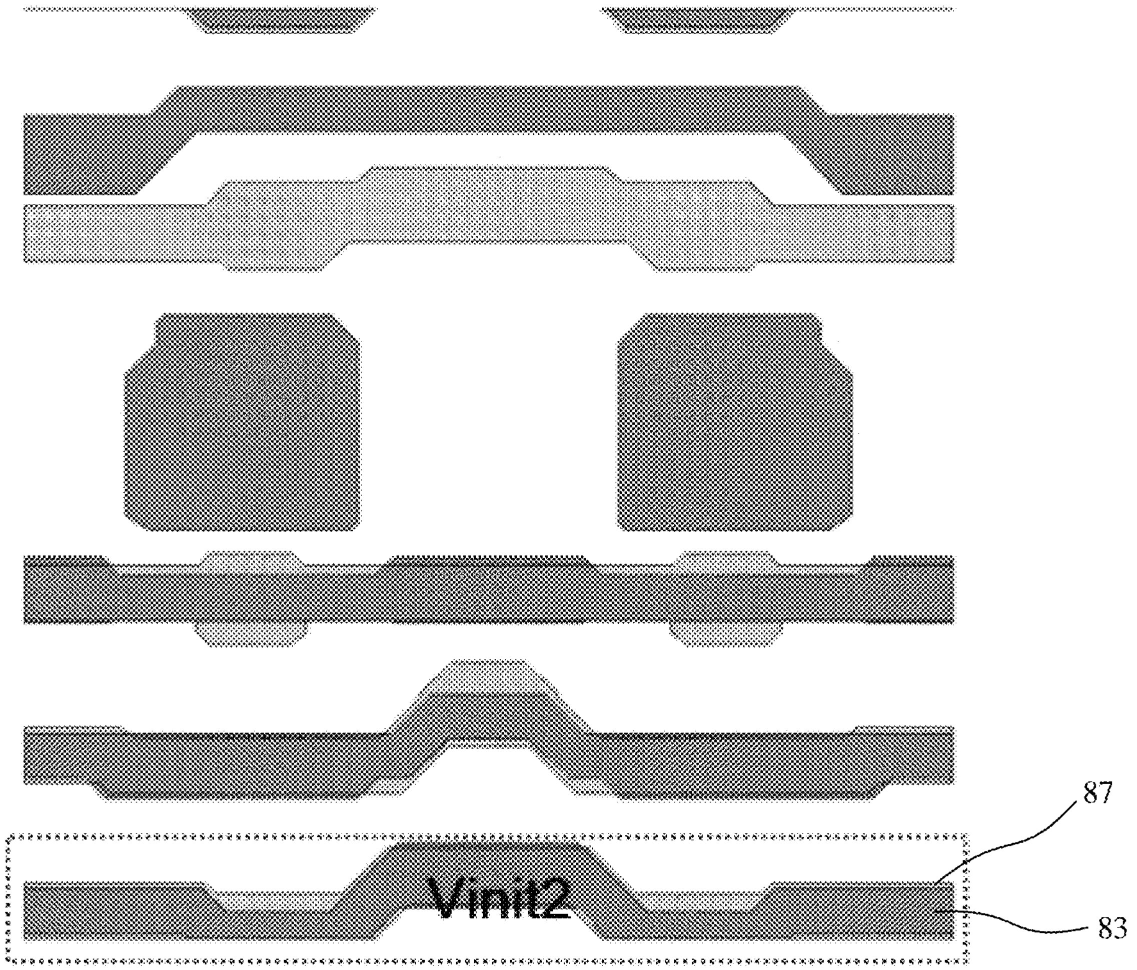
Figure 36:
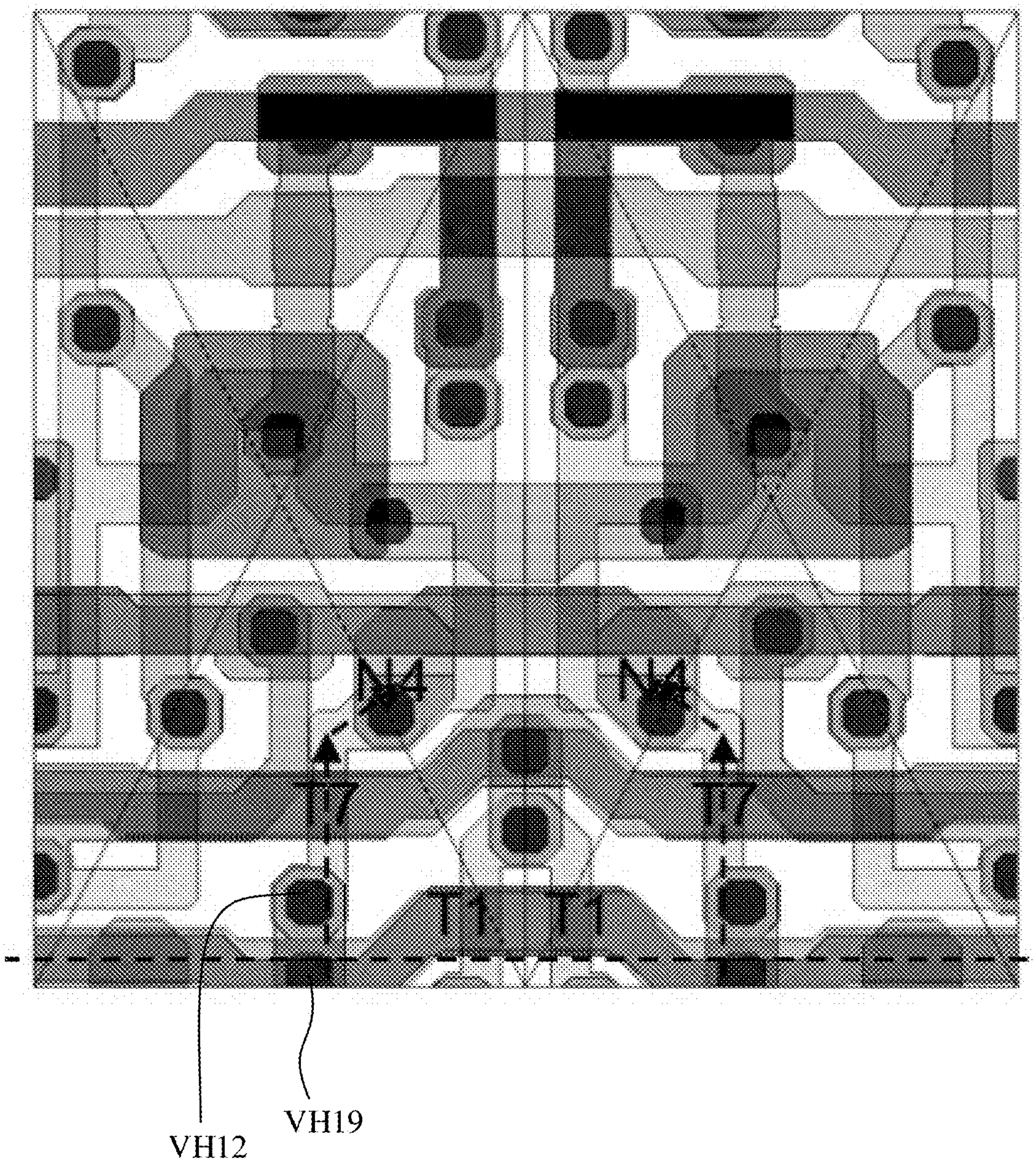

FIG. 33 and FIG. 35 show partial plan views of the display substrate shown in FIG. 23, in which a superimposition of the first conductive layer and the third conductive layer is schematically shown. FIG. 34 and FIG. 36 show partial plan views of the display substrate shown in FIG. 23, in which a superimposition of the first conductive layer, the third conductive layer and the fourth conductive layer is schematically shown.

FIG. 33 schematically shows a structure in which the first initialization voltage signal line 86 is stacked with the second reset control signal line or the third reset control signal line 84. FIG. 34 schematically shows an electrical connection of the first initialization voltage signal line, in which a superimposition of the first conductive layer, the second semiconductor layer, the third conductive layer and the fourth conductive layer is schematically shown.

Referring to FIG. 22 and FIG. 34, the orthographic projection of the first initialization voltage signal line 86 on the base substrate 10 overlaps at least partially with the orthographic projection of the second reset control signal line or the third reset control signal line 84 on the base substrate 10. The first initialization voltage signal line 86 extending in the first direction X is electrically connected to a portion of the first initialization voltage connecting portion 349 through the via hole VH9, another portion (such as the other end) of the first initialization voltage connecting portion 349 is electrically connected to the first electrode of the first reset transistor T1 through the via hole VH10, and the second electrode of the first reset transistor is electrically connected to the connecting portion 343' through the via hole VH20, so that the first initialization voltage signal Vinit may refresh the node N1.

In the embodiments of the present disclosure, with reference to FIG. 21, for example, in stages t2 and t4, NGate is at a high level, T2 is turned on, PReseta is at a low level and is in an on state. That is, in stages t2 and t4, the first reset transistor T1 and the compensation control transistor T2 are turned on, so that the first initialization voltage signal Vinit1 may refresh the node N1. Moreover, in stages t2 and t4, PResetb is at a high level, that is, in an off state. When stacking the first initialization voltage signal line 86 with the second reset control signal line or the third reset control signal line 84, since the signal on the first initialization voltage signal line 86 and the signal on the second reset control signal line or the third reset control signal line 84 are separated in the timing sequence and do not work simultaneously, a signal crosstalk may be prevented.

As shown in FIG. 35 and FIG. 36, the orthographic projection of the second initialization voltage signal line 87 on the base substrate 10 overlaps at least partially with the orthographic projection of the first reset control signal line 83 on the base substrate 10. The second initialization voltage signal line 87 extending in the first direction X is electrically connected to a portion of the connecting portion 350 through the via hole VH19, and another portion (such as the other end) of the connecting portion 350 is electrically connected to the node N4 through the via hole VH20, so that the second initialization voltage signal Vinit2 may refresh the node N4. When stacking the second initialization voltage signal line 87 with the first reset control signal 83, since the signal on the second initialization voltage signal line 87 and the signal on the first reset control signal line are separated in the timing sequence (signal PResetb and signal PReseta are separated) and do not work simultaneously, a signal crosstalk may be prevented.

Figure 37:
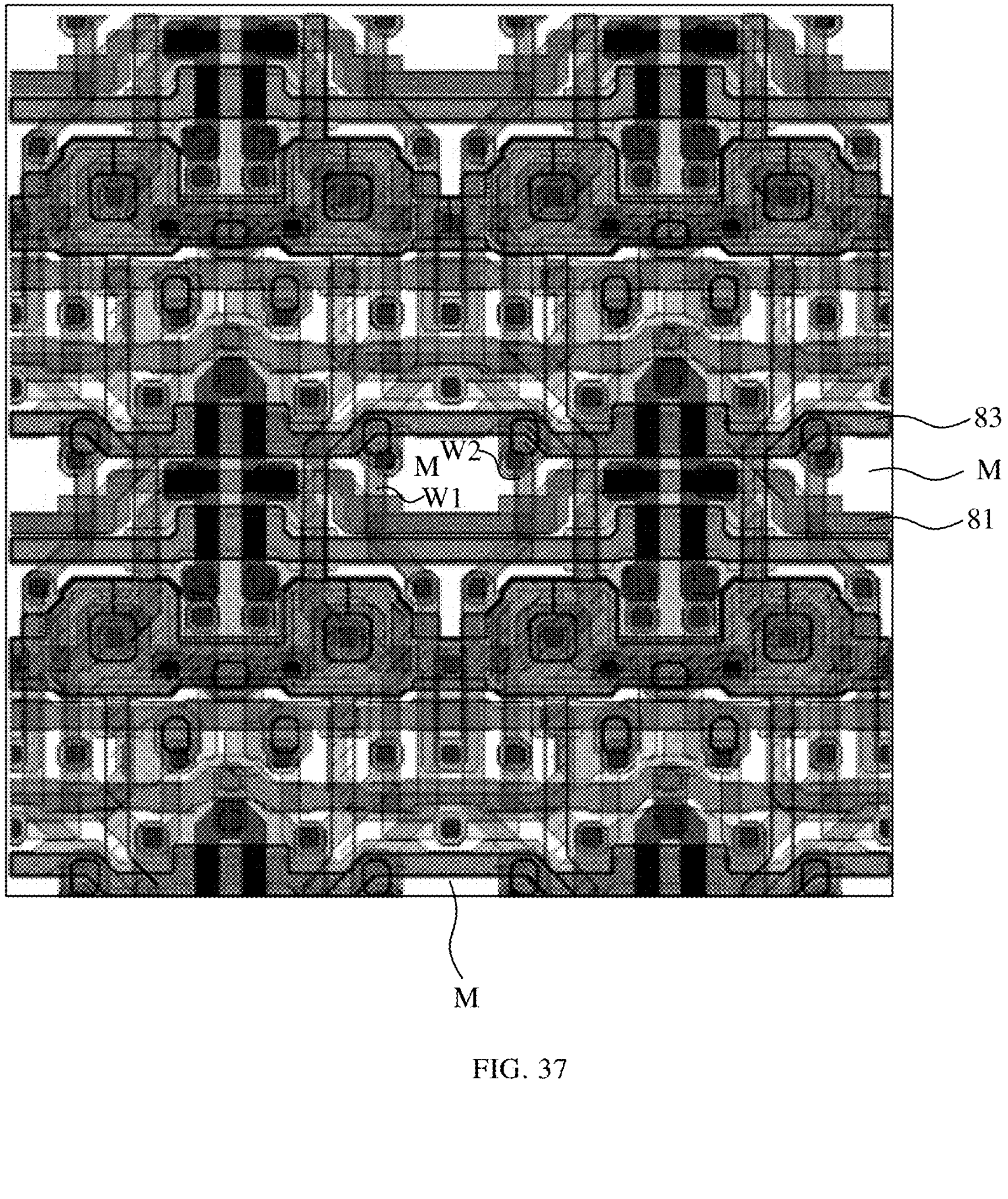
FIG. 37 shows a partial enlarged view of a display substrate in some exemplary embodiments of the present disclosure.

FIG. 37 shows a partial enlarged view of a display substrate of some exemplary embodiments of the present disclosure, in which pixel driving circuits of eight sub-pixels are schematically shown. FIG. 38 to FIG. 47 show schematic diagrams of partial planar structures of the film layers of the display substrate shown in FIG. 37.

Figure 38:
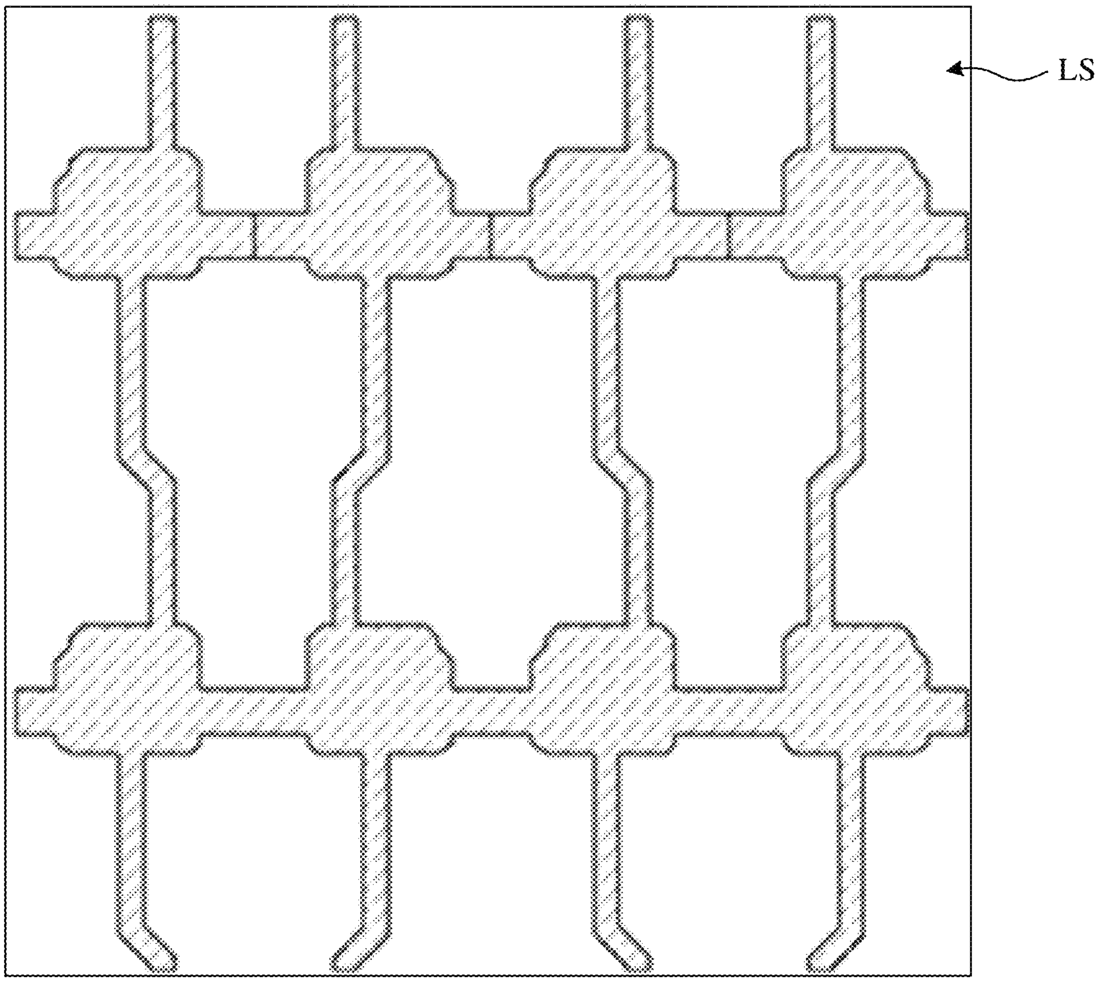
FIG. 38 to FIG. 47 show schematic diagrams of partial planar structures of film layers on the display substrate shown in FIG. 37.
Figure 39:
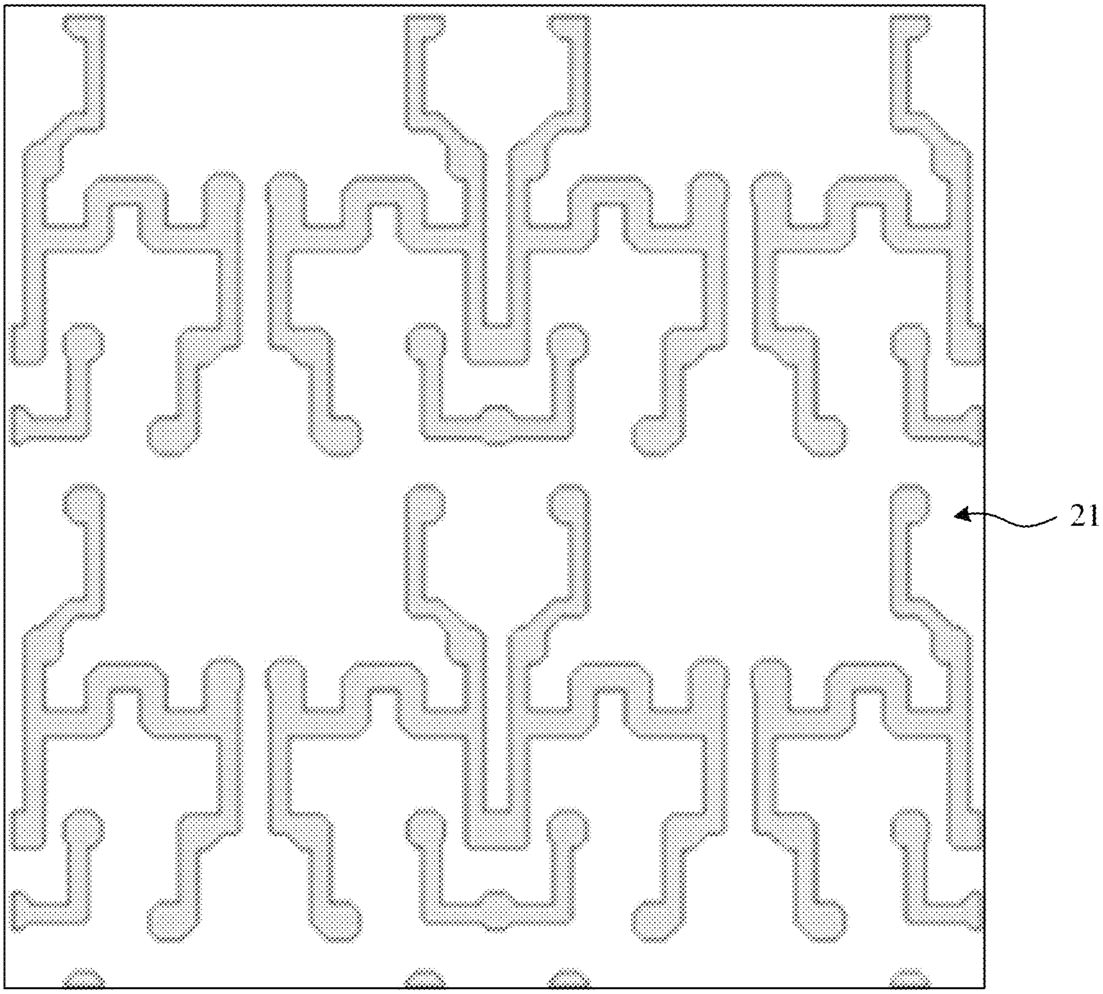
Figure 40:
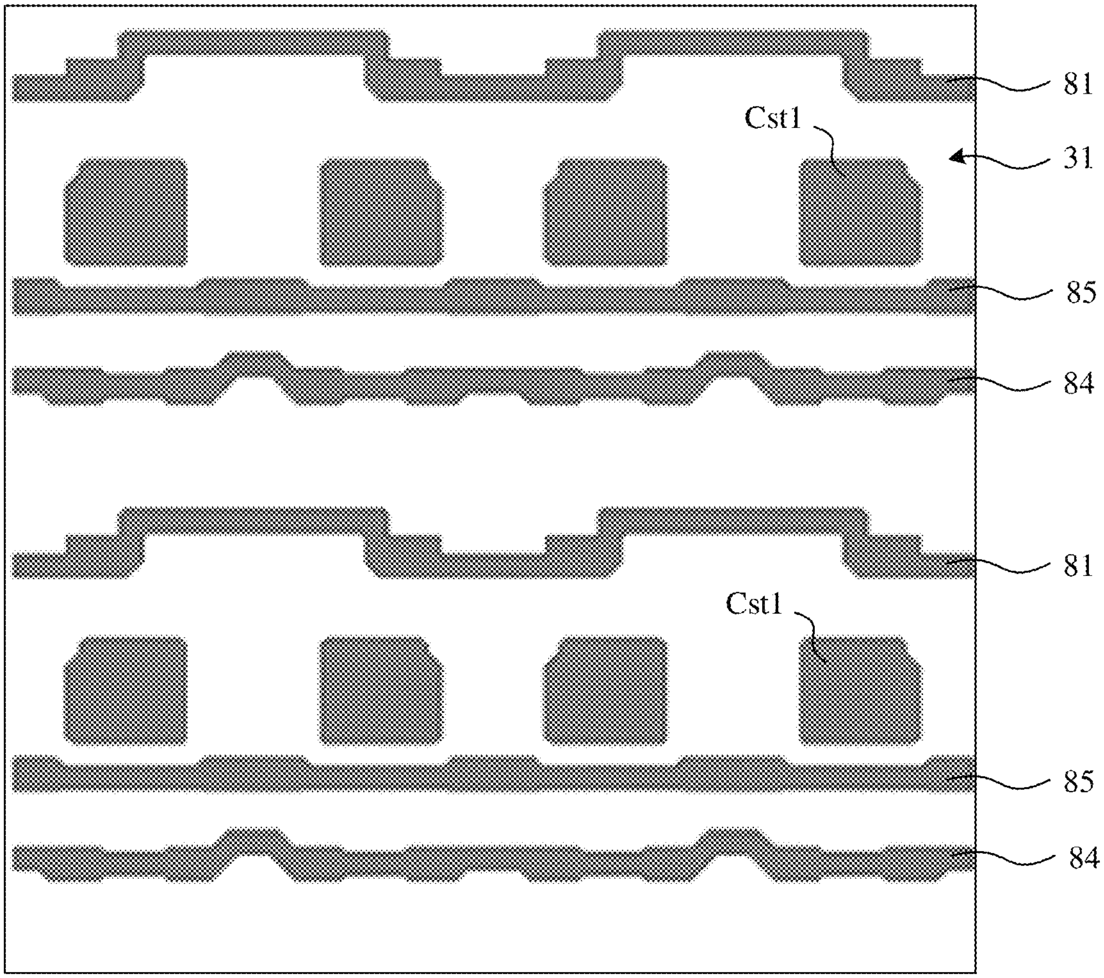
Figure 41:
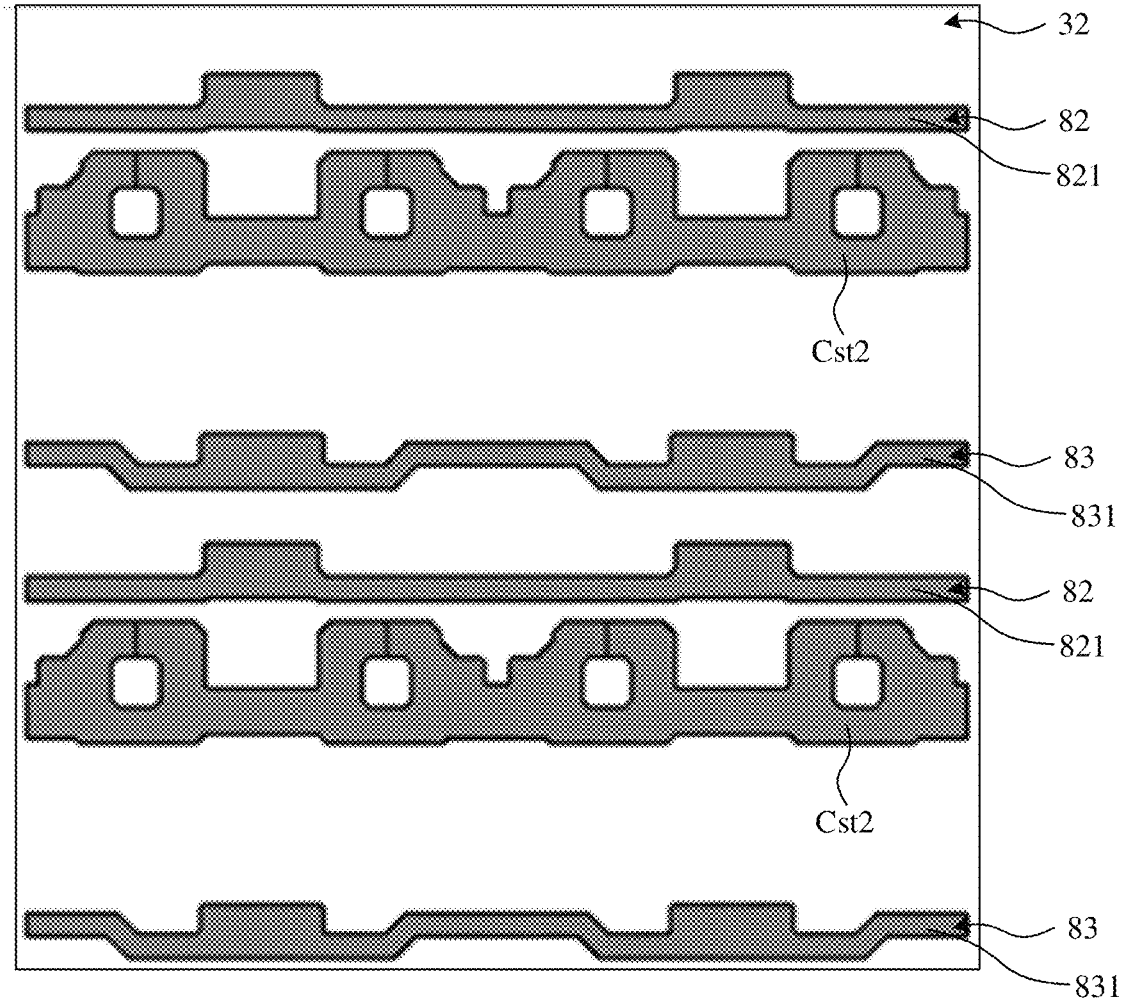
Figure 42:
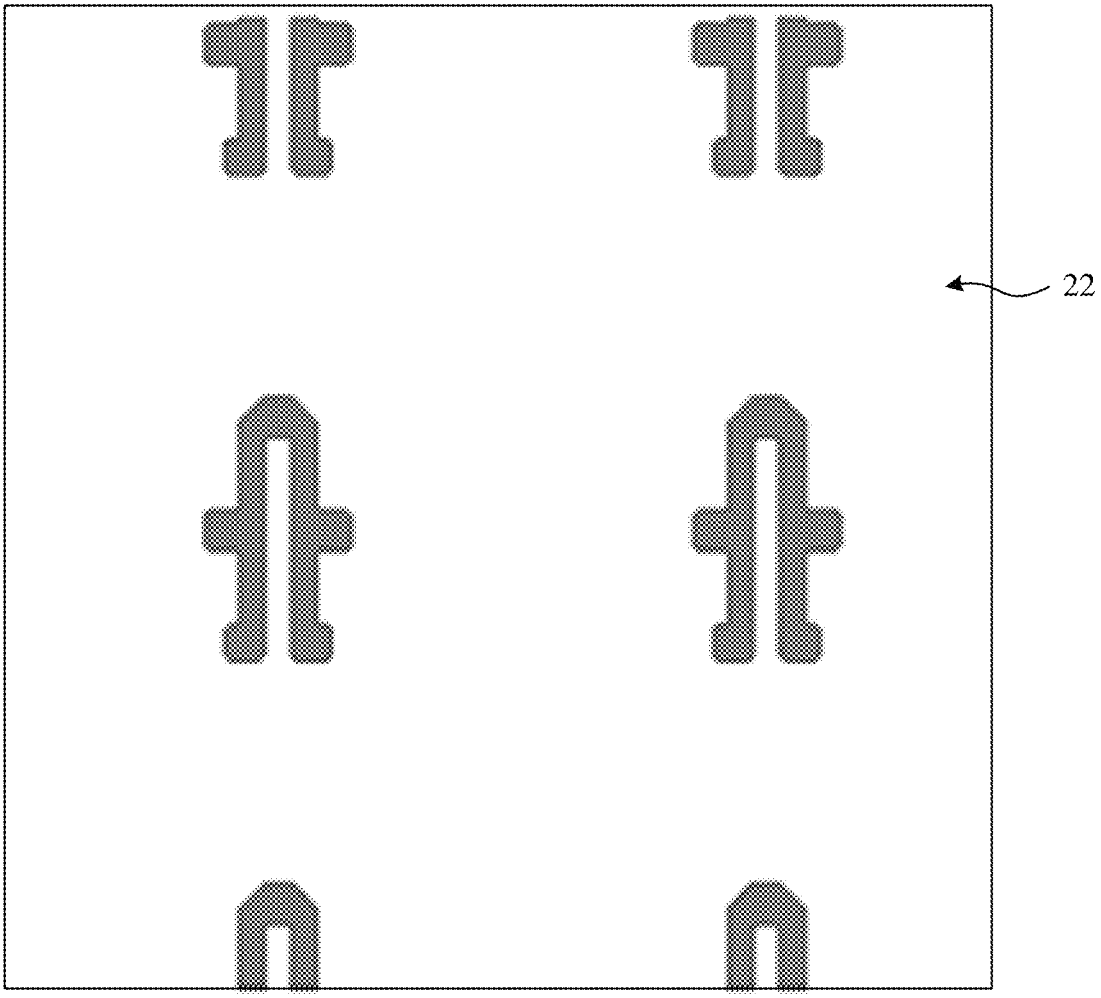
Figure 43:
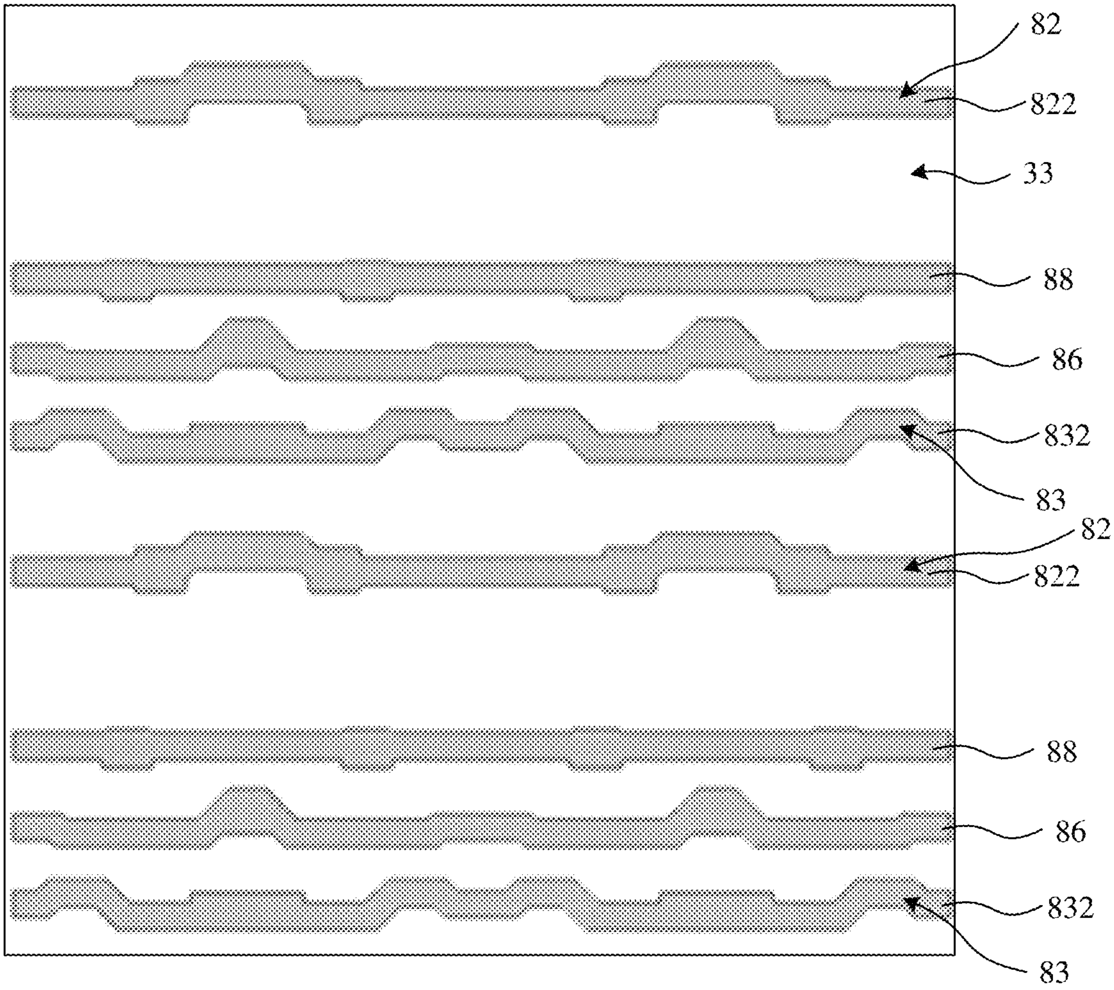
Figure 44:
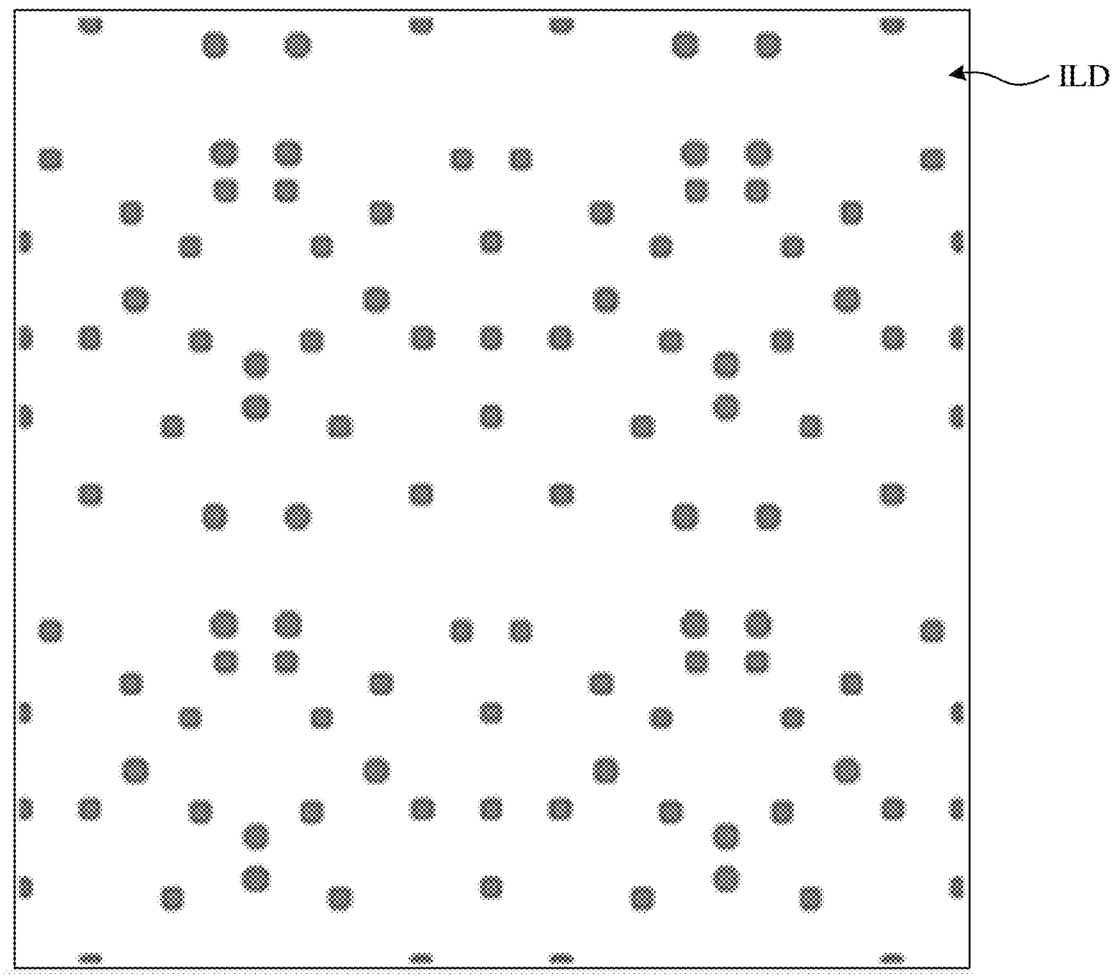
Figure 45:
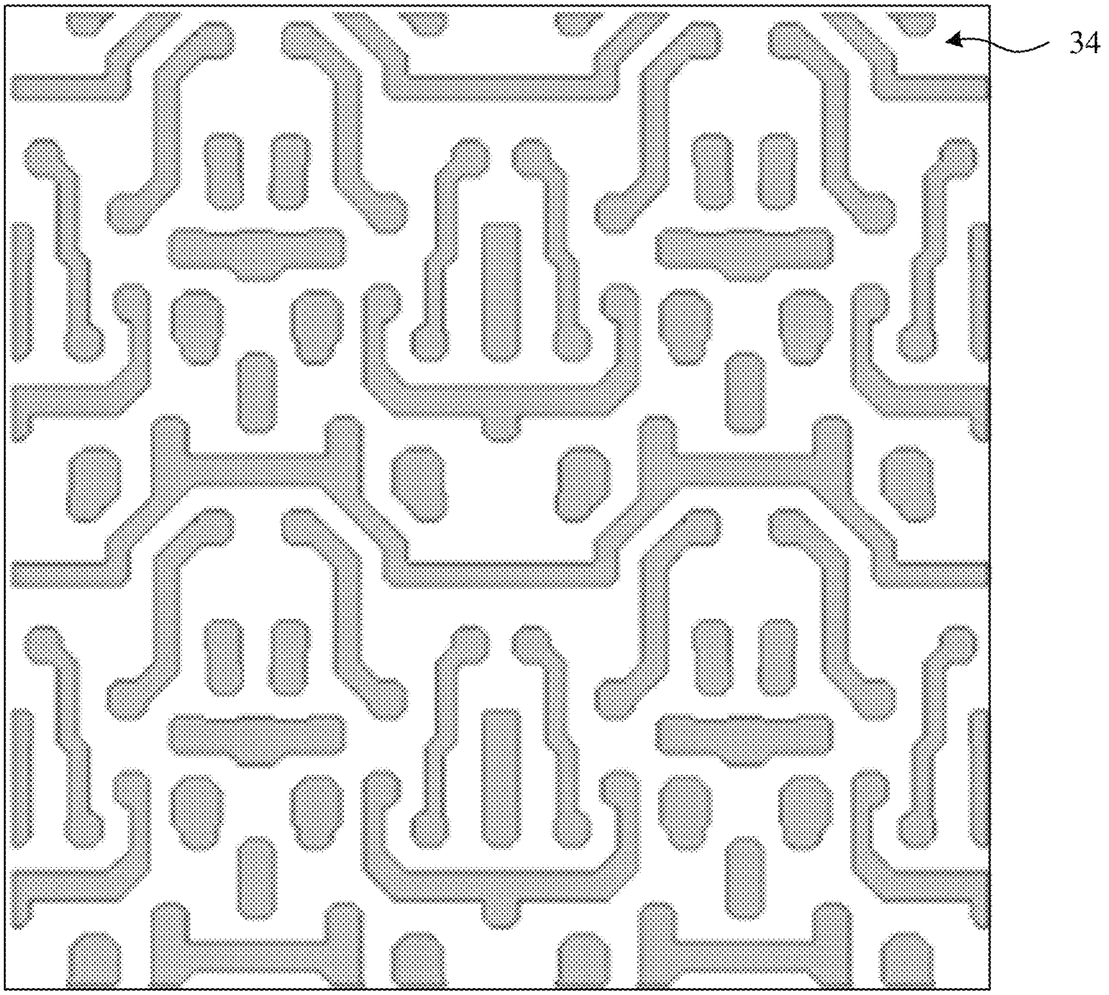
Figure 46:
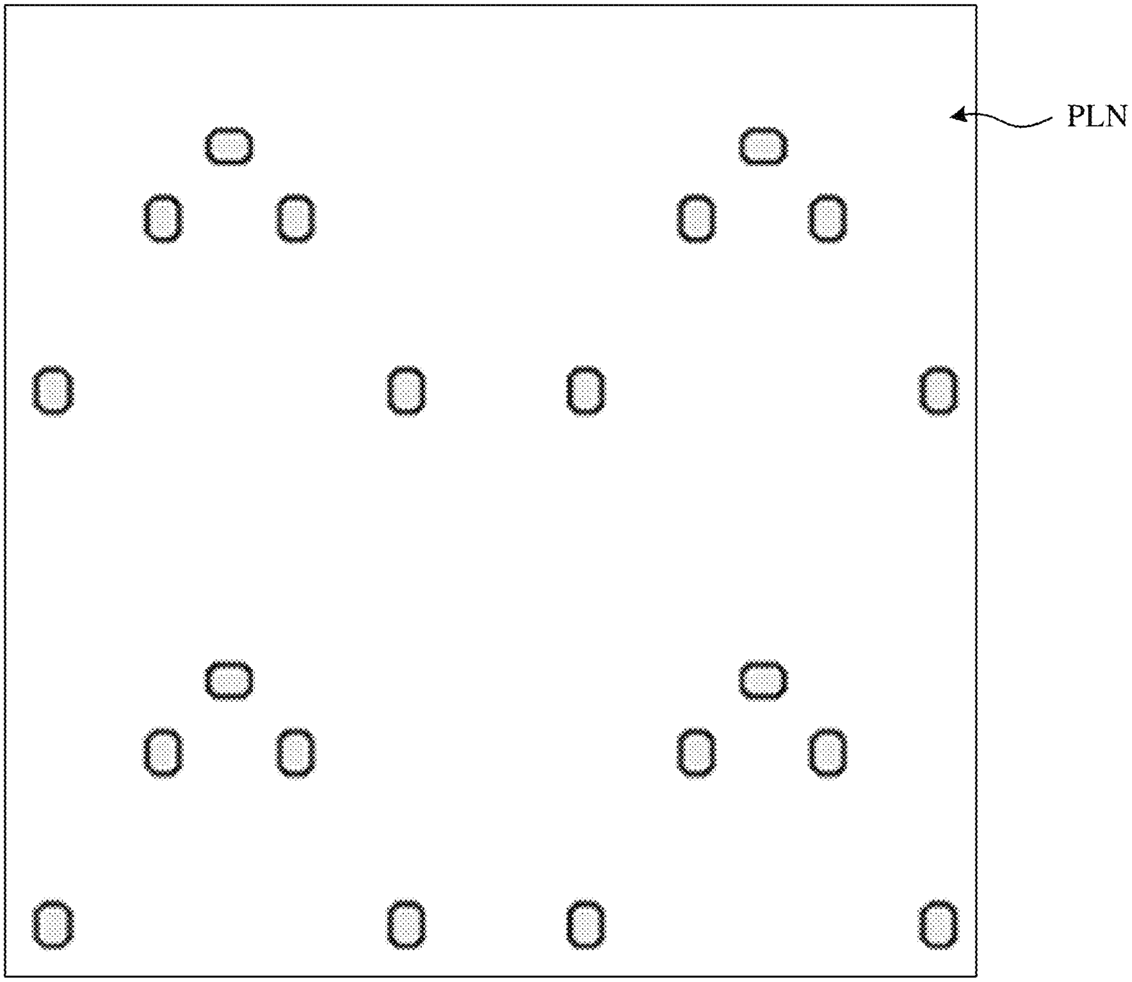
Figure 47:
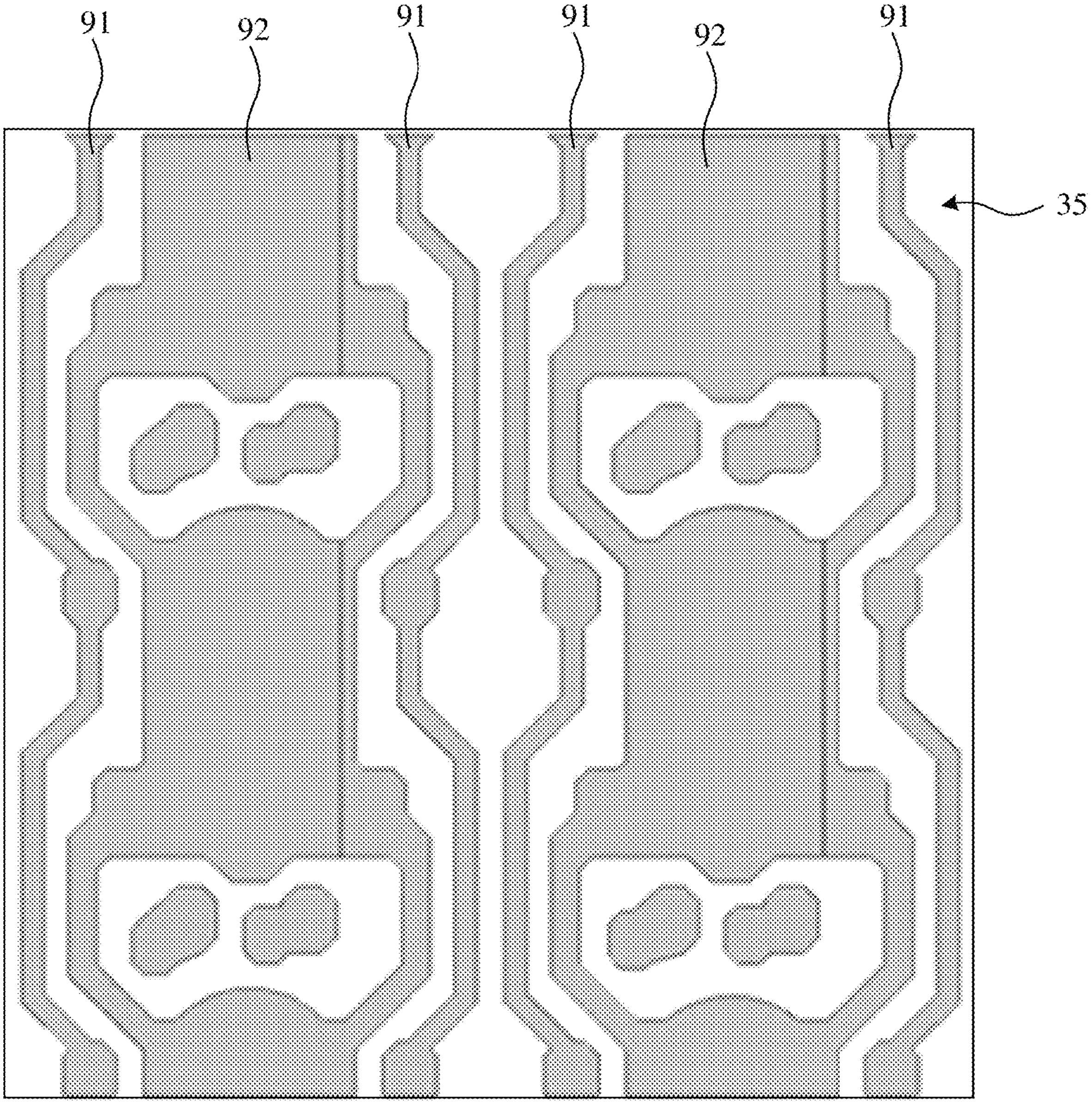

FIG. 37 schematically shows pixel driving circuits of eight sub-pixels, where the total eight sub-pixels include two rows of four sub-pixels arranged in the first direction X and four columns of two sub-pixels arranged in the second direction Y. FIG. 38 to FIG. 47 respectively show partial plan views of the display substrate according to the embodiment of FIG. 37 of the present disclosure, where FIG. 38 shows a partial plan view of the light shielding layer LS of the display substrate, FIG. 39 shows a partial plan view of the first semiconductor layer 21 of the display substrate, FIG. 40 shows a partial plan view of the first conductive layer 31 of the display substrate, FIG. 41 shows a partial plan view of the second conductive layer 32 of the display substrate, FIG. 42 shows a partial plan view of the second semiconductor layer 22 of the display substrate, FIG. 43 shows a partial plan view of the third conductive layer 33 of the display substrate, FIG. 44 shows a partial plan view of the first insulation layer ILD of the display substrate, in which a plurality of via holes located in the first insulation layer is schematically shown, FIG. 45 shows a partial plan view of the fourth conductive layer 34 of the display substrate, FIG. 46 shows a partial plan view of the second insulation layer PLN of the display substrate, in which a plurality of via holes located in the second insulation layer are schematically shown, and FIG. 47 shows a partial plan view of the fifth conductive layer 35 of the display substrate.

Figure 48:
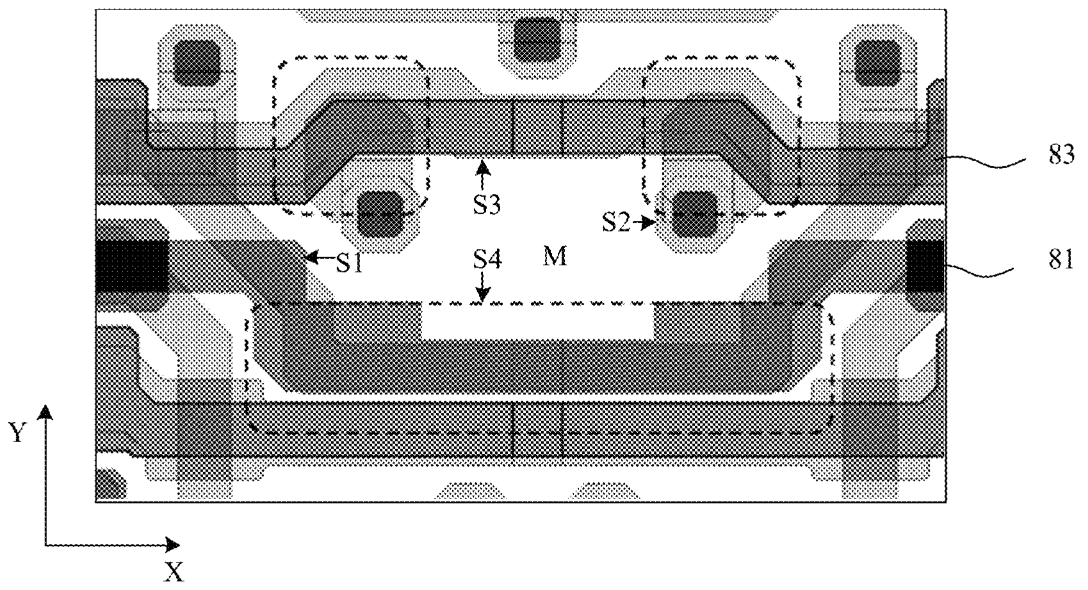
FIG. 48 shows a schematic diagram of a partial planar structure of a hollow region of a display substrate in some exemplary embodiments of the present disclosure.
Figure 49:
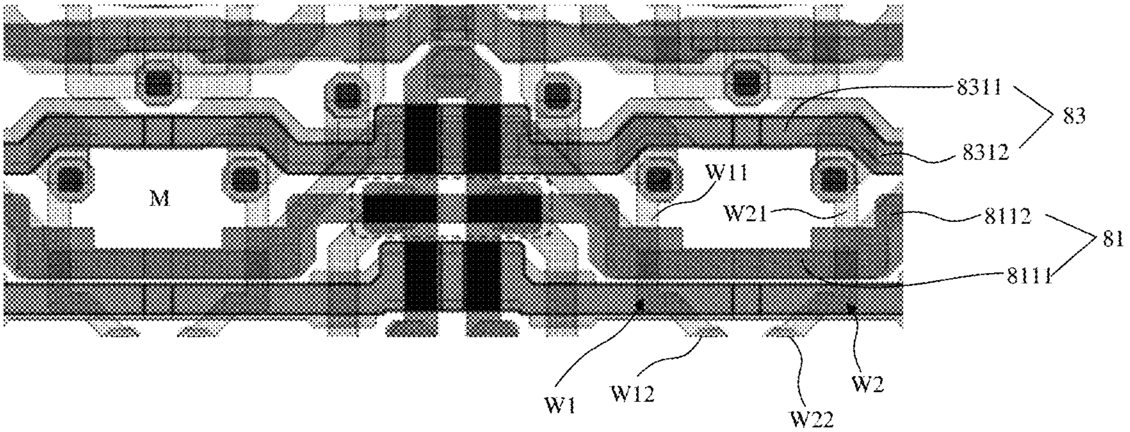
FIG. 49 shows a schematic diagram of a partial planar structure between adjacent hollow regions of a display substrate in some exemplary embodiments of the present disclosure.

FIG. 48 shows a schematic diagram of a partial planar structure of a hollow region of a display substrate in some exemplary embodiments of the present disclosure. FIG. 49 shows a schematic diagram of a partial planar structure between adjacent hollow regions of a display substrate in some exemplary embodiments of the present disclosure.

As shown in FIG. 37, FIG. 48 and FIG. 49, the display substrate further includes at least one hollow region M, and the at least one hollow region M includes a first side S1, a second side S2, a third side S3, and a fourth side S4. The first side S1 and the second side S2 are opposite sides of the at least one hollow region in the first direction X, and the third side S3 and the fourth side S4 are opposite sides of the at least one hollow region in the second direction Y.

The display substrate includes a plurality of data lines provided on the base substrate, and the plurality of data lines extend in the second direction Y respectively. The plurality of data lines include a first data line W1 and a second data line W2 that are adjacent to the at least one hollow region. The first data line W1 and the second data line W2 are respectively located on the first side S1 and the second side S2 of the at least one hollow region in the first direction X. The first reset control signal line 83 and the scanning control signal line 81 are adjacent to the at least one hollow region and are respectively located on the third side S3 and the fourth side S4 of the at least one hollow region in the second direction Y. The first reset control signal line 83 and the scanning control signal line 81 respectively intersect with the first data line W1 and the second data line W2 so as to enclose to form the at least one hollow region M.

Exemplarily, as shown in FIG. 49, the first data line W1 extending in the second direction Y is provided on the first side S1 of the hollow region M, and the second data line W2 extending in the second direction Y is provided on the second side S2 of the hollow region M.

In other exemplary embodiments of the present disclosure, the display substrate includes a plurality of data lines provided on the base substrate, and the plurality of data lines extend in the second direction respectively. The plurality of data lines include a first data line and a second data line that are adjacent to the at least one hollow region, and the first data line and the second data line are located on the first side and the second side of the at least one hollow region respectively in the first direction. The scanning control signal line 81 and the compensation control signal line 82 are adjacent to the at least one hollow region and are respectively located on the third side and the fourth side of the at least one hollow region in the second direction. The scanning control signal line 81 and the compensation control signal line 82 respectively intersect with the first data line W1 and the second data line W2 so as to enclose and form the at least one hollow region M. In such embodiments, the hollow region M is located between the scanning control signal line 81 and the compensation control signal line 82.

As shown in FIG. 49, each of the first data line W1 and the second data line W2 includes a body portion and a bending portion The bending portion of the first data line W1 is bent in a direction away from the at least one hollow region M with respect to the body portion of the first data line, the bending portion of the second data line is bent in a direction away from the at least one hollow region with respect to the body portion of the second data line, and the bending portion of the first data line and the bending portion of the second data line are bent in opposite directions. For example, a distance between the bending portion W11 of the first data line W1 and the bending portion W21 of the second data line W2 is greater than a distance between the body portion W12 of the first data line W1 and the body portion W22 of the second data line W2.

Each of the first reset control signal line 83 and the scanning control signal line 81 includes a body portion and a bending portion. The bending portion 8311 of the first reset control signal line is bent in a direction away from the at least one hollow region M with respect to the body portion 8312 of the first reset control signal line, the bending portion 8111 of the scanning control signal line 81 is bent in a direction away from the at least one hollow region M with respect to the body portion 8112 of the scanning control signal line, and the bending portion 8311 of the first reset control signal line and the bending portion 8111 of the scanning control signal line are bent in opposite directions.

As shown in FIG. 49, the bending portion W11 of the first data line and the bending portion W21 of the second data line W2, together with the bending portion 8311 of the first reset control signal line and the bending portion 8111 of the scanning control signal line, enclose to form the hollow region M.

As shown in FIG. 49, in the embodiment, the second semiconductor layer 22 overlaps with the scanning control signal line 81 in the first conductive layer 31, as shown by a region shown by a dashed box in FIG. 49. In the region shown by the dashed box, the orthographic projection of the scanning control signal line 81 on the base substrate in the dashed box is set to be greater than an orthographic projection of the second semiconductor layer 22 on the base substrate in the dashed box, so that an overlapping capacitance generated between the second semiconductor layer 22 and the scanning signal line 81 in the first conductive layer 31 in each pixel in the display substrate is consistent, thereby an area of the hollow region may be effectively increased without affecting a display image quality.

In other exemplary embodiments of the present disclosure, each of the scanning control signal line and the compensation control signal line includes a body portion and a bending portion. The bending portion of the scanning control signal line is bent in a direction away from the at least one hollow region with respect to the body portion of the scanning control signal line, the bending portion of the compensation control signal line is bent in a direction away from the at least one hollow region with respect to the body portion of the compensation control signal line, and the bending portion of the scanning control signal line and the bending portion of the compensation control signal line are bent in opposite directions. In the embodiment, the bending portion of the first data line and the bending portion of the second data line, together with the bending portion of the scanning control signal line and the bending portion of the compensation control signal line, enclose to form the hollow region M.

In some exemplary embodiments of the present disclosure, the display substrate includes a data signal transfer portion, namely the above-mentioned connecting portion, located in the fourth conductive layer 34. A portion of the data signal transfer portion is electrically connected to the first data line or the second data line through the fifth via hole. In a first region, an orthographic projection of the data signal transfer portion on the base substrate overlaps at least partially with the orthographic projection of the first reset control signal sub-line 831 on the base substrate, and the orthographic projection of the data signal transfer portion on the base substrate overlaps at least partially with the orthographic projection of the second reset control signal sub-line 832 on the base substrate. The orthographic projection of the data signal transfer portion on the base substrate overlapping at least partially with the orthographic projection of the first reset control signal sub-line or the second reset control signal sub-line on the base substrate may ensure an area of the via hole and ensure a signal transmission. The orthographic projection of the first reset control signal sub-line 831 on the base substrate does not overlap completely with the orthographic projection of the second reset control signal sub-line 832 on the base substrate, so that a space utilization of the display substrate may be improved without affecting a stability of the reset control signal.

At least some embodiments of the present disclosure further provide a display device. The display device may include the above-mentioned display substrate. The display device includes the display region AA and the peripheral region NA, and the peripheral region NA has a small width and a high pixel density, so that a display device with a narrow bezel and a high PPI may be achieved.

The display device may include any apparatus or product having a display function. For example, the display device may be a smart phone, a mobile phone, an e-book reader, a desktop personal computer (PC), a laptop PC, a netbook PC, a personal digital assistant (PDA), a portable multimedia player (PMP), a digital audio player, a mobile medical apparatus, a camera, a wearable apparatus (such as head-mounted apparatus, electronic clothing, electronic bracelet, electronic necklace, electronic accessory, electronic tattoo, or smart watch), a television, etc.

It should be understood that the display device according to the embodiments of the present disclosure has all features and advantages of the above-mentioned display substrate. The details may be referred to the above descriptions and will not be repeated here.

Here, the terms "substantially", "about", "approximately", "roughly" and other similar terms are used as terms of approximation rather than terms of degree, and they are intended to explain an inherent deviation of a measured or calculated value that will be recognized by those ordinary skilled in the art. Taking into account a process fluctuation, a measurement problem, an error related to a measurement of a specific quantity (that is, a limitation of a measurement system) and other factors, the terms "about" or "approximately" used here includes a stated value and means that a specific value determined by those ordinary skilled in the art is within an acceptable range of deviation. For example, "about" may mean being within one or more standard deviations, or within ±30%, ±20%, ±10% or ±5% of the stated value.

Although some embodiments of general technical concept of the present disclosure have been illustrated and described, it should be understood by those ordinary skilled in the art that these embodiments may be changed without departing from the principle and spirit of the general technical concept of the present disclosure. The scope of the present disclosure is defined by the claims and their equivalents.

What is claimed is:

1. A display substrate, comprising:

a base substrate;

a plurality of sub-pixels provided on the base substrate, wherein the plurality of sub-pixels are arranged in a first direction and a second direction, and comprise a light emitting element;

a plurality of pixel driving circuits provided on the base substrate, wherein the plurality of pixel driving circuits are arranged in the first direction and the second direction, the plurality of pixel driving circuits are configured to drive the light emitting elements of the plurality of sub-pixels respectively, and at least one pixel driving circuit comprises at least two transistors;

an initialization voltage signal line provided on the base substrate, wherein the initialization voltage signal line comprises a portion extending in the first direction, and the initialization voltage signal line is configured to provide an initialization voltage signal to the at least one pixel driving circuit; and a control signal line provided on the base substrate, wherein the control signal line comprises a portion extending in the first direction, and the control signal line is configured to provide a control signal to the at least one pixel driving circuit so as to control the at least two transistors of the at least one pixel driving circuit to turn on, wherein in a frame of driving the pixel driving circuits of a row of sub-pixels, the control signal on the control signal line controls the at least two transistors of the at least one pixel driving circuit to turn on in at least one first time period, and the initialization voltage signal on the initialization voltage signal line is provided to the at least one pixel driving circuit in a second time period, wherein the first time period is separated from the second time period in timing; and the initialization voltage signal line and the control signal line are located in different conductive layers, an orthographic projection of the initialization voltage signal line on the base substrate overlaps at least partially with an orthographic projection of the control signal line on the base substrate, and in at least one of the sub-pixels, a ratio of an area of an overlapping portion to an area of the orthographic projection of the control signal line on the base substrate is in a range from 60% to 100%.

2. The display substrate according to claim 1, wherein:

the at least two transistors of the at least one pixel driving circuit comprise a first reset transistor, and the first reset transistor comprises a gate electrode, a source electrode, and a drain electrode;

the initialization voltage signal line comprises a first initialization voltage signal line electrically connected to the source electrode or the drain electrode of the first reset transistor;

an orthographic projection of the first initialization voltage signal line on the base substrate overlaps at least partially with the orthographic projection of the control signal line on the base substrate; and the control signal line comprises a reset control signal line.

3. The display substrate according to claim 1, wherein:

the at least two transistors of the at least one pixel driving circuit comprise a second reset transistor, and the second reset transistor comprises a gate electrode, a source electrode, and a drain electrode;

the initialization voltage signal line comprises a second initialization voltage signal line electrically connected to the source electrode or the drain electrode of the second reset transistor; and an orthographic projection of the second initialization voltage signal line on the base substrate overlaps at least partially with the orthographic projection of the control signal line on the base substrate, and the control signal line comprises a scanning control signal line.

4. The display substrate according to claim 1, wherein:

the at least two transistors of the at least one pixel driving circuit comprise a third reset transistor, and the third reset transistor comprises a gate electrode, a source electrode, and a drain electrode;

the initialization voltage signal line comprises a third initialization voltage signal line electrically connected to the source electrode or the drain electrode of the third reset transistor; and an orthographic projection of the third initialization voltage signal line on the base substrate overlaps at least partially with the orthographic projection of the control signal line on the base substrate, and the control signal line comprises a light emission control signal line.

5. The display substrate according to claim 1, wherein:

the at least two transistors of the at least one pixel driving circuit comprise a first reset transistor, a second reset transistor, and a third reset transistor, and each of the first reset transistor, the second reset transistor and the third reset transistor comprises a gate electrode, a source electrode, and a drain electrode;

the initialization voltage signal line comprises a first initialization voltage signal line electrically connected to the source electrode or the drain electrode of the first reset transistor;

the initialization voltage signal line comprises a second initialization voltage signal line electrically connected to the source electrode or the drain electrode of the second reset transistor;

the initialization voltage signal line comprises a third initialization voltage signal line electrically connected to the source electrode or the drain electrode of the third reset transistor; and an orthographic projection of at least one of the first initialization voltage signal line, the second initialization voltage signal line and the third initialization voltage signal line on the base substrate overlaps at least partially with the orthographic projection of the control signal line on the base substrate.

6. The display substrate according to claim 5, wherein the at least two transistors of the at least one pixel driving circuit further comprise a data writing transistor and a light emission control transistor, the data writing transistor and the light emission control transistor respectively comprise a gate electrode, a source electrode, and a drain electrode, and the control signal line comprises a first reset control signal line electrically connected to the gate electrode of the first reset transistor, a second reset control signal line electrically connected to the gate electrode of the second reset transistor or the gate electrode of the third reset transistor, a scanning control signal line electrically connected to the gate electrode of the data writing transistor, and a light emission control signal line electrically connected to the gate electrode of the light emission control transistor; and wherein:

the orthographic projection of the first initialization voltage signal line on the base substrate overlaps at least partially with an orthographic projection of the second reset control signal line on the base substrate;

the orthographic projection of the first initialization voltage signal line on the base substrate does not overlap with an orthographic projection of the first reset control signal line on the base substrate;

the orthographic projection of the first initialization voltage signal line on the base substrate does not overlap with an orthographic projection of the scanning control signal line on the base substrate; and the orthographic projection of the first initialization voltage signal line on the base substrate does not overlap with an orthographic projection of the light emission control signal line on the base substrate.

7. The display substrate according to claim 6, wherein, the orthographic projection of the second initialization voltage signal line on the base substrate overlaps at least partially with the orthographic projection of the scanning control signal line on the base substrate;

the orthographic projection of the second initialization voltage signal line on the base substrate does not overlap with the orthographic projection of the second reset control signal line on the base substrate; and the orthographic projection of the second initialization voltage signal line on the base substrate does not overlap with the orthographic projection of the light emission control signal line on the base substrate.

8. The display substrate according to claim 7, wherein, the orthographic projection of the third initialization voltage signal line on the base substrate overlaps at least partially with the orthographic projection of the light emission control signal line on the base substrate;

the orthographic projection of the third initialization voltage signal line on the base substrate does not overlap with the orthographic projection of the first reset control signal line on the base substrate;

the orthographic projection of the third initialization voltage signal line on the base substrate does not overlap with the orthographic projection of the second reset control signal line on the base substrate; and the orthographic projection of the third initialization voltage signal line on the base substrate does not overlap with the orthographic projection of the scanning control signal line on the base substrate.

9. The display substrate according to claim 8, wherein the display substrate comprises:

a first semiconductor layer provided on the base substrate;

a first conductive layer provided on a side of the first semiconductor layer away from the base substrate;

a second conductive layer provided on a side of the first conductive layer away from the base substrate;

a second semiconductor layer provided on a side of the second conductive layer away from the base substrate;

a third conductive layer provided on a side of the second semiconductor layer away from the base substrate;

a fourth conductive layer provided on a side of the third conductive layer away from the base substrate;

a fifth conductive layer provided on a side of the fourth conductive layer away from the base substrate, and wherein the first initialization voltage signal line is located in the third conductive layer, and the second reset control signal line is located in the first conductive layer.

10. The display substrate according to claim 9, wherein the scanning control signal line is located in the first conductive layer, and the second initialization voltage signal line is located in the fourth conductive layer.

11. The display substrate according to claim 9, wherein the light emission control signal line is located in the first conductive layer, and the third initialization voltage signal line is located in the third conductive layer.

12. The display substrate according to claim 9, wherein the second reset control signal line is located in the first conductive layer.

13. The display substrate according to claim 9, wherein the display substrate further comprises a first power signal line located on the base substrate, the first power signal line extends in the second direction, and two columns of sub-pixels share one first power signal line; and wherein:

the display substrate comprises a first conductive transfer portion located in the second conductive layer, a first power signal line transfer portion located in the fourth conductive layer, and a second voltage signal line transfer portion located in the fourth conductive layer, the pixel driving circuits of two adjacent sub-pixels in a same row comprise respective first conductive transfer portions and second voltage signal line transfer portions, and the pixel driving circuits of two adjacent sub-pixels in the same row share the first power signal line transfer portion, and the first power signal line is electrically connected to the first power signal line transfer portion through a first via hole, two ends of the first power signal line transfer portion are respectively electrically connected to the first conductive transfer portions of the pixel driving circuits of two adjacent sub-pixels located in the same row through a second via hole, the first conductive transfer portion is electrically connected to a first end of the second voltage signal line transfer portion through a third via hole, and a second end of the second voltage signal line transfer portion is electrically connected to a source electrode or a drain electrode of a first light emission control transistor through a fourth via hole.

14. The display substrate according to claim 13, wherein the display substrate further comprises a first initialization voltage connecting portion located in the fourth conductive layer, and wherein:

a first end of the first initialization voltage connecting portion is electrically connected to the first initialization voltage signal line through a fifth via hole, and a second end of the first initialization voltage connecting portion is respectively electrically connected to the source electrodes or the drain electrodes of the first reset transistors of two adjacent sub-pixels in the same row through a sixth via hole;

the display substrate further comprises a second initialization voltage connecting portion located in the fourth conductive layer;

first and second ends of the second initialization voltage connecting portion are respectively electrically connected to the third initialization voltage signal line through a seventh via hole, and a middle portion between the first and second ends is electrically connected to the source electrodes or the drain electrodes of the third reset transistors of two adjacent sub-pixels in the same row through an eighth via hole; and the second initialization voltage connecting portion is located between the first initialization voltage connecting portion and the second voltage signal line transfer portion in the first direction.

15. The display substrate according to claim 9, wherein:

the first reset transistor is a P-type transistor, and the first reset control signal line is located in the first conductive layer;

the orthographic projection of the second initialization voltage signal line on the base substrate overlaps at least partially with the orthographic projection of the first reset control signal line on the base substrate; and the first reset transistor comprises an active layer located in the first semiconductor layer.

16. The display substrate according to claim 9, wherein the display substrate further comprises at least one hollow region, the at least one hollow region comprises a first side, a second side, a third side, and a fourth side, the first side and the second side are opposite sides of the at least one hollow region in the first direction, and the third side and the fourth side are opposite sides of the at least one hollow region in the second direction; and wherein:

the display substrate comprises a plurality of data lines provided on the base substrate, the plurality of data lines respectively extend in the second direction, the plurality of data lines comprise a first data line and a second data line that are adjacent to the at least one hollow region, and the first data line and the second data line are respectively located on the first side and the second side of the at least one hollow region in the first direction;

the first reset control signal line and the scanning control signal line are adjacent to the at least one hollow region, and are respectively located on the third side and the fourth side of the at least one hollow region in the second direction;

the first reset control signal line and the scanning control signal line respectively intersect with the first data line and the second data line so as to enclose to form the at least one hollow region;

each of the first data line and the second data line comprises a body portion and a bending portion, the bending portion of the first data line is bent in a direction away from the at least one hollow region with respect to the body portion of the first data line, the bending portion of the second data line is bent in a direction away from the at least one hollow region with respect to the body portion of the second data line, and the bending portion of the first data line and the bending portion of the second data line are bent in opposite directions; and each of the first reset control signal line and the scanning control signal line comprises a body portion and a bending portion, the bending portion of the first reset control signal line is bent in a direction away from the at least one hollow region with respect to the body portion of the first reset control signal line, the bending portion of the scanning control signal line is bent in a direction away from the at least one hollow region with respect to the body portion of the scanning control signal line, and the bending portion of the first reset control signal line and the bending portion of the scanning control signal line are bent in opposite directions.

17. The display substrate according to claim 9, wherein the display substrate further comprises at least one hollow region, the at least one hollow region comprises a first side, a second side, a third side, and a fourth side, the first side and the second side are opposite sides of the at least one hollow region in the first direction, and the third side and the fourth side are opposite sides of the at least one hollow region in the second direction; and wherein:

the display substrate comprises a plurality of data lines provided on the base substrate, the plurality of data lines respectively extend in the second direction, the plurality of data lines comprise a first data line and a second data line that are adjacent to the at least one hollow region, and the first data line and the second data line are respectively located on the first side and the second side of the at least one hollow region in the first direction;

the first reset control signal line and a compensation control signal line are adjacent to the at least one hollow region, and are respectively located on the third side and the fourth side of the at least one hollow region in the second direction;

the first reset control signal line and the compensation control signal line respectively intersect with the first data line and the second data line so as to enclose to form the at least one hollow region; and each of the first reset control signal line and the compensation control signal line comprises a body portion and a bending portion, the bending portion of the first reset control signal line is bent in a direction away from the at least one hollow region with respect to the body portion of the first reset control signal line, the bending portion of the compensation control signal line is bent in a direction away from the at least one hollow region with respect to the body portion of the compensation control signal line, and the bending portion of the first reset control signal line and the bending portion of the compensation control signal line are bent in opposite directions.

18. The display substrate according to claim 1, wherein in at least one of the sub-pixels, the ratio of the area of the overlapping portion to the area of the orthographic projection of the control signal line on the base substrate is in a range of 80% to 95%.

19. A display substrate, comprising:

a base substrate;

a plurality of sub-pixels provided on the base substrate, wherein the plurality of sub-pixels are arranged in a first direction and a second direction, and a light emitting element;

a plurality of pixel driving circuits provided on the base substrate, wherein the plurality of pixel driving circuits are arranged in the first direction and the second direction, the plurality of pixel driving circuits are configured to drive the light emitting elements of the plurality of sub-pixels respectively, and at least one pixel driving circuit comprises a first reset transistor, a second reset transistor, and a third reset transistor;

an initialization voltage signal line provided on the base substrate, wherein the initialization voltage signal line comprises a portion extending in the first direction, the initialization voltage signal line is configured to provide an initialization voltage signal to the at least one pixel driving circuit, the initialization voltage signal line comprises a first initialization voltage signal line, a second initialization voltage signal line, and a third initialization voltage signal line, and the first initialization voltage signal line, the second initialization voltage signal line and the third initialization voltage signal line are respectively electrically connected to a first electrode of the first reset transistor, a first electrode of the second reset transistor and a first electrode of the third reset transistor; and a control signal line provided on the base substrate, wherein the control signal line comprises a portion extending in the first direction, and the control signal line is configured to provide a control signal to the at least one pixel driving circuit so as to control at least two transistors of the at least one pixel driving circuit to turn on, wherein in a frame of driving the pixel driving circuits of a row of sub-pixels, the control signal on the control signal line controls, in at least one first time period, the at least two transistors of the at least one pixel driving circuit to turn on, the initialization voltage signal on the initialization voltage signal line is provided to the at least one pixel driving circuit in a second time period, and the first time period and the second time period are separated in timing; and the initialization voltage signal line and the control signal line are located in different conductive layers, an orthographic projection of each of the first initialization voltage signal line, the second initialization voltage signal line and the third initialization voltage signal line on the base substrate overlaps at least partially with an orthographic projection of the control signal line on the base substrate, and in at least one of the sub-pixels, a ratio of an area of an overlapping portion to an area of the orthographic projection of the control signal line on the base substrate is in a range from 60% to 100%.

20. A display device, comprising the display substrate according to claim 1.

* * * * *